US012248207B2

(12) United States Patent
Yoshikawa et al.

(10) Patent No.: US 12,248,207 B2
(45) Date of Patent: Mar. 11, 2025

(54) ISOLATOR, METHOD OF MANUFACTURING ISOLATOR, ELECTROMAGNETIC WAVE TRANSMITTER, AND LIGHT TRANSMITTER

(71) Applicant: KYOCERA Corporation, Kyoto (JP)

(72) Inventors: Hiromichi Yoshikawa, Yokohama (JP); Naoki Matsui, Tokyo (JP); Tomoya Sugita, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/424,487

(22) Filed: Jan. 26, 2024

(65) Prior Publication Data

US 2024/0168323 A1 May 23, 2024

Related U.S. Application Data

(62) Division of application No. 17/597,806, filed as application No. PCT/JP2020/028158 on Jul. 20, 2020, now Pat. No. 11,921,365.

(30) Foreign Application Priority Data

Jul. 26, 2019 (JP) ................................. 2019-138296
Jul. 26, 2019 (JP) ................................. 2019-138300

(Continued)

(51) Int. Cl.
*H04B 10/50* (2013.01)
*G02F 1/095* (2006.01)

(52) U.S. Cl.
CPC ........... *G02F 1/0955* (2013.01); *H04B 10/50* (2013.01); *H04B 10/501* (2013.01)

(58) Field of Classification Search
None
See application file for complete search history.

(56) References Cited

U.S. PATENT DOCUMENTS 6,275,637 B1 * 8/2001 Chang .................. G02B 6/2552
385/11
6,535,656 B1 * 3/2003 Noge ..................... G02B 6/136
385/11

(Continued)

FOREIGN PATENT DOCUMENTS

JP 2003-302603 A 10/2003
JP 2005-019639 A 1/2005

(Continued)

*Primary Examiner* — Jai M Lee
(74) *Attorney, Agent, or Firm* — Studebaker Brackett PLLC

(57) ABSTRACT

An isolator comprises a substrate having a substrate surface; and first and second waveguides that are positioned at least partially side by side along the substrate surface. The first waveguide includes a first core, the second waveguide includes a second core, and the first and second cores are surrounded by a dielectric. The first waveguide includes first and second ends, and includes a port through which an electromagnetic wave is input and output at each of the first and second ends. The second waveguide includes a first portion extending along the first waveguide and a second portion that is not included in the first portion. The second waveguide includes a nonreciprocal member that is in contact with at least a part of the second core of the first portion, and the nonreciprocal member is in contact with at least a part of the second core of the second portion.

4 Claims, 46 Drawing Sheets

(30) Foreign Application Priority Data

Jul. 26, 2019  (JP) ................................ 2019-138309
Jul. 26, 2019  (JP) ................................ 2019-138310

(56) References Cited

U.S. PATENT DOCUMENTS

| | | | | |
|---|---|---|---|---|
| 6,690,501 B2* | 2/2004 | Li | ........................ | G02B 6/2746 385/11 |
| 6,711,310 B2* | 3/2004 | Chang | .................. | G02B 6/2746 385/11 |
| 7,260,281 B2* | 8/2007 | Salib | .................... | G02B 6/2746 385/11 |
| 8,027,552 B2 | 9/2011 | McNie et al. | | |
| 8,335,407 B2* | 12/2012 | Yokoi | ................... | G02F 1/0955 385/14 |
| 8,749,871 B2* | 6/2014 | Montoya | .............. | G02F 1/0955 359/324 |
| 8,983,247 B2* | 3/2015 | Hofrichter | ......... | G02B 6/12007 385/27 |
| 9,664,857 B2* | 5/2017 | Carroll | .................. | G02F 1/0955 |
| 9,829,728 B2* | 11/2017 | Sun | ....................... | G02F 1/0955 |
| 10,976,564 B2* | 4/2021 | Matsui | .................... | G02B 6/124 |
| 11,016,317 B2* | 5/2021 | Bowers | .................. | G02F 1/092 |
| 11,921,365 B2* | 3/2024 | Yoshikawa | ............... | G02B 6/12 |
| 2004/0179256 A1 | 9/2004 | Hammer | | |
| 2009/0034909 A1* | 2/2009 | Mizumoto | ............. | G02B 6/125 385/42 |
| 2010/0238536 A1* | 9/2010 | Hu | ..................... | G02B 6/12007 385/32 |
| 2012/0236389 A1 | 9/2012 | Montoya et al. | | |
| 2014/0314371 A1 | 10/2014 | Yoshie | | |
| 2022/0244584 A1* | 8/2022 | Scofield | .................. | G02F 1/093 |

FOREIGN PATENT DOCUMENTS

| | | |
|---|---|---|
| JP | 2007-500370 A | 1/2007 |
| JP | 2010-011605 A | 1/2010 |
| JP | 2013-504087 A | 2/2013 |
| WO | 2009/107194 A1 | 9/2009 |

* cited by examiner

FIG. 28
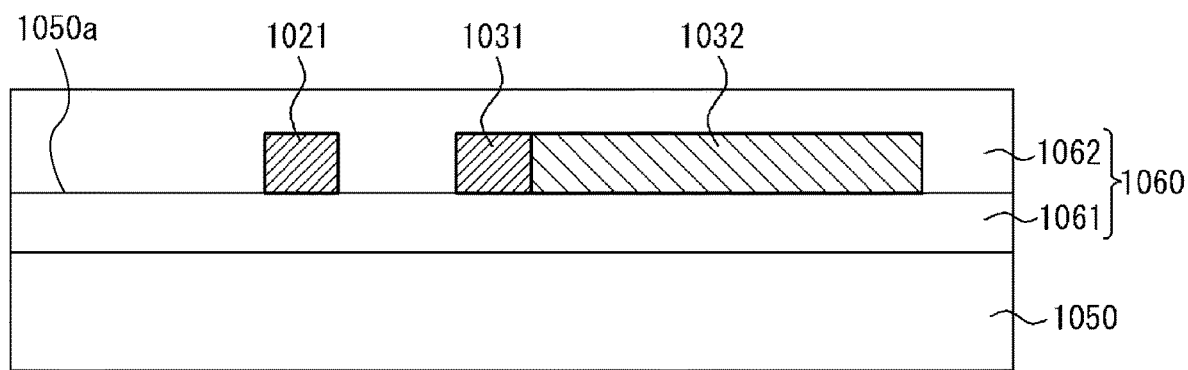
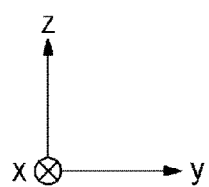

FIG. 31
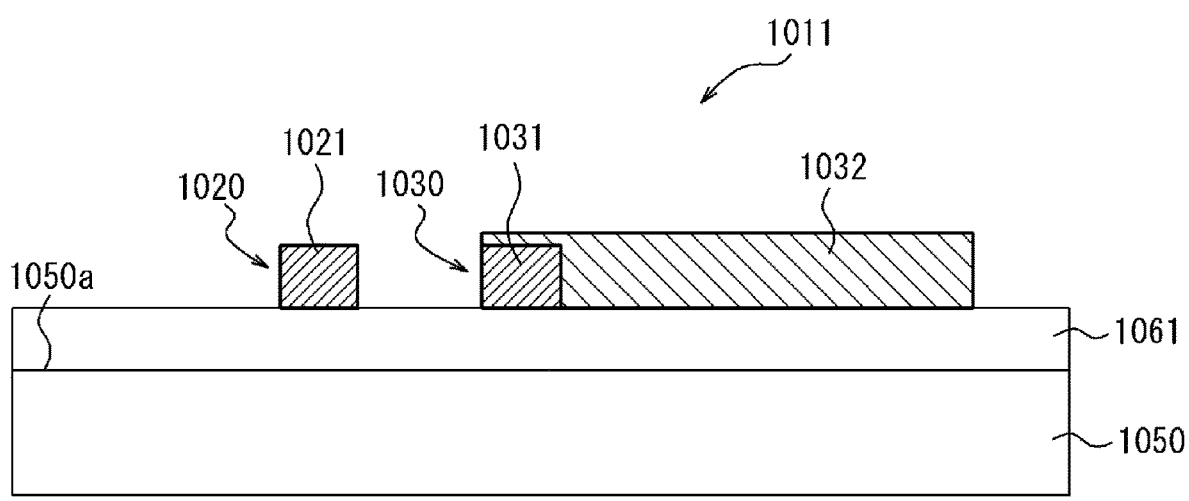
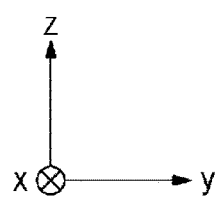

ISOLATOR, METHOD OF MANUFACTURING ISOLATOR, ELECTROMAGNETIC WAVE TRANSMITTER, AND LIGHT TRANSMITTER

CROSS-REFERENCES TO RELATED APPLICATIONS

This application is a Divisional of U.S. patent application Ser. No. 17/597,806 filed Jan. 24, 2022, which claims priority of Japanese Patent Application No. 2019-138296, filed on Jul. 26, 2019, Japanese Patent Application No. 2019-138300, filed on Jul. 26, 2019, Japanese Patent Application No. 2019-138309, filed on Jul. 26, 2019, and Japanese Patent Application No. 2019-138310, filed on Jul. 26, 2019, the entire contents of each of which are incorporated herein by reference.

TECHNICAL FIELD

The present disclosure relates to an isolator, a method of manufacturing an isolator, and an electromagnetic wave transmitter.

BACKGROUND ART

An isolator whose transmittance differs depending on the propagation direction of an electromagnetic wave and that includes a non-reciprocal phaser is known (see, for example, PTL 1).

CITATION LIST

Patent Literature

PTL 1: Japanese Unexamined Patent Application Publication No. 2003-302603

SUMMARY OF INVENTION

An isolator according to an embodiment of the present disclosure comprises a substrate having a substrate surface; and a first waveguide and a second waveguide that are positioned at least partially side by side along the substrate surface. The first waveguide includes a first core, the second waveguide includes a second core, and the first core and the second core are surrounded by a dielectric. The first waveguide includes a first end and a second end, and includes a port through which an electromagnetic wave is input and output at each of the first end and the second end. The second waveguide includes a first portion that extends along the first waveguide and a second portion that is not included in the first portion. The second waveguide includes a nonreciprocal member that is in contact with at least a part of the second core of the first portion, and the nonreciprocal member is further in contact with at least a part of the second core of the second portion.

An isolator according to another embodiment of the present disclosure comprises a first waveguide, a second waveguide, and a third waveguide that are positioned along a substrate surface of a substrate. The first waveguide, the second waveguide, and the third waveguide each include a core surrounded by a dielectric. The first waveguide and the second waveguide include a first coupling portion that forms a first directional coupler that acts on an electromagnetic wave in a first mode. The first waveguide and the third waveguide include a second coupling portion that forms a second directional coupler that acts on either of an electromagnetic wave in the first mode and an electromagnetic wave in a second mode that is different from the first mode. The second waveguide includes a nonreciprocal member adjacent to the core of the second waveguide in the first coupling portion, and thereby the first directional coupler does not couple an electromagnetic wave in the first direction and couples an electromagnetic wave in a second direction that is different from the first direction.

An isolator according to a further embodiment of the present disclosure comprises a plurality of waveguides that are positioned along a substrate surface of a substrate; a first port and a second port through which an electromagnetic wave is input and output; and a first directional coupler and a second directional coupler that are disposed between the first port and the second port and each of which is formed between two waveguides. The first directional coupler has nonreciprocity, allows an electromagnetic wave in a first mode that propagates in the first direction to pass through a same waveguide, and transfers an electromagnetic wave in the first mode that propagates in a second direction that is different from the first direction to a different waveguide. The second directional coupler transfers an electromagnetic wave that is in either of the first mode and a second mode different from the first mode and that propagates in any direction to a different waveguide.

BRIEF DESCRIPTION OF DRAWINGS

FIG. 28 is a sectional view taken along line A-A of FIG. 27.

FIG. 31 is a sectional view illustrating an isolator according to another embodiment.

DESCRIPTION OF EMBODIMENTS

Figure 1:
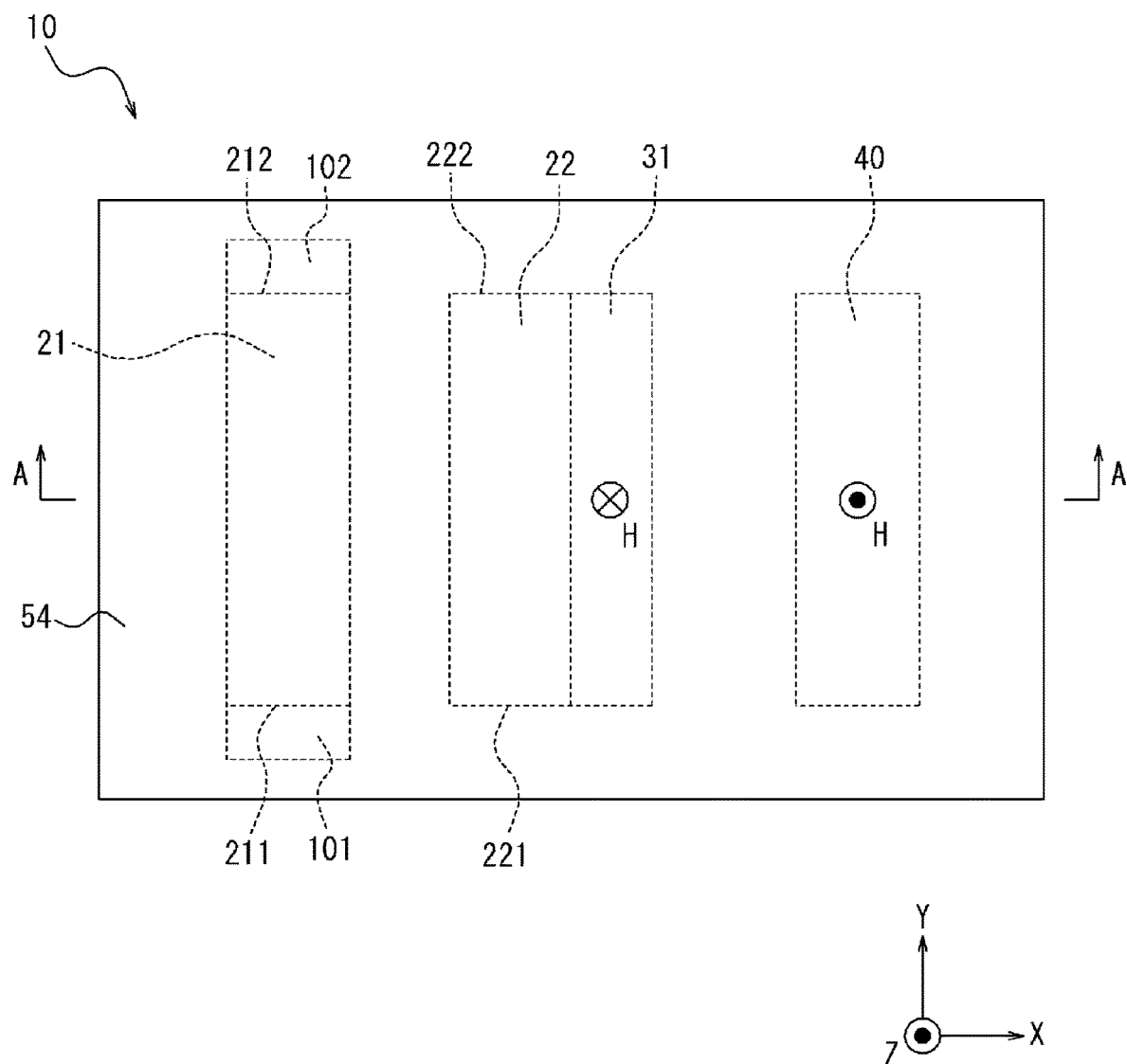
FIG. 1 is a plan view illustrating an example configuration of an isolator according to a first embodiment.

Hereafter, embodiments of the present disclosure will be described with reference to the drawings. The drawings used in the following description are schematic. Dimensions, proportions, and the like in the drawings do not necessarily coincide with actual ones.

First Embodiment

An isolator needs to have a configuration for applying a magnetic field in order that the isolator can function. The configuration for applying a magnetic field may hinder reduction in size of the isolator. It is desirable to reduce the isolator in size. Reduction in size of the isolator can lead to improvement in usability of the isolator.

Example Configuration of Isolator 10

Figure 2:
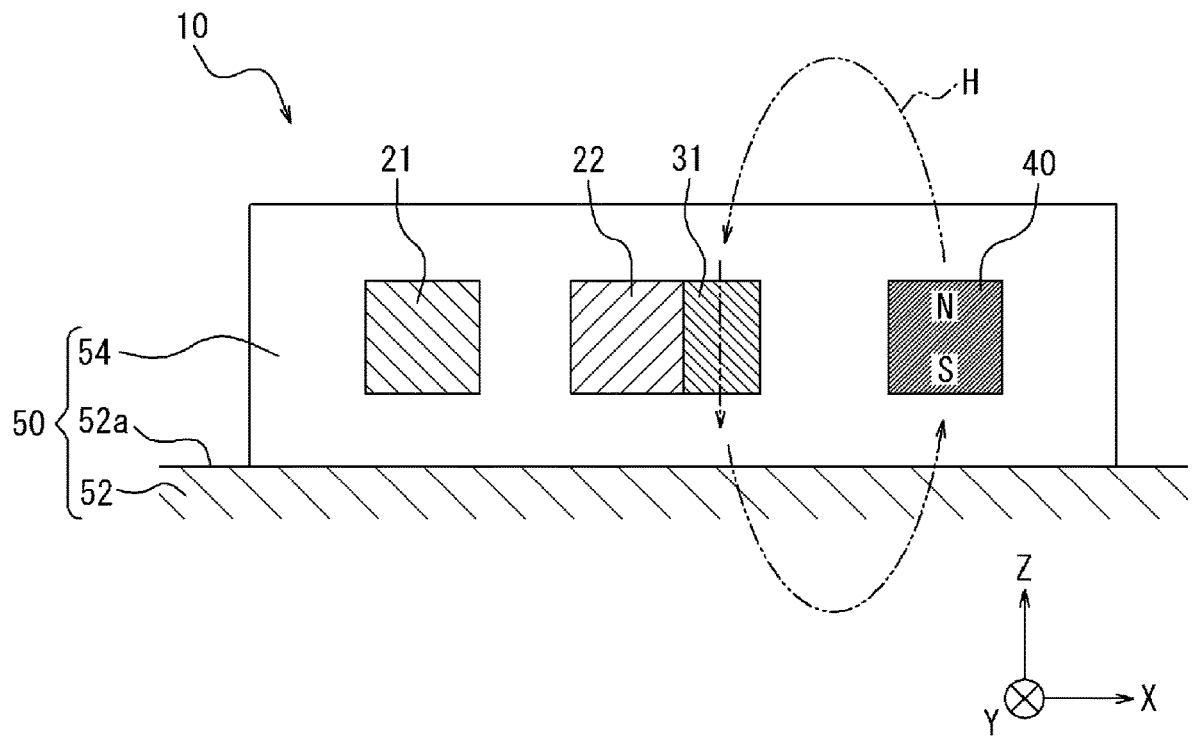
FIG. 2 is a sectional view taken along line A-A of FIG. 1.

As illustrated in FIGS. 1 and 2, an isolator 10 according to an embodiment includes a first core 21, a second core 22, a nonreciprocal member 31, and a magnetic body 40. The isolator 10 allows an electromagnetic wave that is input to a first end 211 of the first core 21 to pass to a second end 212 with a transmittance greater than or equal to a predetermined value, and allows an electromagnetic wave that is input to the second end 212 to pass to the first end 211 with a transmittance less than a predetermined value. That is, the isolator 10 is configured in such a way that the transmittance of an electromagnetic wave from the first end 211 toward the second end 212 is greater than the transmittance of an electromagnetic wave from the second end 212 toward the first end 211. As a result, the isolator 10 can transfer an electromagnetic wave in one direction.

The isolator 10 may be held by a substrate 50. The substrate 50 includes a base material 52 and a cladding 54. The base material 52 has a base material surface 52a. The cladding 54 is in contact with the base material 52 at the base material surface 52a. The base material 52 may include a conductor such as a metal, a semiconductor such as silicon, glass, a resin, or the like. In the present embodiment, the base material 52 is silicon (Si). However, the base material 52 is not limited to this, and may be any other appropriate material.

The cladding 54 may hold the first core 21, the second core 22, the nonreciprocal member 31, and the magnetic body 40. The first core 21, the second core 22, and the cladding 54 each may include a dielectric. The first core 21 and the second core 22 are each also referred to as a dielectric line. The materials of the first core 21, the second core 22, and the cladding 54 are determined in such a way that the relative permittivity of each of the first core 21 and the second core 22 is greater than the relative permittivity of the cladding 54. In other words, the materials of the first core 21, the second core 22, and the cladding 54 are determined in such a way that the refractive index of the cladding 54 is greater than the refractive index of each of the first core 21 and the second core 22. Thus, an electromagnetic wave that propagates in each of the first core 21 and the second core 22 can be totally reflected at the boundary with the cladding 54. As a result, the loss of the electromagnetic wave that propagates in each of the first core 21 and the second core 22 can be reduced. In the present embodiment, the material of each of the first core 21 and the second core 22 is silicon (Si). However, the material is not limited to this, and may be any other appropriate material. The material of the cladding 54 is quartz glass or a silicon oxide film ($SiO_2$). However, the material is not limited to this, and may be any other appropriate material. The relative permittivity of silicon and the relative permittivity of quartz glass are respectively about 12 and about 2. Silicon can propagate an electromagnetic wave having an infrared wavelength in the range of about 1.2 µm to about 6 µm at a low loss. When made of silicon, the first core 21 or the second core 22 can propagate an electromagnetic wave having a wavelength in a 1.3 µm band or a 1.55 µm band, which is used for optical communication, at a low loss.

The relative permittivity of each of the first core 21, the second core 22, and the cladding 54 may be greater than the relative permittivity of air. When the relative permittivity of each of the first core 21, the second core 22, and the cladding 54 is greater than the relative permittivity of air, leakage of an electromagnetic wave from the isolator 10 can be suppressed. As a result, loss due to radiation of an electromagnetic wave from the isolator 10 to the outside can be reduced.

The first core 21 and the second core 22 each extend in the Y-axis direction. The direction in which the first core 21 and the second core 22 extend is also referred to as a first direction. The first core 21 and the second core 22 are positioned side by side in the X-axis direction with the cladding 54 therebetween. The first core 21 and the second core 22 are electromagnetically coupled with each other with the cladding 54 therebetween. The direction in which the first core 21 and the second core 22 are positioned side by side is also referred to as a second direction. The first direction and the second direction intersect each other.

The first core 21 has the first end 211 and the second end 212. The first end 211 is positioned on a side in the negative direction of the Y axis. The second end 212 is positioned on a side in the positive direction of the Y axis. The isolator 10 may further include a first port 101 and a second port 102 through each of which an electromagnetic wave can be input to and output from the first core 21. The first port 101 and the second port 102 each may be an end surface of the first core 21 or may be a coupler that can be connected to an external apparatus and can propagate an electromagnetic wave. The first port 101 is positioned on a side of the first end 211 of the first core 21. The second port 102 is positioned on a side of the second end 212 of the first core 21. An electromagnetic wave input from the first port 101 to the first core 21 propagates toward the second port 102 in the first core 21. An electromagnetic wave input from the second port 102 to the first core 21 propagates toward the first port 101 in the first core 21.

The second core 22 has a first end 221 and a second end 222. The first end 221 is positioned on a side in the negative direction of the Y axis. The second end 222 is positioned on a side in the positive direction of the Y axis.

The first core 21 and the second core 22 may be positioned along each other at least in a part in the extension direction. The first core 21 and the second core 22 may be positioned parallel to each other at least in a part in the extension direction. The first core 21 or the second core 22 may have a linear structure at least in a part thereof. The first core 21 and the second core 22 can be easily formed by having such a simple structure.

The first core 21 and the second core 22 are each also referred to as a waveguide. Two waveguides positioned side by side are also referred to as a parallel waveguide. As described above, the first core 21 and the second core 22 are electromagnetically coupled with each other with the cladding 54 therebetween. That is, the two waveguides included in the parallel waveguide are electromagnetically coupled with each other with the cladding 54 therebetween. Thus, an electromagnetic wave input to one of the waveguides can transfer to the other waveguide while the electromagnetic wave propagates in the one of the waveguides. That is, at least a part of an electromagnetic wave that propagates in the first core 21 can transfer to the second core 22. As a result, even when an electromagnetic wave is not input from the first end 211 and the second end 222 of the second core 22, an electromagnetic wave can propagate in the second core 22. On the other hand, at least a part of an electromagnetic wave that propagates in the second core 22 can transfer to the first core 21. As a result, an electromagnetic wave can transfer between the first core 21 and the second core 22 that are electromagnetically coupled with each other.

In a parallel waveguide, a coupling coefficient refers to a parameter that represents the proportion of the electromagnetic wave that transfers from one waveguide to the other waveguide. If an electromagnetic wave does not transfer from one waveguide to the other waveguide at all, the coupling coefficient is 0. If the entirety of an electromagnetic wave transfers from one of the waveguides to the other waveguide, the coupling coefficient is 1. The coupling coefficient has a value that is greater than or equal to 0 and less than or equal to 1. The coupling coefficient is determined based on the shapes of waveguides, the distance between the waveguides, a length over which the waveguides extend along each other, and the like. For example, the coupling coefficient can be higher as the shapes of waveguides become more similar to each other. The distance between the waveguides may correspond to the distance between the first core 21 and the second core 22.

While propagating in one waveguide, an electromagnetic wave transfers to the other waveguide. Accordingly, the proportion of an electromagnetic wave that transfers between the waveguides changes in accordance with the distance over which the electromagnetic wave propagates. That is, the coupling coefficient changes in accordance with the distance over which an electromagnetic wave propagates in the waveguides. The maximal value of the coupling coefficient can be determined based on the shapes of the waveguides, the distance between the waveguides, or the like. The maximal value of the coupling coefficient may be less than or equal to 1.

In a parallel waveguide, the coupling coefficient at the start point of an interval in which the waveguides extend along each other is 0. The length from the start point to a position where the coupling coefficient has a maximal value is also referred to as the coupling length. When the length over which the waveguides extend along each other is equal to the coupling length, the coupling coefficient at the end point of the interval in which the waveguides extend along each other can have a maximal value. The coupling length can be determined based on the shapes of the waveguides, the distance between the waveguides, or the like.

An electromagnetic wave that has transferred from the first core 21 to the second core 22 propagates also in the second core 22 in a direction that is the same as the propagation direction in the first core 21. When the electromagnetic wave reaches the first end 221 or the second end 222 of the second core 22, the electromagnetic wave may be radiated from the first end 221 or the second end 222 or may be reflected at the first end 221 or the second end 222 and may propagate in the opposite direction.

The nonreciprocal member 31 extends in the Y-axis direction and is positioned side by side with the second core 22. The nonreciprocal member 31 may be in contact with at least a part of the second core 22. The nonreciprocal member 31 may be positioned on a side in the positive direction of the X axis with respect to the second core 22. That is, the nonreciprocal member 31 need not be positioned between the first core 21 and the second core 22. Thus, electromagnetic coupling between the first core 21 and the second core 22 is strengthened.

As illustrated in FIG. 2, in a cross section intersecting the Y axis, the shape of the second core 22 and the shape of the nonreciprocal member 31 are not point-symmetric. The shape of the second core 22 and the shape of the nonreciprocal member 31 need not be line-symmetric, either. In can be said that the second core 22 and the nonreciprocal member 31 form an asymmetric core.

The degree of symmetry can be used as an indicator of whether a cross section of an asymmetric core is close to point symmetry or not. The degree of symmetry may be represented by the proportion of a coinciding portion that is included in both of the cross-sectional shape of an asymmetric core and the cross-sectional shape of the asymmetric core that is obtained by rotation by 180 degrees around a predetermined point. It can be said that a cross-sectional shape having high degree of symmetry is close to point symmetry. The degree of symmetry of the cross-sectional shape of the asymmetric core may be low.

In the cross section of the asymmetric core, the area of the second core 22 may be greater than the area of the nonreciprocal member 31. In this case, in an electromagnetic wave that propagates in the asymmetric core, the proportion of the electromagnetic wave that propagates in the second core 22 increases. As a result, the loss of an electromagnetic wave in the asymmetric core can be reduced.

In the cross section of the asymmetric core, the second core 22 each may be positioned in a portion where the intensity of the electromagnetic wave that propagates in the asymmetric core is the maximum. In this case, a portion of an electromagnetic wave having a high intensity can propagate in the second core 22. As a result, the loss of an electromagnetic wave in the asymmetric core can be reduced.

The first core 21 and the asymmetric core may satisfy waveguide conditions in a single mode. When the first core 21 and the asymmetric core satisfy the waveguide conditions in a single mode, the waveform of a signal that propagates in the first core 21 and the asymmetric core does not collapse easily. The isolator 10, which includes a combination of the first core 21 and the asymmetric core that satisfy the waveguide conditions in a single mode, can be suitable for optical communication.

The relative permittivity of each of the first core 21 or the second core 22 may be distributed uniformly in the X-axis direction or in the Z-axis direction, or may be distributed in such a way as to change in the X-axis direction or in the Z-axis direction. For example, the relative permittivity of the first core 21 may be distributed in such a way as to be the largest in a central portion in the X-axis direction and to decrease with decreasing distance to the cladding 54. In this case, the first core 21 can propagate an electromagnetic wave based on a principle similar to that of a graded-index optical fiber.

An electromagnetic wave that is input from the first end 211 of the first core 21 via the first port 101 propagates toward the second end 212. That is, the electromagnetic wave propagates in the first core 21 in the positive direction of the Y axis. The direction from the first end 211 toward the second end 212 is also referred to as a direction S12. An electromagnetic wave that propagates in the first core 21 transfers to the second core 22 with a proportion in accordance with a coupling coefficient that is based on the distance over which the electromagnetic wave has propagated in the first core 21 in the direction S12. The coupling coefficient in a case where an electromagnetic wave propagates in the first core 21 in the direction S12 is also referred to as a first coupling coefficient.

An electromagnetic wave that is input from the second end 212 of the first core 21 via the second port 102 propagates toward the first end 211. That is, the electromagnetic wave propagates in the first core 21 in the negative direction of the Y axis. The direction from the second end 212 toward the first end 211 is also referred to as a direction S21. An electromagnetic wave that propagates in the first core 21 transfers to the second core 22 with a proportion in accordance with a coupling coefficient that is based on the distance over which the electromagnetic wave has propagated in the first core 21 in the direction S21. The coupling coefficient in a case where an electromagnetic wave propagates in the first core 21 in the direction S21 is also referred to as a second coupling coefficient.

The asymmetric core including the second core 22 has propagation characteristics that differ between a case where an electromagnetic wave propagates in the direction S12 and a case where an electromagnetic wave propagates in the direction S21. When the propagation characteristics of the asymmetric core differ based on the propagation direction of an electromagnetic wave, the first coupling coefficient and the second coupling coefficient differ from each other. That is, the nonreciprocal member 31 makes the first coupling coefficient and the second coupling coefficient differ from each other.

The nonreciprocal member 31 may be made of a material having propagation characteristics that differ between a case where an electromagnetic wave propagates in the direction S12 and a case where an electromagnetic wave propagates in the direction S21. A material having different propagation characteristics depending on the propagation direction of an electromagnetic wave is also referred to as a nonreciprocal material. The nonreciprocal member 31 may include, as a nonreciprocal material, a magnetic material such as magnetic garnet, ferrite, iron, or cobalt. The relative permittivity of the nonreciprocal member 31 can be represented by a tensor as shown in expression (1).

[Math 1]

$$\varepsilon_r = \begin{bmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{bmatrix} \quad (1)$$

Each element of the tensor may be represented by a complex number. Numbers used as the index of each element may correspond to the X axis, the Y axis, and the Z axis. A tensor that has complex numbers as elements thereof and that represents a relative permittivity is also referred to as a dielectric constant tensor.

The nonreciprocal member 31 may include a nonreciprocal material with a predetermined concentration. The predetermined concentration may change in a cross section intersecting the Y axis. The predetermined concentration may change at least in a part seen in the polarization direction of an electromagnetic wave that is input to the isolator 10.

As illustrated in FIG. 2, the nonreciprocal member 31 may be positioned in such a way as to be biased toward a side in the positive direction of the X axis with respect to the second core 22. The nonreciprocal member 31 has a relative permittivity that is represented by a complex relative-permittivity tensor. The difference between the phase of an electromagnetic wave that propagates in the direction S12 in the asymmetric core, including the second core 22 and the nonreciprocal member 31, and the phase of an electromagnetic wave that propagates in the direction S21 in the asymmetric core is also referred to as the phase difference. The phase difference increases as the degree of symmetry of the asymmetric core decreases. As the phase difference increases, the nonreciprocity of the electromagnetic-wave propagation characteristics in the asymmetric core increases.

The nonreciprocal member 31 can exhibit nonreciprocity when a magnetic field in a predetermined direction is applied. The predetermined direction may be determined based on the cross-sectional shape or the degree of symmetry of the asymmetric core. The isolator 10 causes the asymmetric core to exhibit nonreciprocity by applying a magnetic field H generated by the magnetic body 40 to the nonreciprocal member 31. The magnetic body 40 may be a ferromagnetic material such as iron, cobalt, or nickel. The magnetic body 40 may be formed by magnetizing the ferromagnetic material. The magnetic body 40 may be, for example, a permanent magnet such as a ferrite magnet or a neodymium magnet.

Figure 3:
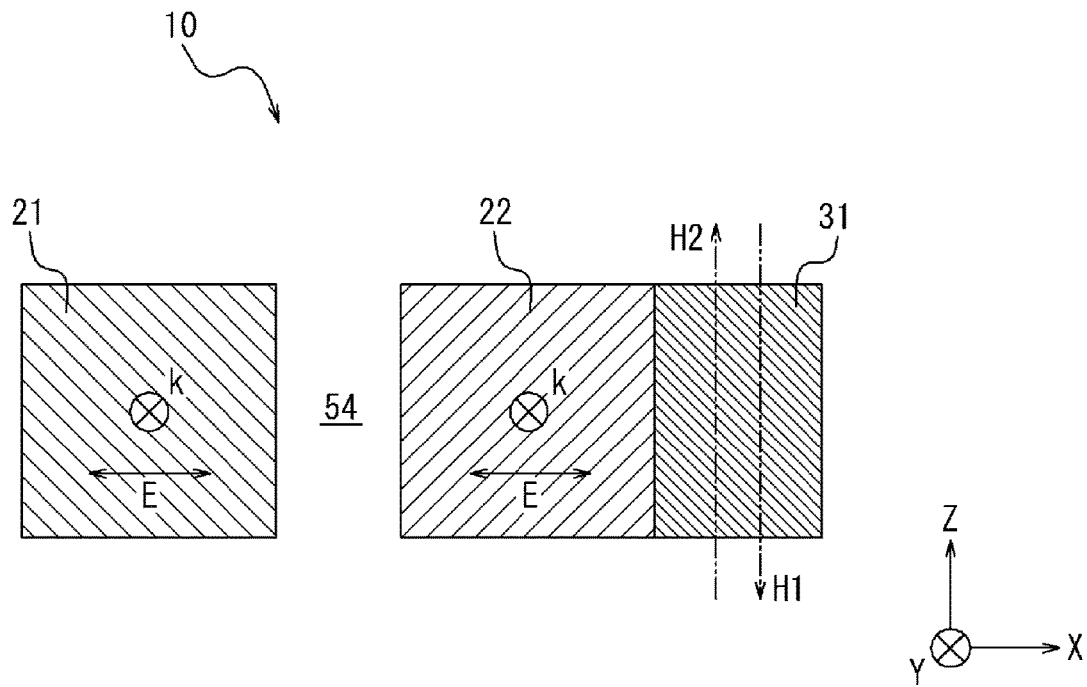
FIG. 3 illustrates the relationship between the position of a nonreciprocal member and the orientation of a magnetic field.

Referring to FIG. 3, the phase difference between a waveguide that has nonreciprocity and a waveguide that does not have nonreciprocity will be described. The first core 21 corresponds to a waveguide that does not have nonreciprocity. The asymmetric core, including the second core 22 and the nonreciprocal member 31, corresponds to a waveguide that has nonreciprocity. It is assumed that, in each of the first core 21 and the asymmetric core, an electromagnetic wave propagates in the direction S12, which corresponds to the positive direction of the Y axis, as represented as a wave number vector k. It is assumed that the electromagnetic wave has an electric field component along the X axis, as represented as an electric field vector E. It is assumed that, in the asymmetric core, the nonreciprocal member 31 is positioned on a side in the positive direction of the X axis with respect to the second core 22.

The asymmetric core exhibits nonreciprocity when a magnetic field H1 or H2 that intersects the wave number vector k and the electric field vector E is applied as a magnetic field H to the nonreciprocal member 31. The magnetic field H is generated by the magnetic body 40. When the asymmetric core exhibits nonreciprocity, the phase of an electromagnetic wave that propagates in the asymmetric core is advanced or delayed with respect to the phase of an electromagnetic wave that propagates in the first core 21 in the direction S12. The magnitude of nonreciprocity exhibited by the asymmetric core corresponds to the magnitude of delay or advance in phase of an electromagnetic wave that propagates. The magnitude of delay or advance in phase of an electromagnetic wave that propagates is determined based on the magnitude of a component, in the magnetic field, in a direction perpendicular to the wave number vector k and the electric field vector E. The direction perpendicular to the wave number vector k and the electric field vector E is also referred to as a third direction.

The magnetic field H applied to a portion where the nonreciprocal member 31 is positioned includes a component in the third direction and the other components. The position of the magnetic body 40 in the isolator 10 is determined in such a way that the component in the third direction is greater than any of the other components. Thus, the asymmetric core can easily exhibit nonreciprocity.

Whether the phase of an electromagnetic wave that propagates is advanced or delayed is determined by the orientation of the magnetic field H applied to the nonreciprocal member 31. For example, it is assumed that the phase of an electromagnetic wave that propagates in the asymmetric core is advanced when the magnetic field H1 in the negative direction of the Z axis is applied to the nonreciprocal member 31. In the above assumption, the phase of an electromagnetic wave that propagates in the asymmetric core is delayed when the orientation of the magnetic field H is changed to the magnetic field H2 in the positive direction of the Z axis.

When the direction of the electric field vector E is horizontal, whether the phase of an electromagnetic wave that propagates is advanced or delayed is determined by whether the nonreciprocal member 31 is positioned on the right side or on the left side of the second core 22 with respect to the orientation of the wave number vector k. For example, as illustrated in FIG. 3, it is assumed that the phase of an electromagnetic wave is advanced when the electromagnetic wave propagates in the direction S12 corresponding to the positive direction of the Y axis, the nonreciprocal member 31 is positioned on the right side of the second core 22 with respect to the propagation direction of the electromagnetic wave, and the magnetic field H1 is applied to the nonreciprocal member 31. In the above assumption, when the position of the nonreciprocal member 31 is changed to the left side of the second core 22, the phase of the electromagnetic wave that propagates in the asymmetric core in the direction S12 is delayed. In the example configuration illustrated in FIG. 3, when an electromagnetic wave travels oppositely in the direction S21, the nonreciprocal member 31 is positioned on the left side as seen in the propagation direction of the electromagnetic wave. Accordingly, when it is assumed that the phase of an electromagnetic wave is advanced when the electromagnetic wave propagates in the direction S12, the phase of an electromagnetic wave is delayed when the electromagnetic wave propagates in the direction S21. Conversely, when it is assumed that the phase of an electromagnetic wave is delayed when the electromagnetic wave propagates in the direction S12, the phase of an electromagnetic wave is advanced when the electromagnetic wave propagates in the direction S21. Thus, the asymmetric core exhibits nonreciprocity.

When one of the waveguides of a parallel waveguide exhibits nonreciprocity, the period of a position where the first coupling coefficient has a maximal value and the period of a position where the second coupling coefficient has a maximal value can differ from each other. That is, in the isolator 10, the coupling length from the side of the first end 211 of the first core 21 as the start point and the coupling length from the side of the second end 212 of the first core 21 as the start point can differ from each other. When the coupling length differs in accordance with the propagation direction of an electromagnetic wave, the difference between the first coupling coefficient and the second coupling coefficient changes in accordance with a position in the extension direction of the parallel waveguide.

As the first coupling coefficient at the end point of a range in which the first core 21 and the asymmetric core electromagnetically couple with each other increases, in an electromagnetic wave that is input to the first core 21 and propagates in the direction S12, the proportion of the electromagnetic wave that transfers to the second core 22 and reaches the second end 222 of the second core 22 increases. Conversely, in an electromagnetic wave that is input to the first core 21 and propagates in the direction S12, the proportion of the electromagnetic wave that reaches the second end 212 of the first core 21 and is output from the second port 102 decreases. That is, the ratio of the intensity of an electromagnetic wave output from the second port 102 to the intensity of an electromagnetic wave input to the first port 101 decreases. The ratio of the intensity of an electromagnetic wave output from the second port 102 to the intensity of an electromagnetic wave input to the first port 101 is also referred to as the transmittance with respect to an electromagnetic wave that propagates in the direction S12. As seen from an electromagnetic wave that propagates in the direction S12, the end point of the range in which the first core 21 and the asymmetric core electromagnetically couple with each other corresponds to an end of the range on the second end 212 side.

When the first coupling coefficient at the end point of the range in which the first core 21 and the asymmetric core electromagnetically couple with each other is large, the transmittance with respect to an electromagnetic wave that propagates in the direction S12 can be low. On the other hand, when the first coupling coefficient at the end point of the range in which the first core 21 and the asymmetric core electromagnetically couple with each other is small, the proportion of the electromagnetic wave that transfers to the second core 22 is small, and therefore the transmittance with respect to an electromagnetic wave that propagates in the direction S12 can be high.

An electromagnetic wave that is input from the second port 102 to the first core 21 and propagates in the direction S21 can receive an action that is the same as an action that an electromagnetic wave that propagates in the direction S12 receives from the isolator 10. Due to the action, a part of the electromagnetic wave that propagates in the direction S21 reaches the first end 221 of the second core 22. As the second coupling coefficient at the end point of the range in which the first core 21 and the asymmetric core electromagnetically couple with each other increases, the transmittance with respect to an electromagnetic wave that propagates in the direction S21 decreases. As seen from an electromagnetic wave that propagates in the direction S21, the end point of the range in which the first core 21 and the asymmetric core electromagnetically couple with each other corresponds to an end of the range on the first end 211 side.

When the first coupling coefficient and the second coupling coefficient differ from each other at the end point of the range in which the first core 21 and the asymmetric core electromagnetically couple with each other, the transmittance with respect to an electromagnetic wave that propagates in the direction S12 and the transmittance with respect to an electromagnetic wave that propagates in the direction S21 can differ from each other. That is, by making the first coupling coefficient and the second coupling coefficient differ from each other, the isolator 10 functions to make it easy for an electromagnetic wave to propagate in one direction and to make it difficult for an electromagnetic wave to propagate in the opposite direction. When the second coupling coefficient is greater than the first coupling coefficient at the end point of the range in which the first core 21 and the asymmetric core electromagnetically couple with each other, the isolator 10 can function to make it easy for an electromagnetic wave to propagate in the direction S12 and to make it difficult for an electromagnetic wave to propagate in the direction S21. When the second coupling coefficient and the first coupling coefficient at the end point of the range in which the first core 21 and the asymmetric core electromagnetically couple with each other are respectively approximately 0 and approximately 1, the difference between the transmittance with respect to an electromagnetic wave that propagates in the direction S12 and the transmittance with respect to an electromagnetic wave that propagates in the direction S21 can be made large. As a result, the function of the isolator 10 can be improved.

In the isolator 10, the difference between transmittances in accordance with the propagation direction of an electromagnetic wave increases as the difference between the first coupling coefficient and the second coupling coefficient at the end point of the range in which the first core 21 and the asymmetric core electromagnetically couple with each other increases. For example, the lengths of the first core 21 and the asymmetric core may be determined in such a way that the difference between the first coupling coefficient and the second coupling coefficient at the end point of the range in which the first core 21 and the asymmetric core electromagnetically couple with each other has a maximal value. In this case, the difference between transmittances in accordance with the propagation direction of an electromagnetic wave in the isolator 10 can have a maximal value. By adjusting the degree of nonreciprocity of the asymmetric core, the difference between the first coupling coefficient and the second coupling coefficient at the end point of the range in which the first core 21 and the asymmetric core electromagnetically couple with each other may be adjusted.

When one of the waveguides of a parallel waveguide has nonreciprocity, the coupling length of the parallel waveguide with respect to an electromagnetic wave that propagates in the direction S12 can differ from the coupling length of the parallel waveguide with respect to an electromagnetic wave that propagates in the direction S21. Let $L_1$ denote the coupling length with respect to an electromagnetic wave that propagates in the isolator 10 in the direction S12. Let $L_2$ denote the coupling length with respect to an electromagnetic wave that propagates in the isolator 10 in the direction S21. The isolator 10 may be configured in such a way that $L_1$ and $L_2$ differ from each other.

When the length over which two waveguides electromagnetically couple with each other in a parallel waveguide is equal to the coupling length, the coupling coefficient can have a maximal value. When the length over which the two waveguides electromagnetically couple with each other is $L_1$, the first coupling coefficient at the end point of a range in which the two waveguides electromagnetically couple with each other can have a maximal value. When the length over which the two waveguides electromagnetically couple with each other is equal to twice the coupling length, the coupling coefficient can have a minimal value. When the length over which the two waveguides electromagnetically couple with each other is $2L_1$, the first coupling coefficient at the end point of a range in which the two waveguides electromagnetically couple with each other can have a minimal value.

When the length over which the two waveguides electromagnetically couple with each other is an odd multiple of $L_1$, the first coupling coefficient at the end point of a range in which the two waveguides electromagnetically couple with each other can have a maximal value. When the length over which the two waveguides electromagnetically couple with each other is an even multiple of $L_1$, the first coupling coefficient at the end point of the range in which the two waveguides electromagnetically couple with each other can have a minimal value. The second coupling coefficient at the end point of the range in which the two waveguides electromagnetically couple with each other can have a maximal value and a minimal value, respectively, in the case where the length over which the two waveguides electromagnetically couple with each other is an odd multiple of $L_2$ and in the case where the length is an even multiple of $L_2$. $L_1$ and $L_2$ are each a length that can be the minimum coupling length of a parallel waveguide and also referred to as a unit coupling length. That is, the coupling length may be an odd multiple of the unit coupling length.

The first coupling coefficient and the second coupling coefficient can be adjusted by adjusting the length of the range in which the first core 21 and the asymmetric core electromagnetically couple with each other. The length of the range in which the first core 21 and the asymmetric core electromagnetically couple with each other may be substantially the same as an odd multiple of the unit coupling length with respect to an electromagnetic wave that propagates in the direction S21. In this case, the second coupling coefficient at the end point of the range in which the first core 21 and the asymmetric core electromagnetically couple with each other can be made large. The length of the range in which the first core 21 and the asymmetric core electromagnetically couple with each other may be substantially the same as an even multiple of the unit coupling length with respect to an electromagnetic wave that propagates in the direction S12. In this case, the first coupling coefficient at the end point of the range in which the first core 21 and the asymmetric core electromagnetically couple with each other can be made small. In this case, the second coupling coefficient can be made greater than the first coupling coefficient at the end point of the range in which the first core 21 and the asymmetric core electromagnetically couple with each other.

The propagation mode of an electromagnetic wave in a parallel waveguide can include an even mode and an odd mode. The even mode is a mode in which the electric fields of electromagnetic waves that propagate in the waveguides of a parallel waveguide are oriented in the same direction. The odd mode is a mode in which the electric fields of electromagnetic waves that propagate in the waveguides of a parallel waveguide are oriented in opposite directions. An electromagnetic wave can propagate in a parallel waveguide based on the effective refractive index of the parallel waveguide. The effective refractive index of the parallel waveguide is determined based on the shape of each waveguide of the parallel waveguide, the relative permittivity of the material of the waveguide, the propagation mode of an electromagnetic wave, or the like. The effective refractive index of a parallel waveguide when an electromagnetic wave propagates in the even mode is referred to as the even-mode refractive index. The effective refractive index of a parallel waveguide when an electromagnetic wave propagates in the odd mode is referred to as the odd-mode refractive index. Let $n_{even}$ and $n_{odd}$ denote the even-mode refractive index and the odd-mode refractive index, respectively. The coupling length of the parallel waveguide can be represented by the following expression (2).

[Math 2]

$$L = \frac{m\lambda_0}{2 \cdot |n_{even} - n_{odd}|} \qquad (2)$$

(L: coupling length, m: odd number, $\lambda_0$: wavelength in vacuum)

The amount of an electromagnetic wave that is input from one port of the isolator 10 and that is not output from the other port is also referred to as the attenuation amount. When the attenuation amount of an electromagnetic wave is large, it can be said that the transmittance of the electromagnetic wave is low. The attenuation amounts of electromagnetic waves that propagate in the isolator 10 in the direction S12 and in the direction S21 can be calculated by performing simulation using a finite element method or the like. The isolator 10 can function in such a way that, regarding an electromagnetic wave having a predetermined frequency, the attenuation amount of an electromagnetic wave that propagates in the direction S12 and the attenuation amount of an electromagnetic wave that propagates in the direction S21 differ from each other. A predetermined frequency band for which the isolator 10 can function in such a way that the attenuation amount differs in accordance with the propagation direction of an electromagnetic wave is also referred to as the operation frequency the isolator 10. The operation frequency of the isolator 10 can be determined in any manner based on the configuration of the isolator 10. That is, at any operation frequency, the first coupling coefficient at the end point of the range in which the first core 21 and the asymmetric core electromagnetically couple with each other can be made greater than the second coupling coefficient.

The isolator 10 may further include antennas that radiate electromagnetic waves at the first end 221 and the second end 222 of the second core 22. The antennas can efficiently radiate electromagnetic waves that have reached the first end 221 and the second end 222. With the antennas, electromagnetic waves are not likely to be reflected at the first end 221 and the second end 222. As a result, the function of the isolator 10 can be improved.

The second core 22 may have a cut surface at each of the first end 221 and the second end 222. The cut surface may function as an antenna. The cut surface may be configured in such a way that the orientation of the normal vector thereof is inclined with respect to the Y axis. In other words, the normal vector of the cut surface may intersect the propagation direction of an electromagnetic wave in the second core 22. The angle between the orientation of the normal vector of the cut surface and the Y axis may be close to 90 degrees. When the angle between the orientation of the normal vector of the cut surface and the Y axis is close to 90 degrees, the second core 22 has a tapered shape whose thickness gradually decreases at each of the first end 221 and the second end 222. As a result, the reflectance of an electromagnetic wave at the first end 221 and the second end 222 can be reduced.

The isolator 10 may further include electromagnetic wave absorbers outside of the first end 221 and the second end 222 of the second core 22. The electromagnetic wave absorbers absorb electromagnetic waves radiated from the first end 221 and the second end 222. In this case, electromagnetic waves radiated from the isolator 10 are not likely to affect other circuits that are positioned around the isolator 10.

In the isolator 10 illustrated in FIGS. 1 and 2, the magnetic body 40 is positioned farther than the second core 22 as seen from the first core 21. The magnetization direction of the magnetic body 40 is along the Z axis. Due to this disposition, the magnetic field H intersecting the wave number vector k and the electric field vector E is applied to the nonreciprocal member 31. The position of the magnetic body 40 is determined in such a way that a component in the third direction of the magnetic field H is greater than any of the other components.

Figure 4:
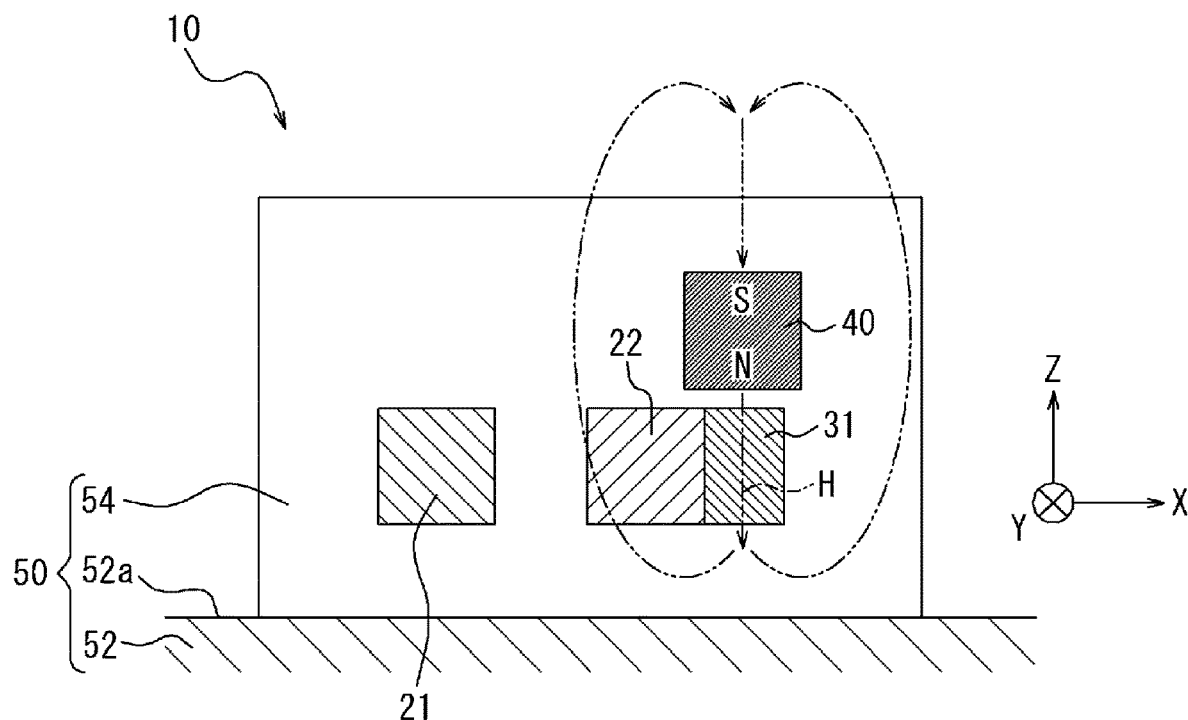
FIG. 4 is a sectional view illustrating an example configuration in which a magnetic body is positioned to overlap a nonreciprocal member.

The configuration of the isolator 10 is not limited to the configuration illustrated in FIGS. 1 and 2. The isolator 10 may have any appropriate configuration. For example, as illustrated in FIG. 4, the magnetic body 40 may be positioned in such a way as to overlap the nonreciprocal member 31 when the isolator 10 is seen in a plan view from the third direction. The magnetization direction of the magnetic body 40 is the third direction. Also in this case, a component in the third direction of the magnetic field H can be greater than any of the other components.

Figure 5:
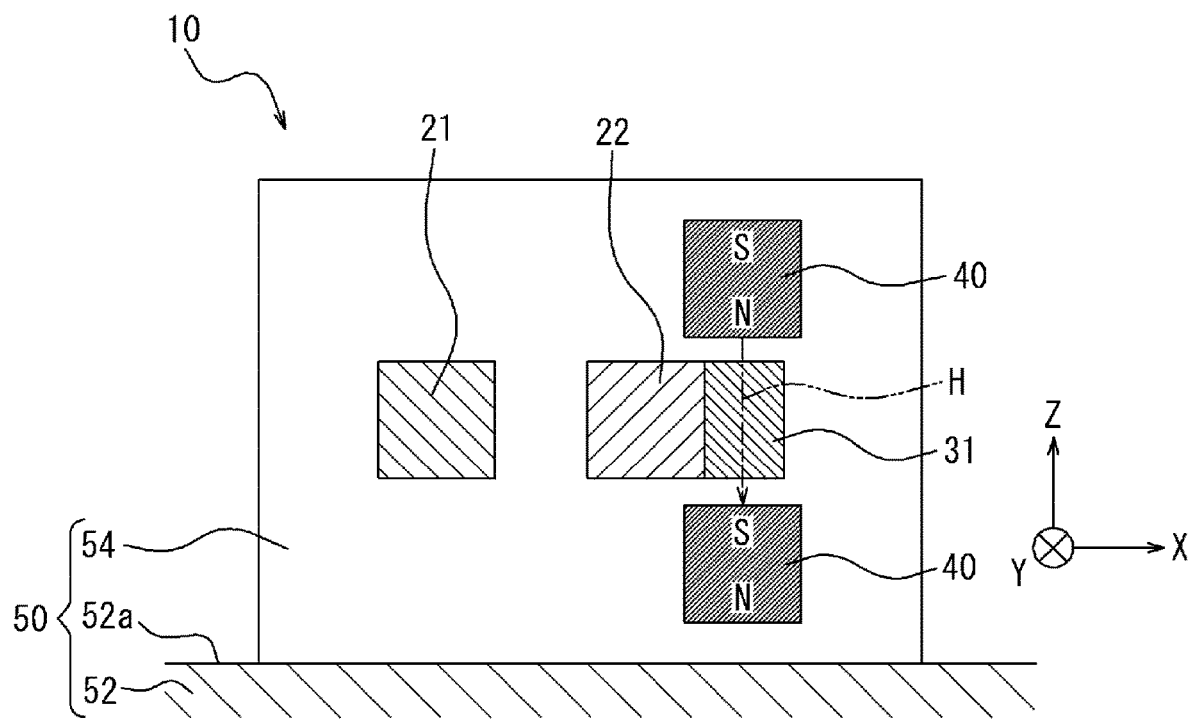
FIG. 5 is a sectional view illustrating an example configuration in which magnetic bodies are positioned with a nonreciprocal member interposed therebetween.

As illustrated in FIG. 5, the magnetic body 40 may include a first magnetic body that is positioned further on a side in the positive direction of the Z axis than the nonreciprocal member 31 and a second magnetic body that is positioned further on a side in the negative direction of the Z axis than the nonreciprocal member 31. The first magnetic body is positioned on one side of the nonreciprocal member 31 in the third direction. The second magnetic body is positioned on a side of the nonreciprocal member 31 opposite to the side on which the first magnetic body is positioned in the third direction. The magnetization directions of the first magnetic body and the second magnetic body are in the third direction and in the same orientation. Also in this case, a component in the third direction of the magnetic field H can be greater than any of the other components. When the magnetic bodies 40 are positioned with the nonreciprocal member 31 interposed therebetween, the magnetic field H applied to the nonreciprocal member 31 is not likely to be affected by a magnetic field around the isolator 10.

In the configuration illustrated in FIGS. 4 and 5, the cladding 54 is positioned between the magnetic bodies 40 and the nonreciprocal member 31. The magnetic bodies 40 may be in contact with the nonreciprocal member 31. In this case, the magnetic field H applied to the nonreciprocal member 31 can be made large.

Other Example Configurations Including Isolator 10

Figure 6:
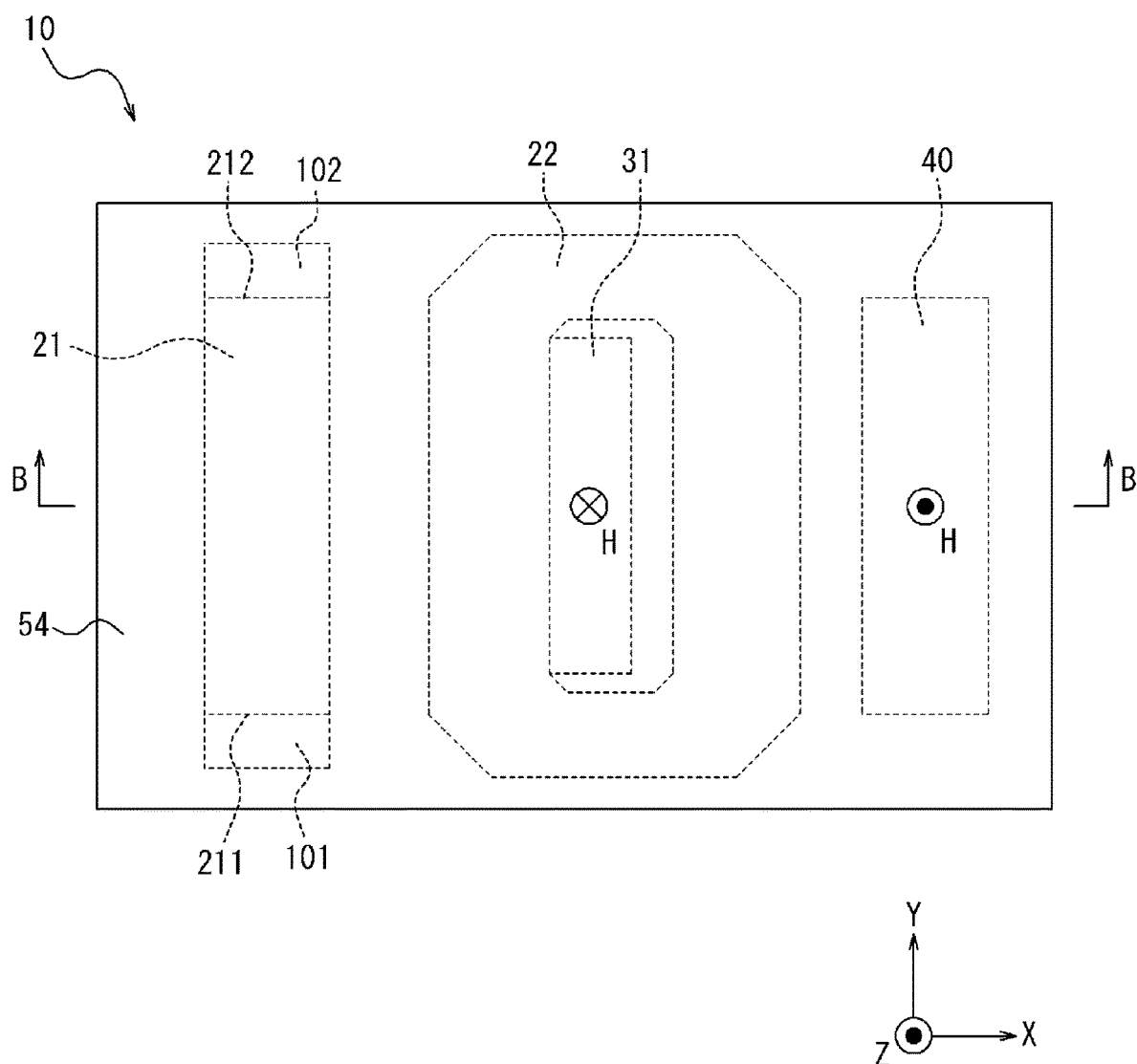
FIG. 6 is a plan view illustrating an example configuration in which a second core has an annular shape.
Figure 7:
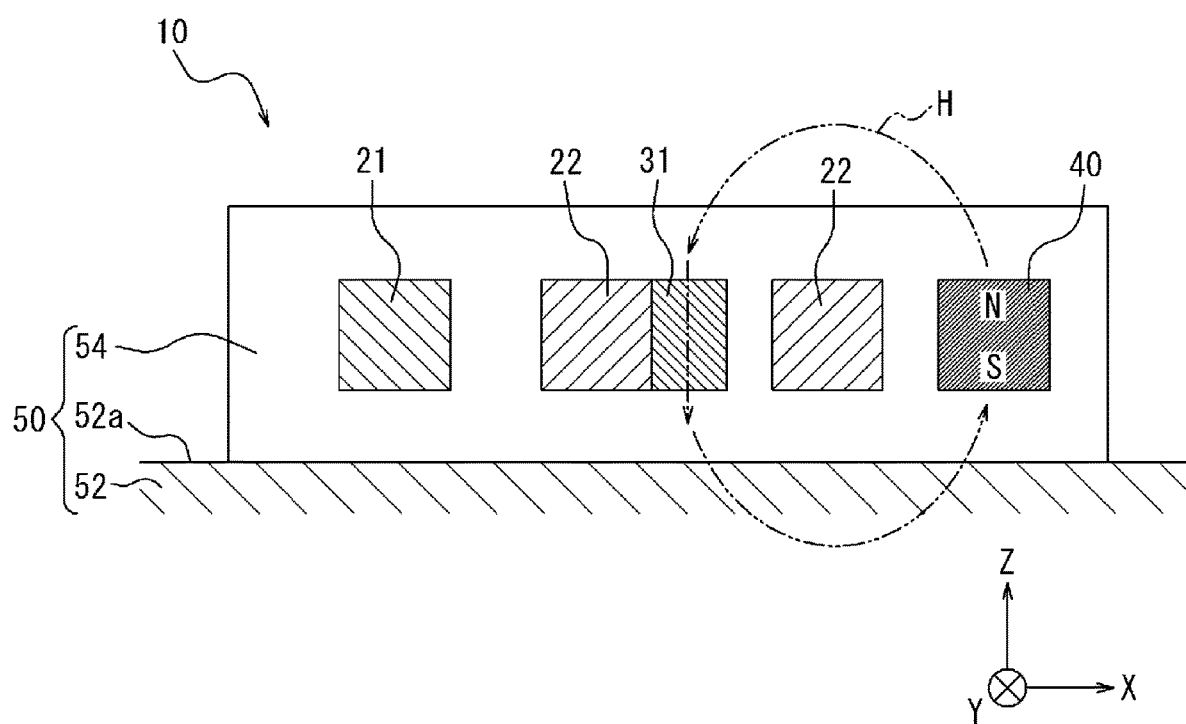
FIG. 7 is a sectional view taken along line B-B of FIG. 6.

As illustrated in FIG. 6 and FIG. 7, in an isolator 10 according to an embodiment, the second core 22 may have an annular shape and may be optically continuous without a gap. That is, the second core 22 need not have any end portion. An asymmetric core including the second core 22 having such a configuration can exhibit greater nonreciprocity compared with a configuration in which the second core 22 has an end portion. Moreover, the range in which the first core 21 and the second core 22 electromagnetically couple with each other can be made short. As a result, the isolator 10 can be reduced in size.

Figure 8:
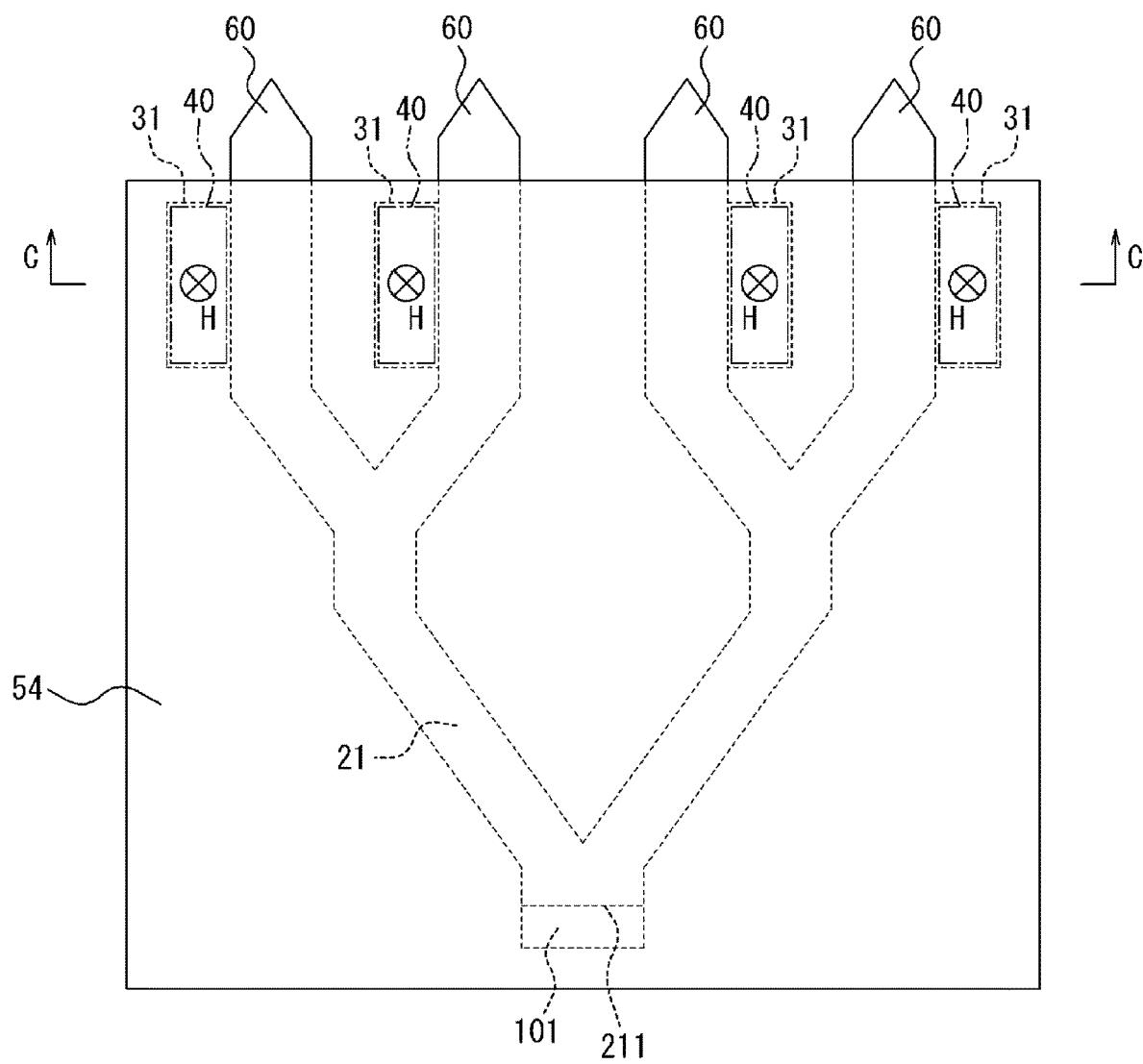
FIG. 8 is a plan view illustrating an example configuration in which an isolator is connected to an array antenna.
Figure 9:
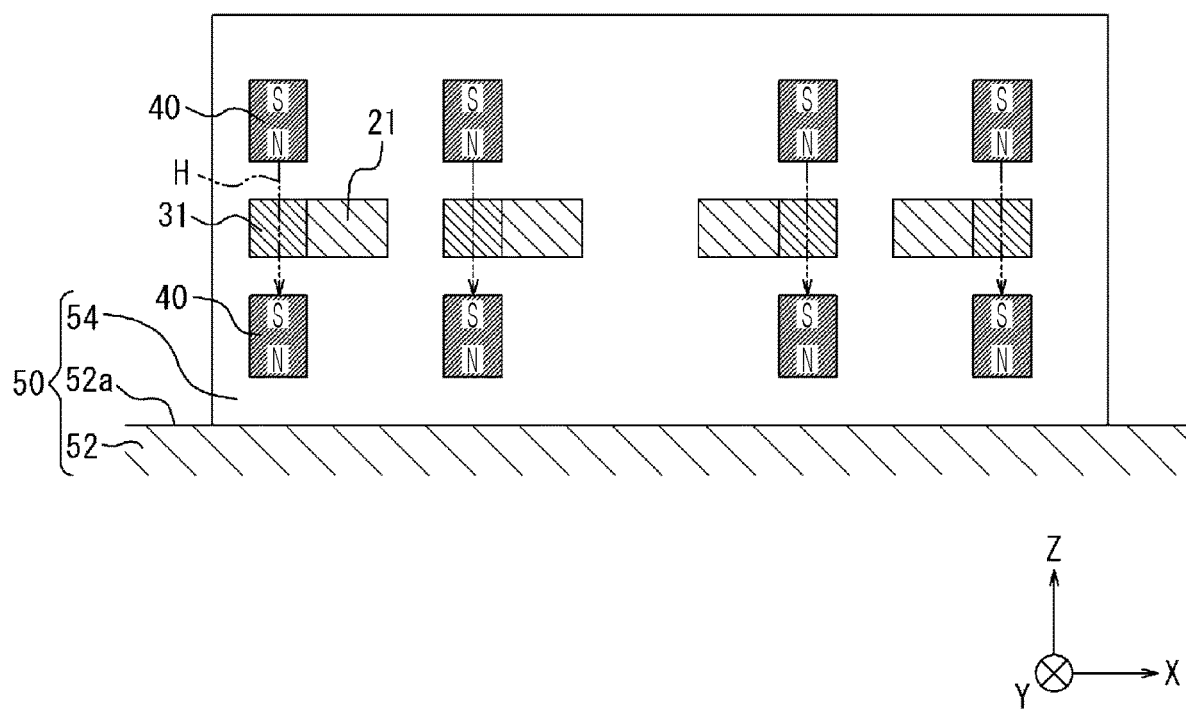
FIG. 9 is a sectional view taken along line C-C of FIG. 8.

As illustrated in FIGS. 8 and 9, an isolator 10 according to an embodiment may be connected to an array antenna 60. The array antenna 60 includes a plurality of antenna elements and can control the directivity of an electromagnetic wave radiated by each antenna element by controlling the phase of the electromagnetic wave. A waveguide that connects each antenna element and the first port 101 and through which an electromagnetic wave propagates includes the first core 21. At least a part of the waveguide connected to each antenna element is configured as an asymmetric core including the first core 21 and the nonreciprocal member 31. Thus, the isolator 10 causes the asymmetric core to exhibit nonreciprocity, and thereby can advance or delay the phase of an electromagnetic wave that propagate to each antenna element. As a result, the array antenna 60 can control the phase with a simple configuration and can be reduced in size.

Other Example Configurations of Isolator 10

Figure 10:
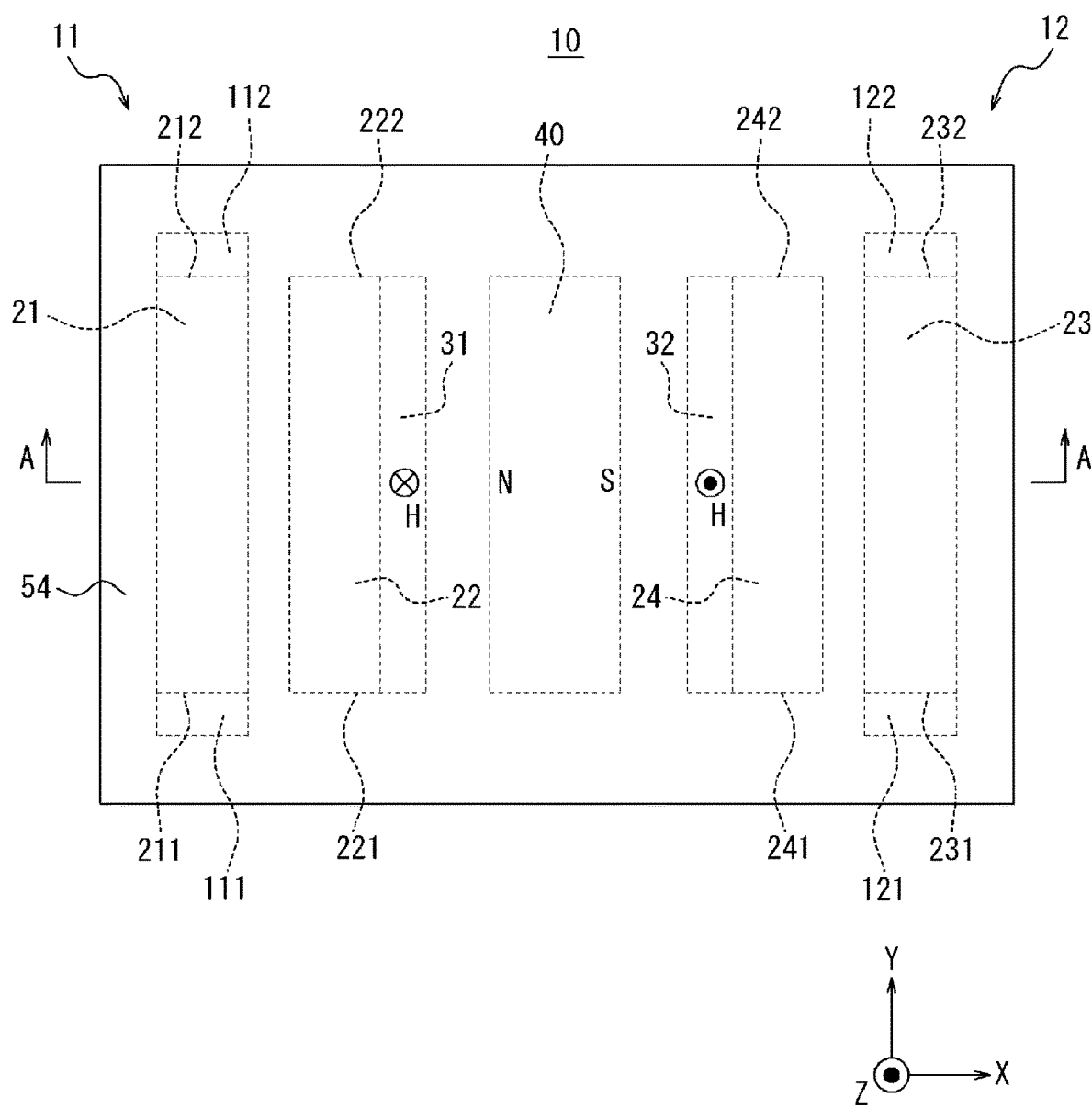
FIG. 10 is a plan view illustrating an example configuration of an isolator according to an embodiment.
Figure 11:
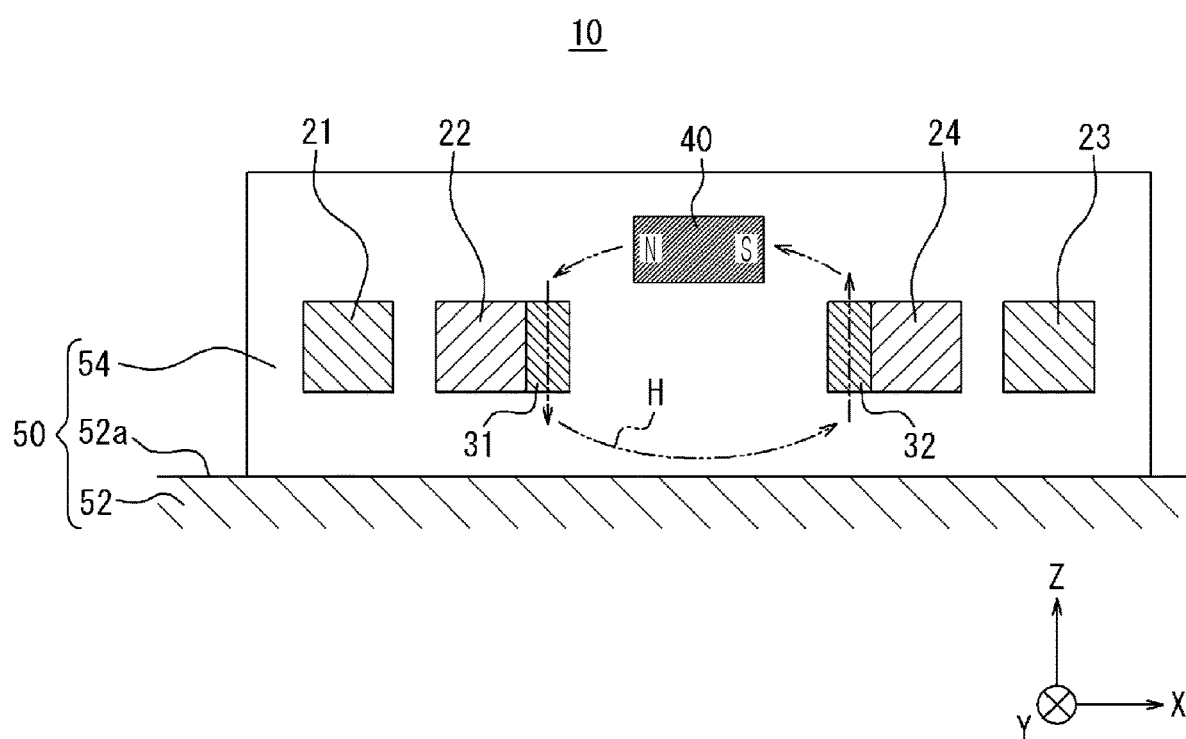
FIG. 11 is a sectional view taken along line A-A of FIG. 10.

As illustrated in FIGS. 10 and 11, an isolator 10 according to an embodiment includes a first isolator 11, a second isolator 12, and the magnetic body 40. The first isolator 11 includes the first core 21, the second core 22, and a first nonreciprocal member 31. The second isolator 12 includes a third core 23, a fourth core 24, and a second nonreciprocal member 32. The first isolator 11 allows an electromagnetic wave input to the first end 211 of the first core 21 to pass to the second end 212 with a transmittance greater than or equal to a predetermined value, and allows an electromagnetic wave input to the second end 212 to pass to the first end 211 with a transmittance less than the predetermined value. That is, the first isolator 11 is configured in such a way that the transmittance of an electromagnetic wave from the first end 211 toward the second end 212 is greater than the transmittance of an electromagnetic wave from the second end 212 toward the first end 211. The second isolator 12 allows an electromagnetic wave input to a first end 231 of the third core 23 to pass to a second end 232 with a transmittance greater than or equal to a predetermined value, and allows an electromagnetic wave input to the second end 232 to pass to the first end 231 with a transmittance less than the predetermined value. That is, the isolator 10 is configured in such a way that the transmittance of an electromagnetic wave from the first end 211 toward the second end 212 is greater than transmittance of an electromagnetic wave from the second end 212 toward the first end 211. As a result, the first isolator 11 and the second isolator 12 each can transfer an electromagnetic wave in one direction.

The isolator 10 may be held by the substrate 50. The substrate 50 includes the base material 52 and the cladding 54. The base material 52 has the base material surface 52a. The cladding 54 is in contact with the base material 52 at the base material surface 52a. The base material 52 may include a conductor such as a metal, a semiconductor such as silicon, glass, a resin, or the like. In the present embodiment, the base material 52 is silicon (Si). However, the base material 52 is not limited to this, and may be any other appropriate material.

The cladding 54 may hold the first isolator 11, the second isolator 12, and the magnetic body 40. The first core 21, the second core 22, the third core 23, the fourth core 24, and the cladding 54 each may include a dielectric. The first core 21, the second core 22, the third core 23, and the fourth core 24 are each also referred to as a dielectric line. The materials of the first core 21, the second core 22, the third core 23, and the fourth core 24, and the cladding 54 are determined in such a way that the relative permittivity of each of the first core 21, the second core 22, the third core 23, and the fourth core 24 is greater than the relative permittivity of the cladding 54. In other words, the materials of the first core 21, the second core 22, the third core 23, the fourth core 24, the cladding 54 are determined in such a way that the refractive index of the cladding 54 is greater than the refractive index of each of the first core 21, the second core 22, the third core 23, and the fourth core 24. Thus, an electromagnetic wave that propagates in each of the first core 21, the second core 22, the third core 23, and the fourth core 24 can be totally reflected at the boundary with the cladding 54. As a result, the loss of the electromagnetic wave that propagates in each of the first core 21, the second core 22, the third core 23, and the fourth core 24 can be reduced. In the present embodiment, the material of each of the first core 21, the second core 22, the third core 23, and the fourth core 24 is silicon (Si). However, the material is not limited to this, and may be any other appropriate material. The material of the cladding 54 is quartz glass or a silicon oxide film ($SiO_2$). However, the material is not limited to this, and may be any other appropriate material. The relative permittivity of silicon and the relative permittivity of quartz glass are respectively about 12 and about 2. Silicon can propagate an electromagnetic wave having an infrared wavelength in the range of about 1.2 µm to about 6 µm at a low loss. When made of silicon, the first core 21, the second core 22, the third core 23, or the fourth core 24 can propagate an electromagnetic wave having a wavelength in a 1.3 µm band or a 1.55 µm band, which is used for optical communication, at a low loss.

The relative permittivity of each of the first core 21, the second core 22, the third core 23, the fourth core 24, and the cladding 54 may be greater than the relative permittivity of air. When the relative permittivity of each of the first core 21, the second core 22, the third core 23, the fourth core 24, and the cladding 54 is greater than the relative permittivity of air, leakage of an electromagnetic wave from the isolator 10 can be suppressed. As a result, loss due to radiation of an electromagnetic wave from the isolator 10 to the outside can be reduced.

The first core 21 and the second core 22 each extend in the Y-axis direction. The direction in which the first core 21 and the second core 22 extend is also referred to as a first direction. The first core 21 and the second core 22 are positioned side by side in the X-axis direction with the cladding 54 therebetween. The first core 21 and the second core 22 electromagnetically couple with each other with the cladding 54 therebetween. The direction in which the first core 21 and the second core 22 are positioned side by side is also referred to as a second direction. The first direction and the second direction intersect each other.

The third core 23 and the fourth core 24 each extend in the Y-axis direction. The direction in which the third core 23, and the fourth core 24 extend is also referred to as a third direction. The third core 23 and the fourth core 24 are positioned side by side in the X-axis direction with the cladding 54 therebetween. The third core 23 and the fourth core 24 electromagnetically couple with each other with the cladding 54 therebetween. The direction in which the third core 23 and the fourth core 24 are positioned side by side is also referred to as a fourth direction. The third direction and the fourth direction intersect each other.

In FIG. 10, the first direction and the third direction coincide. The first direction and the third direction may correspond to directions that differ from each other. In FIG. 10, the second direction and the fourth direction coincide. The second direction and the fourth direction may correspond to directions that differ from each other.

The first core 21 has the first end 211 and the second end 212. The first end 211 is positioned on a side in the negative direction of the Y axis. The second end 212 is positioned on a side in the positive direction of the Y axis. The first isolator 11 may further include a first port 111 and a second port 112 through each of which an electromagnetic wave can be input to and output from the first core 21. The first port 111 and the second port 112 each may be an end surface of the first core 21 or may be a coupler that can be connected to an external apparatus and can propagate an electromagnetic wave. The first port 111 is positioned on a side of the first end 211 of the first core 21. The second port 112 is positioned on a side of the second end 212 of the first core 21. An electromagnetic wave input from the first port 111 to the first core 21 propagates toward the second port 112 in the first core 21. An electromagnetic wave input from the second port 112 to the first core 21 propagates toward the first port 111 in the first core 21.

The second core 22 has the first end 221 and the second end 222. The first end 221 is positioned on a side in the negative direction of the Y axis. The second end 222 is positioned on a side in the positive direction of the Y axis.

The first core 21 and the second core 22 may be positioned along each other at least in a part in the extension direction. The first core 21 and the second core 22 may be positioned parallel to each other at least in a part in the extension direction. The first core 21 or the second core 22 may have a linear structure at least in a part thereof. The first core 21 and the second core 22 can be easily formed by having such a simple structure.

The third core 23 has the first end 231 and the second end 232. The first end 231 is positioned on a side in the negative direction of the Y axis. The second end 232 is positioned on a side in the positive direction of the Y axis. The second isolator 12 may further include a third port 121 and a fourth port 122 through each of which an electromagnetic wave can be input to and output from the third core 23. The third port 121 and the fourth port 122 each may be an end surface of the third core 23 or may be a coupler that can be connected to an external apparatus and can propagate an electromagnetic wave. The third port 121 is positioned on a side of the first end 231 of the third core 23. The fourth port 122 is positioned on a side of the second end 232 of the third core 23. An electromagnetic wave input from the third port 121 to the third core 23 propagates toward the fourth port 122 in the third core 23. An electromagnetic wave input from the fourth port 122 to the third core 23 propagates toward the third port 121 in the third core 23.

The fourth core 24 has a first end 241 and a second end 242. The first end 241 is positioned on a side in the negative direction of the Y axis. The second end 242 is positioned on a side in the positive direction of the Y axis.

The third core 23 and the fourth core 24 may be positioned along each other at least in a part in the extension direction. The third core 23, and the fourth core 24 may be positioned parallel to each other at least in a part in the extension direction. The third core 23 or the fourth core 24 may have a linear structure at least in a part thereof. The third core 23 and the fourth core 24 can be easily formed by having such a simple structure.

The first core 21, the second core 22, the third core 23, and the fourth core 24 are each also referred to as a waveguide. Two waveguides positioned side by side are also referred to as a parallel waveguide. As described above, the first core 21 and the second core 22 electromagnetically couple with each other with the cladding 54 therebetween. The third core 23 and the fourth core 24 electromagnetically couple with each other with the cladding 54 therebetween. That is, the two waveguides included in the parallel waveguide electromagnetically couple with each other with the cladding 54 therebetween. Thus, an electromagnetic wave input to one of the waveguides can transfer to the other waveguide while the electromagnet wave propagates in the one of the waveguides. That is, at least a part of an electromagnetic wave that propagates in the first core 21 can transfer to the second core 22. As a result, even when an electromagnetic wave is not input from the first end 211 and the second end 222 of the second core 22, an electromagnetic wave can propagate in the second core 22. On the other hand, at least a part of an electromagnetic wave that propagates in the second core 22 can transfer to the first core 21. As a result, an electromagnetic wave can transfer between the first core 21 and the second core 22 that are electromagnetically coupled with each other. At least a part of an electromagnetic wave that propagates in the third core 23 can transfer to the fourth core 24. As a result, even when an electromagnetic wave is not input from the first end 241 and the second end 242 of the fourth core 24, an electromagnetic wave can propagate in the fourth core 24. On the other hand, at least a part of an electromagnetic wave that propagates in the fourth core 24 can transfer to the third core 23. As a result, an electromagnetic wave can transfer between the third core 23 and the fourth core 24 that are electromagnetically coupled with each other.

As described above, the coupling coefficient is determined based on the distance between waveguides or the like. For example, the coupling coefficient can be higher as the shapes of the waveguides become more similar to each other. The distance between the waveguides in the first isolator 11 may correspond to the distance between the first core 21 and the second core 22. The distance between the waveguides in the second isolator 12 may correspond to the distance between the third core 23 and the fourth core 24.

As described above, an electromagnetic wave transfers to the other waveguide while propagating in one waveguide. An electromagnetic wave that has transferred from the first core 21 to the second core 22 propagates also in the second core 22 in a direction that is the same as the propagation direction in the first core 21. When the electromagnetic wave reaches the first end 221 or the second end 222 of the second core 22, the electromagnetic wave may be radiated from the first end 221 or the second end 222, or may be reflected at the first end 221 or the second end 222 and may propagate in the opposite direction.

An electromagnetic wave that has transferred from the third core 23 to the fourth core 24 propagates also in the fourth core 24 in a direction that is the same as the propagation direction in the third core 23. When the electromagnetic wave reaches the first end 241 or the second end 242 of the fourth core 24, the electromagnetic wave may be radiated from the first end 241 or the second end 242, or may be reflected at the first end 241 or the second end 242 and may propagate in the opposite direction.

The first nonreciprocal member 31 extends in the Y-axis direction and is positioned side by side with the second core 22. The first nonreciprocal member 31 may be in contact with at least a part of the second core 22. The first nonreciprocal member 31 may be positioned on a side in the positive direction of the X axis with respect to the second core 22. That is, the first nonreciprocal member 31 need not be positioned between the first core 21 and the second core 22. Thus, electromagnetic coupling between the first core 21 and the second core 22 is strengthened.

The second nonreciprocal member 32 extends in the Y-axis direction and is positioned side by side with the fourth core 24. The second nonreciprocal member 32 may be in contact with at least a part of the fourth core 24. The second nonreciprocal member 32 may be positioned on a side in the positive direction of the X axis with respect to the fourth core 24. That is, the second nonreciprocal member 32 need not be positioned between the third core 23 and the fourth core 24. Thus, electromagnetic coupling between the third core 23 and the fourth core 24 is strengthened.

As illustrated in FIG. 11, in a cross section intersecting the Y axis, the shapes of the second core 22 and the first nonreciprocal member 31 are not point-symmetric, and the shapes of the fourth core 24 and the second nonreciprocal member 32 are not point-symmetric. Further, the shapes of the second core 22 and the first nonreciprocal member 31 need not be line-symmetric, and the shapes of the fourth core 24 and the second nonreciprocal member 32 need not be line-symmetric. It can be said that the second core 22 and the first nonreciprocal member 31 form a first asymmetric core. It can be said that the fourth core 24 and the second nonreciprocal member 32 form a second asymmetric core. The first asymmetric core and the second asymmetric core each may be also referred to simply as an asymmetric core.

In the cross section of the asymmetric core, the areas of the second core 22 and the fourth core 24 may be respectively greater than the areas of the first nonreciprocal member 31 and the second nonreciprocal member 32. In this case, in an electromagnetic wave that propagates in the asymmetric core, the proportion of the electromagnetic wave that propagates in the second core 22 or the fourth core 24 increases. As a result, the loss of an electromagnetic wave in the asymmetric core can be reduced.

In the cross section of the asymmetric core, the second core 22 or the fourth core 24 each may be positioned in a portion where the intensity of the electromagnetic wave that propagates in the asymmetric core is the maximum. In this case, a portion of an electromagnetic wave having a high intensity can propagate in the second core 22 or the fourth core 24. As a result, the loss of an electromagnetic wave in the asymmetric core can be reduced.

The first core 21 and the first asymmetric core, and the third core 23 and the second asymmetric core may satisfy waveguide conditions in a single mode. When the first core 21 and the first asymmetric core, and the third core 23 and the second asymmetric core satisfy waveguide conditions in a single mode, the waveform of a signal that propagates in the first core 21 and the first asymmetric core and in the third core 23 and the second asymmetric core does not collapse easily. The first isolator 11, which includes a combination of the first core 21 and the first asymmetric core that satisfy waveguide conditions in a single mode, and the second isolator 12, which includes a combination of the third core 23 and the second asymmetric core that satisfy waveguide conditions in a single mode, can be suitable for optical communication.

The relative permittivity of each of the first core 21, the second core 22, the third core 23, or the fourth core 24 may be distributed uniformly in the X-axis direction or in the Z-axis direction or may be distributed in such a way as to change in the X-axis direction or in the Z-axis direction. For example, the relative permittivity of the first core 21 may be distributed in such a way as to be the largest in a central portion in the X-axis direction and to decrease with decreasing distance to the cladding 54. In this case, the first core 21 can propagate an electromagnetic wave based on a principle similar to that of a graded-index optical fiber.

The manner in which an electromagnetic wave propagates in the first isolator 11 is the same as or similar to the manner in which an electromagnetic wave propagates in the isolator 10 described above. The manner in which an electromagnetic wave propagates in the first isolator 11 is described by replacing the terms as described below in the above description of the manner in which an electromagnetic wave propagates in the isolator 10. The "isolator 10" is replaced with the "first isolator 11". The "first port 101" is replaced with the "first port 111". The "second port 102" is replaced with the "second port 112". The "nonreciprocal member 31" is replaced with the "first nonreciprocal member 31". The "asymmetric core" is replaced with the "first asymmetric core".

Descriptions related to the first isolator 11 can be understood in principle as descriptions related to the second isolator 12. As necessary, a manner that is based on the configuration of the second isolator 12 will be described.

Moreover, regarding a magnetic field applied to the first nonreciprocal member 31, the following description is added.

The first asymmetric core exhibits nonreciprocity when a magnetic field H1 or H2 that intersects the wave number vector k and the electric field vector E is applied to the first nonreciprocal member 31. The magnetic field H is generated by the magnetic body 40. When the first asymmetric core exhibits nonreciprocity, the phase of an electromagnetic wave that propagates in the first asymmetric core is advanced or delayed with respect to the phase of an electromagnetic wave that propagates in the first core 21 in the direction S12. The magnitude of nonreciprocity exhibited by the first asymmetric core corresponds to the magnitude of delay or advance in phase of an electromagnetic wave that propagates. The magnitude of delay or advance in phase of an electromagnetic wave that propagates is determined based on the magnitude of a component, in the magnetic field H, in a direction perpendicular to the wave number vector k and the electric field vector E. In the first isolator 11, the direction perpendicular to the wave number vector k and the electric field vector E is also referred to as a fifth direction.

The magnetic field H applied to a portion where the first nonreciprocal member 31 is positioned includes a component in the fifth direction and the other components. The position of the magnetic body 40 in the first isolator 11 is determined in such a way that the component in the fifth direction is greater than any of the other components. Thus, the first asymmetric core can easily exhibit nonreciprocity.

The second asymmetric core exhibits nonreciprocity when a magnetic field H1 or H2 that intersects the wave number vector k and the electric field vector E is applied as a magnetic field H to the second nonreciprocal member 32. The magnetic field H is generated by the magnetic body 40. When the second asymmetric core exhibits nonreciprocity, the phase of an electromagnetic wave that propagates in the second asymmetric core is advanced or delayed with respect to the phase of an electromagnetic wave that propagates in the third core 23 in the direction S12. The magnitude of nonreciprocity exhibited by the second asymmetric core corresponds to the magnitude of delay or advance in phase of an electromagnetic wave that propagates. The magnitude of delay or advance in phase of an electromagnetic wave that propagates is determined based on the magnitude of a component, in the magnetic field H, in a direction perpendicular to the wave number vector k and the electric field vector E. In the second isolator 12, the direction perpendicular to the wave number vector k and the electric field vector E is also referred to as a sixth direction.

The magnetic field H applied to a portion where the second nonreciprocal member 32 is positioned includes a component in the sixth direction and the other components. The position of the magnetic body 40 in the second isolator 12 is determined in such a way that the component in the sixth direction is greater than any of the other components. Thus, the asymmetric core can easily exhibit nonreciprocity.

In the present embodiment, the isolator 10 may include only one magnetic body 40. The one magnetic body 40 can apply the magnetic field H to the first isolator 11 and the second isolator 12. That is, the one magnetic body 40 can apply the magnetic field H to a plurality of isolators. In this case, the number of magnetic bodies 40 or the area for mounting the magnetic bodies 40 can be reduced. As a result, the isolator 10 can be reduced in size.

In the first isolator 11 illustrated in FIGS. 10 and 11, the magnetic body 40 is positioned farther than the second core 22 as seen from the first core 21. In the second isolator 12, the magnetic body 40 is positioned farther than the fourth core 24 as seen from the third core 23. The magnetization direction of the magnetic body 40 is along the Z axis. Due to this disposition, the magnetic field H intersecting the wave number vector k and the electric field vector E is applied to the first nonreciprocal member 31 and the second nonreciprocal member 32. The position of the magnetic body 40 is determined in such a way that a component in the fifth direction of the magnetic field H applied to the first nonreciprocal member 31 is greater than any of the other components and in such a way that a component in the sixth direction of the magnetic field H applied to the second nonreciprocal member 32 is greater than any of the other components.

Figure 12:
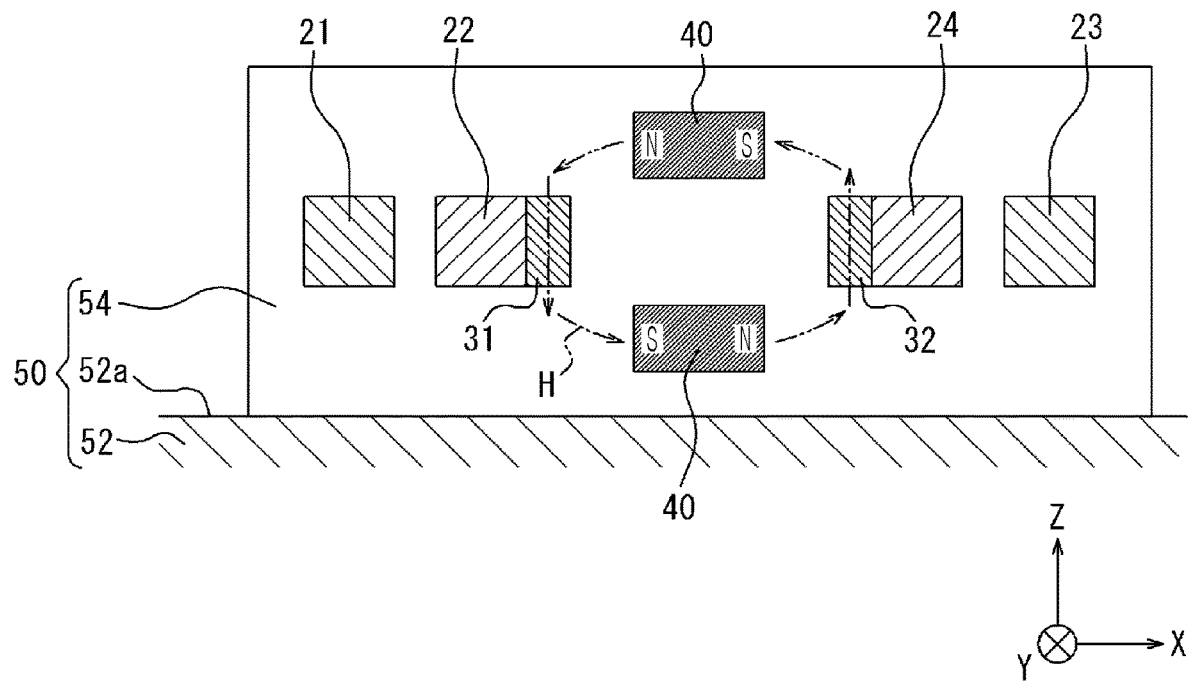
FIG. 12 is a sectional view illustrating an example configuration including a first magnetic body and a second magnetic body.

The configurations of the first isolator 11 and the second isolator 12 are not limited to the configurations illustrated in FIGS. 10 and 11. The first isolator 11 and the second isolator 12 may be configured in any appropriate way. For example, as illustrated in FIG. 12, in a sectional view, the magnetic body 40 may include a first magnetic body that is positioned further on a side in the positive direction of the Z axis than the first nonreciprocal member 31 and the second nonreciprocal member 32 and a second magnetic body that is positioned further on a side in the negative direction of the Z axis than the first nonreciprocal member 31 and the second nonreciprocal member 32. The magnetization directions of the first magnetic body and the magnetization direction of the second magnetic body are opposite to each other. In this case, the magnetic field H applied to the first nonreciprocal member 31 and the second nonreciprocal member 32 is generated between the first magnetic body and the second magnetic body. As a result, the magnetic field H applied to the first nonreciprocal member 31 and the second nonreciprocal member 32 is not likely to be affected by a magnetic field around the isolator 10.

Figure 13:
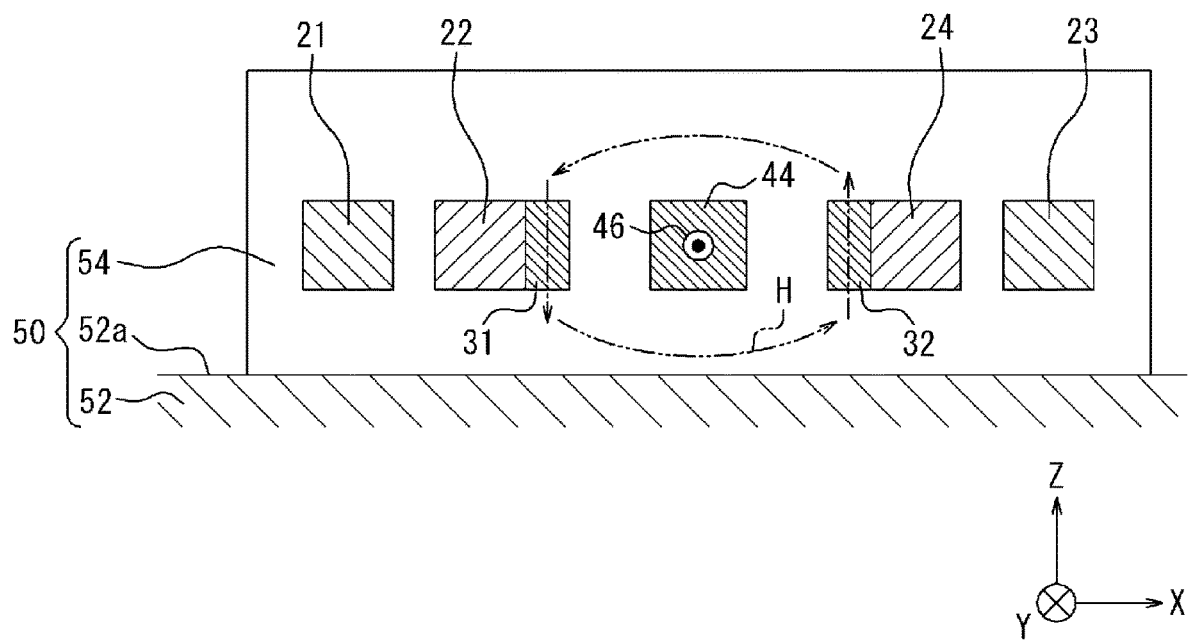
FIG. 13 is a sectional view illustrating an example configuration including a conductor that generates a magnetic field.

As illustrated in FIG. 13, the isolator 10 may include a conductor 44 that allows an electric current 46 to flow. The electric current 46 that flows in the conductor 44 generates a magnetic field in a direction based on the Biot-Savart law. It is assumed that the electric current 46 flows in the conductor 44 in the negative direction of the Y axis. In this case, the magnetic field H applied to the first nonreciprocal member 31 is oriented in the negative direction of the Z axis. The magnetic field H applied to the second nonreciprocal member 32 is oriented in the positive direction of the Z axis. Thus, the magnetic field H can be applied to the first isolator 11 and the second isolator 12 by using one configuration. As a result, the isolator 10 can be reduced in size. The magnetic body 40 and the conductor 44 are also referred to as a magnetic-field application unit.

Figure 14:
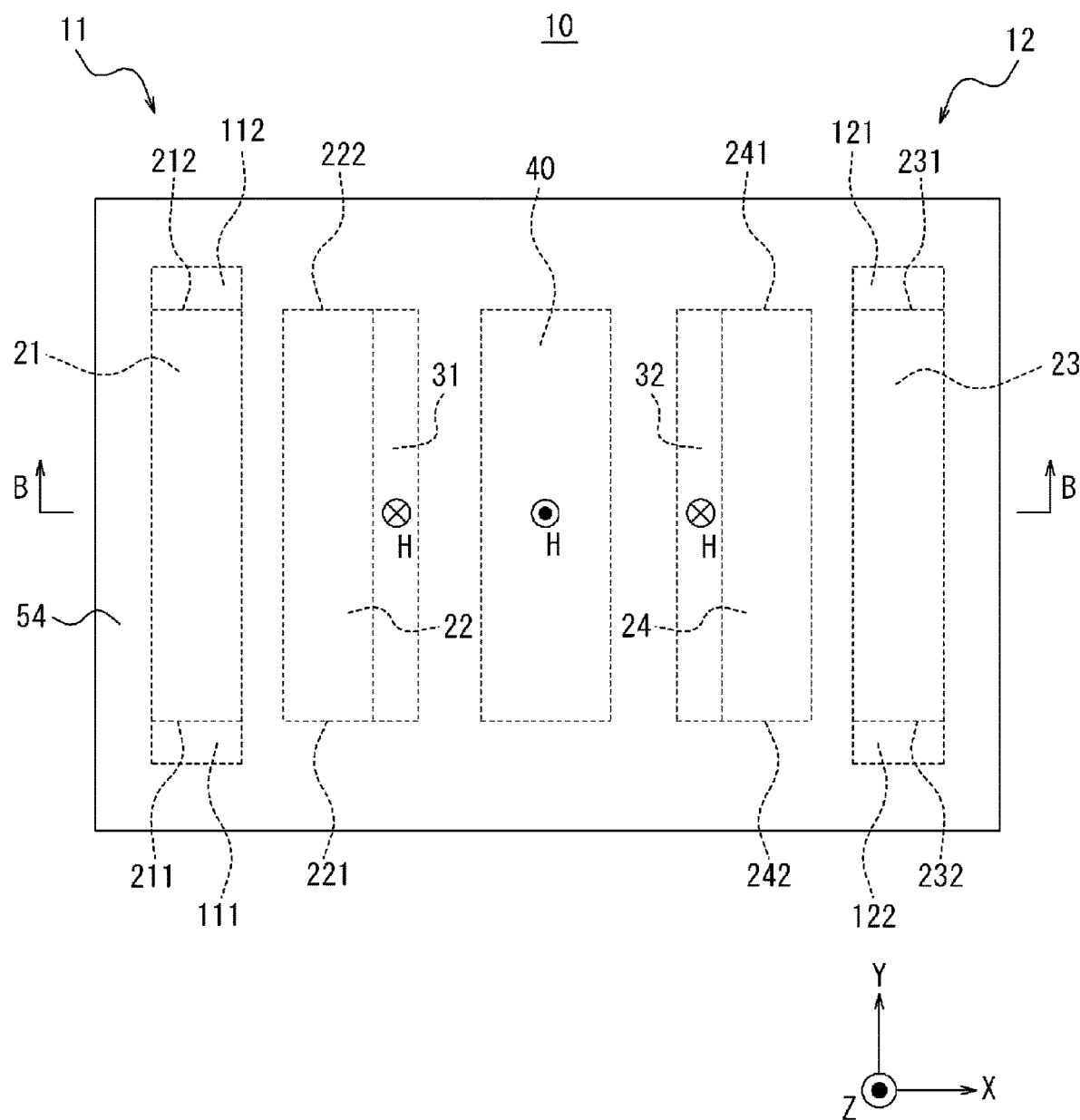
FIG. 14 is a plan view illustrating an example configuration in which magnetic fields applied to isolators have the same orientation.
Figure 15:
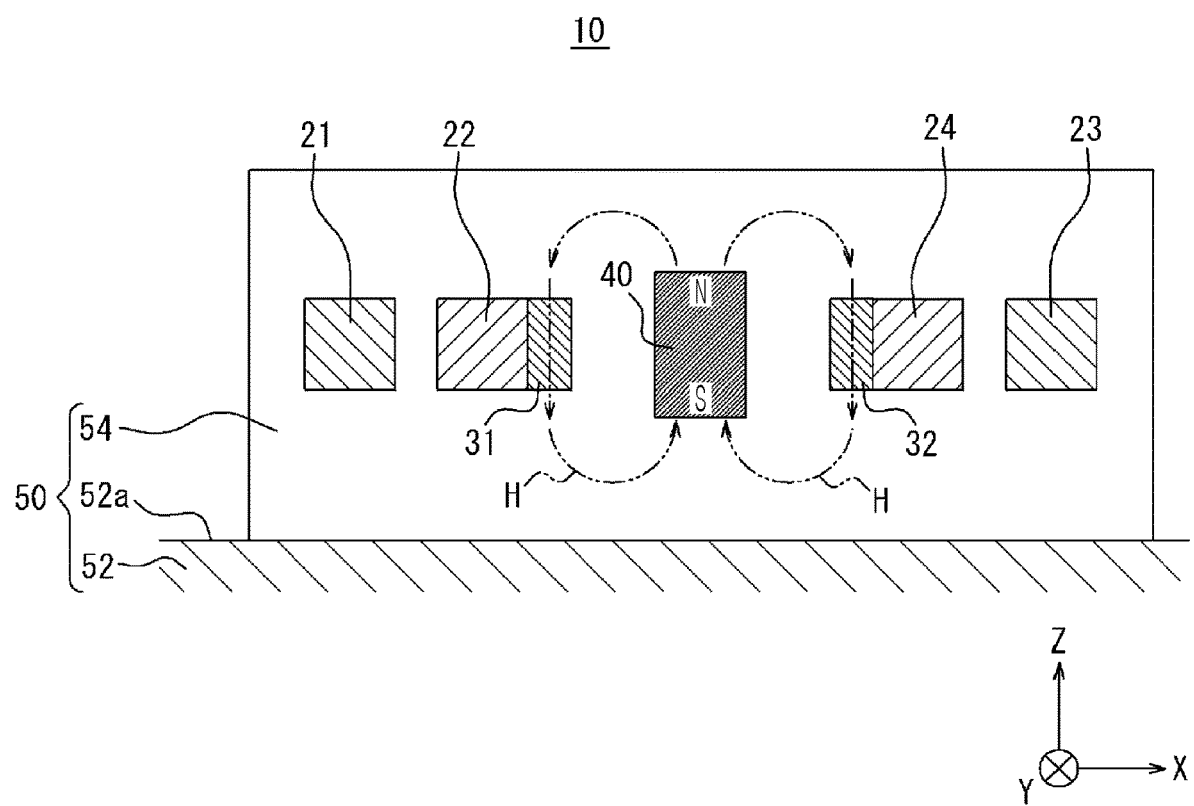
FIG. 15 is a sectional view taken along line B-B of FIG. 14.

As illustrated in FIGS. 14 and 15, the magnetization direction of the magnetic body 40 may be the Z-axis direction. In this case, the orientation of a magnetic field applied to the first nonreciprocal member 31 and the orientation of a magnetic field applied to the second nonreciprocal member 32 are the same. As described above with reference to FIG. 3, whether the phase of an electromagnetic wave that propagates in the first asymmetric core in the direction S12 is advanced or delayed with respect to the first core 21 is determined based on the orientation of a magnetic field applied to the first nonreciprocal member 31 and the positional relationship between the second core 22 and the first nonreciprocal member 31. Whether the phase of an electromagnetic wave that propagates in the second asymmetric core in the direction S12 is advanced or delayed with respect to the third core 23 is determined based on the orientation of a magnetic field applied to the second nonreciprocal member 32 and the positional relationship between the fourth core 24 and the second nonreciprocal member 32.

It is assumed that electromagnetic waves propagate in the same direction in both of the first isolator 11 and the second isolator 12. In this case, if the phase of an electromagnetic wave that propagates in the first asymmetric core is advanced with respect to the phase of an electromagnetic wave that propagates in the first core 21 in the first isolator 11, the phase of an electromagnetic wave that propagates in the second asymmetric core is delayed with respect to the phase of an electromagnetic wave that propagates in the third core 23 in the second isolator 12. That is, between the first isolator 11 and the second isolator 12, the relationships between advance and delay in phase of an electromagnetic wave that propagate in the direction S12 are opposite to each other.

On the other hand, it is assumed that electromagnetic waves propagate in different directions in the first isolator 11 and the second isolator 12. In this case, between the first isolator 11 and the second isolator 12, the relationships between advance and delay in phase coincide. In the example illustrated in FIGS. 14 and 15, the first isolator 11 includes the first port 111, which receives input of an electromagnetic wave, in the negative direction of the Y axis, and includes the second port 112, which outputs an electromagnetic wave, in the positive direction of the Y axis. The second isolator 12 includes the third port 121, which receives input of an electromagnetic wave, in the positive direction of the Y axis, and includes the fourth port 122, which outputs an electromagnetic wave, in the negative direction of the Y axis. Thus, between the first isolator 11 and the second isolator 12, the relationships between advance and delay in phase of an electromagnetic wave that propagates in the direction S12 coincide.

Figure 16:
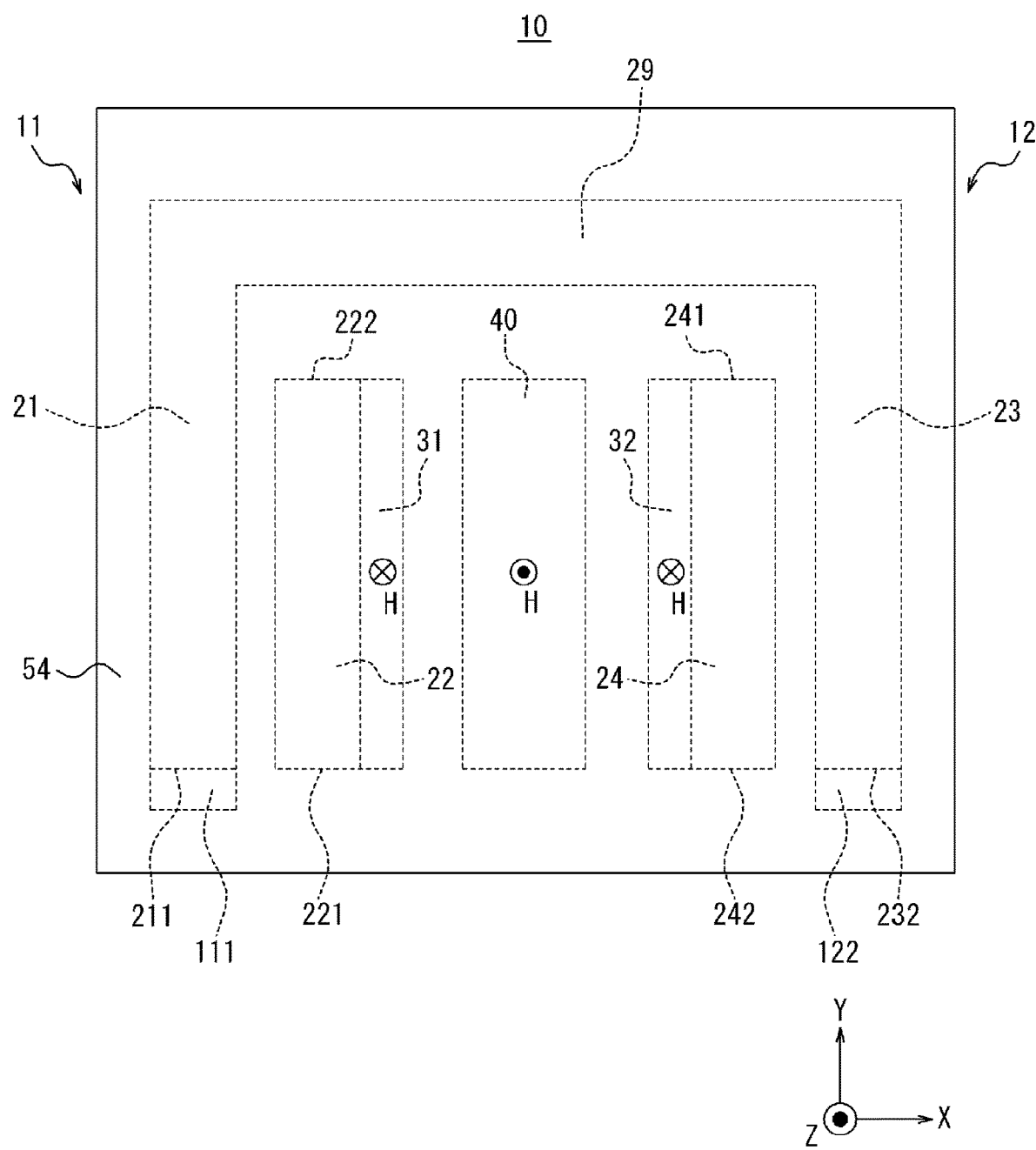
FIG. 16 is a plan view illustrating an example configuration in which two isolators are connected in series.

As illustrated in FIG. 16, the output of the first isolator 11 and the input of the second isolator 12 may be connected by a connection core 29. In this case, the first isolator 11 does not include the second port 112. The second isolator 12 does not include the third port 121. When the first isolator 11 and the second isolator 12 are connected in series in this way, the difference between the electromagnetic-wave transmittance in one direction and the electromagnetic-wave transmittance in the opposite direction in the isolator 10 can be made large. As a result, the function of the isolator 10 can be improved.

Figure 17:
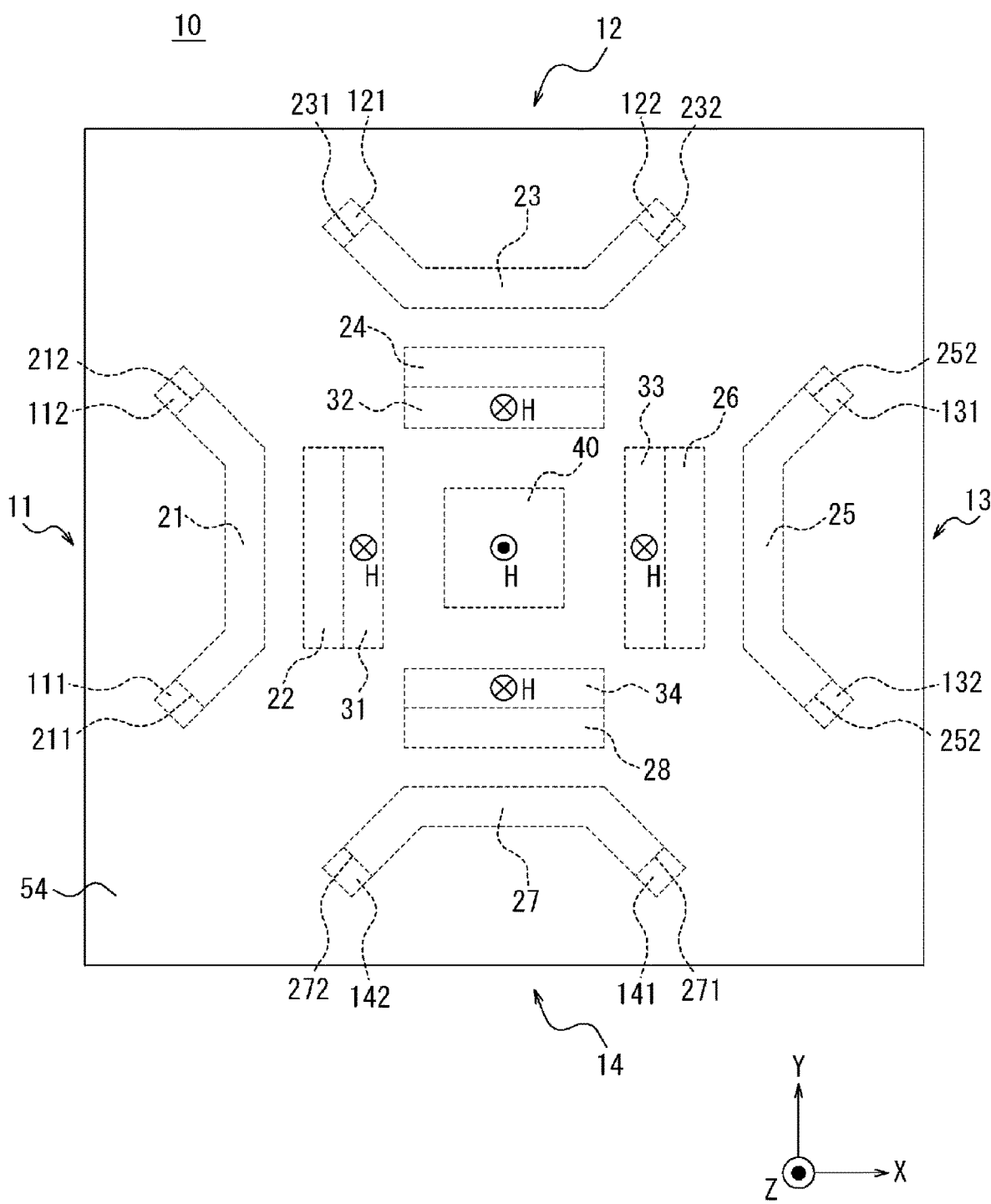
FIG. 17 is a plan view illustrating an example configuration in which four isolators are parallel and magnetic fields applied to the isolators have the same orientation.

As illustrated in FIG. 17, an isolator 10 may include the first isolator 11, the second isolator 12, a third isolator 13, a fourth isolator 14, and the magnetic body 40.

The first isolator 11 includes the first core 21, the second core 22, and the first nonreciprocal member 31. The second isolator 12 includes the third core 23, the fourth core 24, and the second nonreciprocal member 32. The third isolator 13 includes a fifth core 25, a sixth core 26, and a third nonreciprocal member 33. The fourth isolator 14 includes a seventh core 27, an eighth core 28, and a fourth nonreciprocal member 34.

The first core 21 extends in the Y-axis direction, and has the first end 211 and the second end 212. The first end 211 is positioned on a side in the negative direction of the Y axis. The second end 212 is positioned on a side in the positive direction of the Y axis. The first isolator 11 may further include the first port 111 and the second port 112 through each of which an electromagnetic wave can be input to and output from the first core 21. The second core 22 extends along the first core 21, and has the first end 221 and the second end 222. The first end 221 is positioned on a side in the negative direction of the Y axis. The second end 222 is positioned on a side in the positive direction of the Y axis. The first nonreciprocal member 31 is positioned along the second core 22.

The third core 23 extends in the X-axis direction, and has the first end 231 and the second end 232. The first end 231 is positioned on a side in the negative direction of the X axis. The second end 232 is positioned on a side in the positive direction of the X axis. The second isolator 12 may further include the third port 121 and the fourth port 122 through each of which an electromagnetic wave can be input to and output from the third core 23. The fourth core 24 extends along the third core 23, and has the first end 241 and the second end 242. The first end 241 is positioned on a side in the negative direction of the X axis. The second end 242 is positioned on a side in the positive direction of the X axis. The second nonreciprocal member 32 is positioned along the fourth core 24.

The fifth core 25 extends in the Y-axis direction, and has a first end 251 and a second end 252. The first end 251 is positioned on a side in the positive direction of the Y axis. The second end 252 is positioned on a side in the negative direction of the Y axis. The third isolator 13 may further include a fifth port 131 and a sixth port 132 through each of which an electromagnetic wave can be input to and output from the fifth core 25. The sixth core 26 extends along the fifth core 25, and has a first end 261 and a second end 262. The first end 261 is positioned on a side in the positive direction of the Y axis. The second end 262 is positioned on a side in the negative direction of the Y axis. The third nonreciprocal member 33 is positioned along the sixth core 26.

The seventh core 27 extends in the X-axis direction, and has a first end 271 and a second end 272. The first end 271 is positioned on a side in the positive direction of the X axis. The second end 272 is positioned on a side in the negative direction of the X axis. The fourth isolator 14 may further include a seventh port 141 and an eighth port 142 through each of which an electromagnetic wave can be input to and output from the seventh core 27. The eighth core 28 extends along the seventh core 27, and has a first end 281 and a second end 282. The first end 281 is positioned on a side in the positive direction of the X axis. The second end 282 is positioned on a side in the negative direction of the X axis. The fourth nonreciprocal member 34 is positioned along the eighth core 28.

The magnetization direction of the magnetic body 40 may be the positive direction of the Y axis. The magnetic field H generated by the magnetic body 40 is applied in the negative direction of the Y axis to each of the first nonreciprocal member 31, the second nonreciprocal member 32, the third nonreciprocal member 33, and the fourth nonreciprocal member 34. The isolator 10 illustrated in FIG. 17 is configured in such a way that electromagnetic waves are respectively input to and output from the first isolator 11, the second isolator 12, the third isolator 13, and the fourth isolator 14 in the clockwise direction. In this case, among the first isolator 11, the second isolator 12, the third isolator 13, and the fourth isolator 14, the relationships between advance and delay in phases of electromagnetic waves that propagate in the direction S12 coincide. Electromagnetic waves may be input to and output from the first isolator 11, the second isolator 12, the third isolator 13, and the fourth isolator 14 in the counterclockwise direction. Also in this case, among the first isolator 11, the second isolator 12, the third isolator 13, and the fourth isolator 14, the relationship between advance and delay in phases of electromagnetic waves that propagate in the direction S12 coincide.

Example of Method of Manufacturing Isolator 10

The isolator 10 illustrated in FIGS. 1 and 2 and FIGS. 10 and 11 may be manufactured through a process flow illustrated in sectional views of FIGS. 18A to 18H and FIGS. 19A to 19C.

Figure 18A:
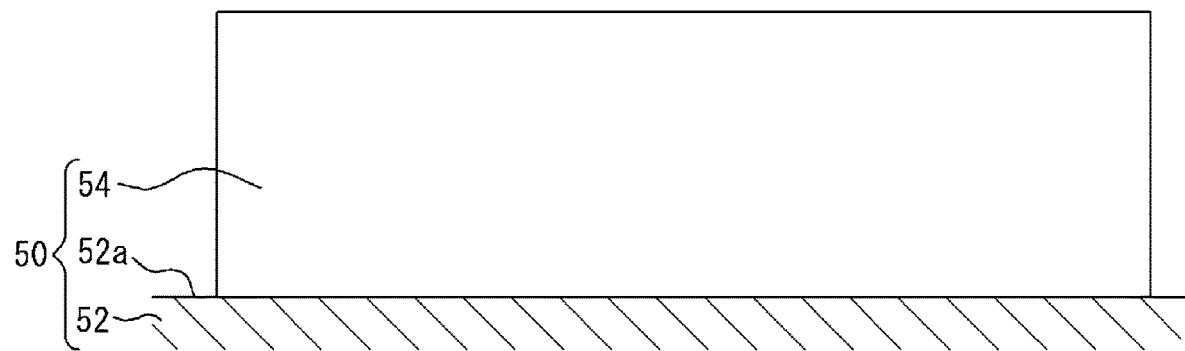
FIG. 18A is a sectional view illustrating a substrate before being processed in a process of manufacturing an isolator.

As illustrated in FIG. 18A, the substrate 50 includes the base material 52 having the base material surface 52a and the cladding 54 positioned on the base material surface 52a.

Figure 18B:
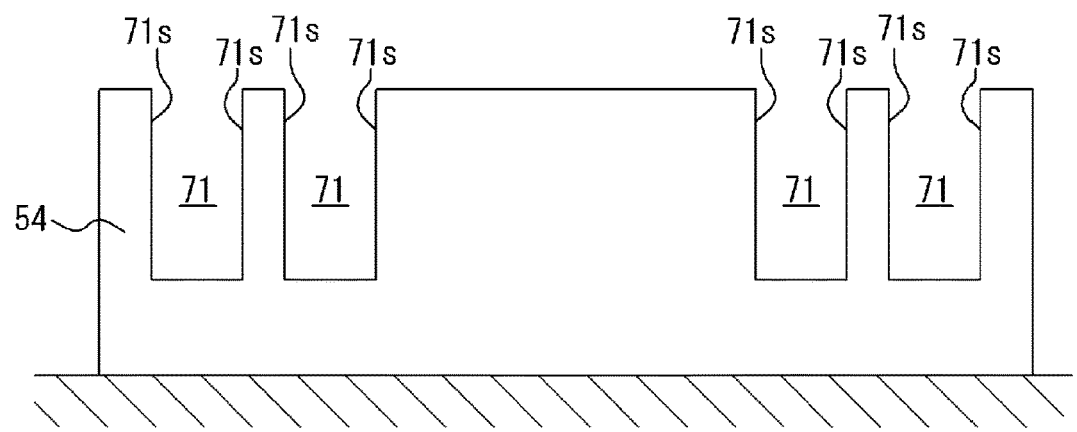
FIG. 18B is sectional view illustrating a substrate in which trenches are formed.

As illustrated in FIG. 18B, trenches 71 are formed in the cladding 54. The trenches 71 each correspond to a groove or a hole that is defined by side walls 71S. The trenches 71 may be formed by, for example, dry etching such as reactive ion etching (RIE).

Figure 18C:
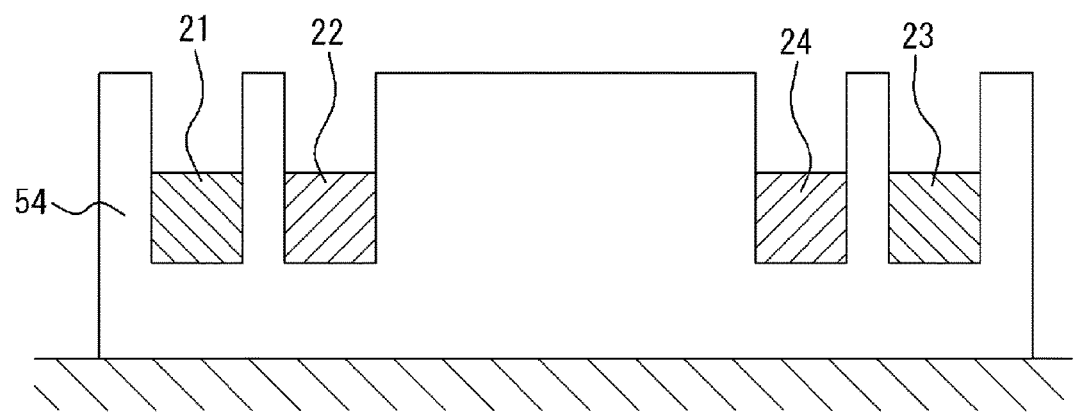
FIG. 18C is a sectional view illustrating cores formed in the trenches.

As illustrated in FIG. 18C, the first core 21 and the second core 22 are formed in the trenches 71. In a case where the first core 21 and the second core 22 are to be made of the same material, the first core 21 and the second core 22 may be simultaneously formed in the trench 71. The first core 21 and the second core 22 may be formed through a process such as plasma chemical vapor deposition (CVD) or sputtering.

Figure 18D:
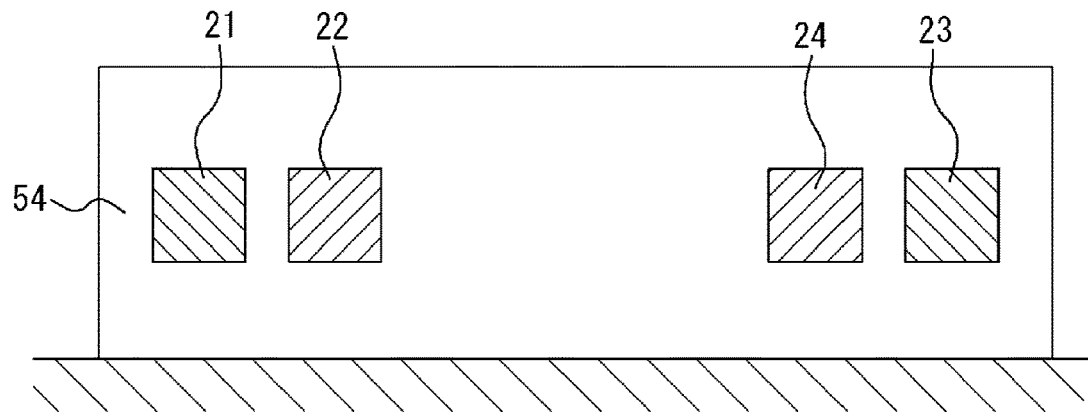
FIG. 18D is a sectional view illustrating the substrate in which upper surfaces of the cores are buried.

As illustrated in FIG. 18D, the trenches 71, in which the first core 21 and the second core 22 have been formed, are buried with the cladding 54. As a result, the first core 21 and the second core 22 are embedded in the substrate 50. The cladding 54 may be formed through a process such as plasma CVD or sputtering. After the cladding 54 has been formed, the surface of the substrate 50 may be flattened through a process such as chemical mechanical polishing (CMP).

Figure 18E:
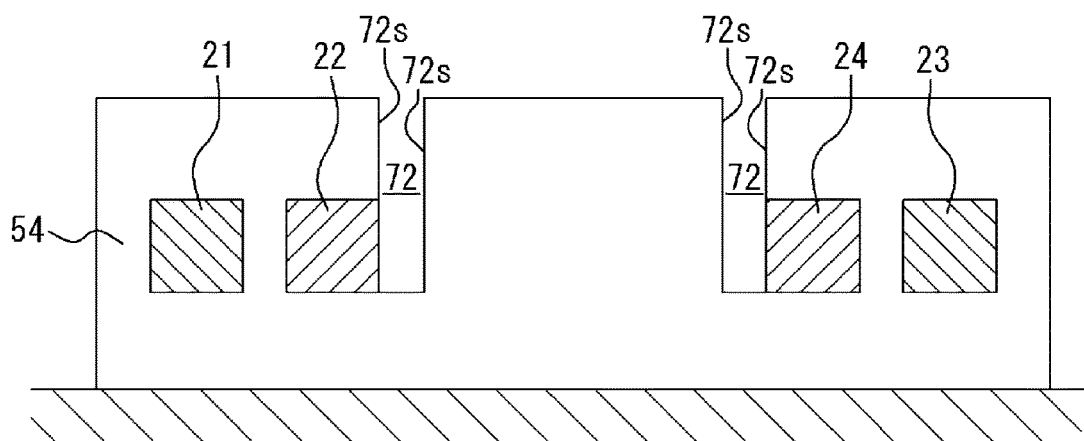
FIG. 18E is sectional view illustrating the substrate in which trenches are formed.

As illustrated in FIG. 18E, a trench 72 is formed at a position adjacent to the second core 22. The trench 72 corresponds to a groove or a hole that is defined by side walls 72S. The trench 72 may be formed by dry etching such as RIE. Dry etching of the trench 72 may be performed in such a way that the second core 22 is covered by a side wall 72S and is not exposed. In this case, the dry etching process is not likely to inflict damage to the second core 22. The side wall 72S, which covers the second core 22, may be etched through a wet etching process such as hydrogen fluoride etching. In this case, even if the second core 22 is exposed due to forming of the trench 72, the second core 22 is not likely to be damaged.

Figure 18F:
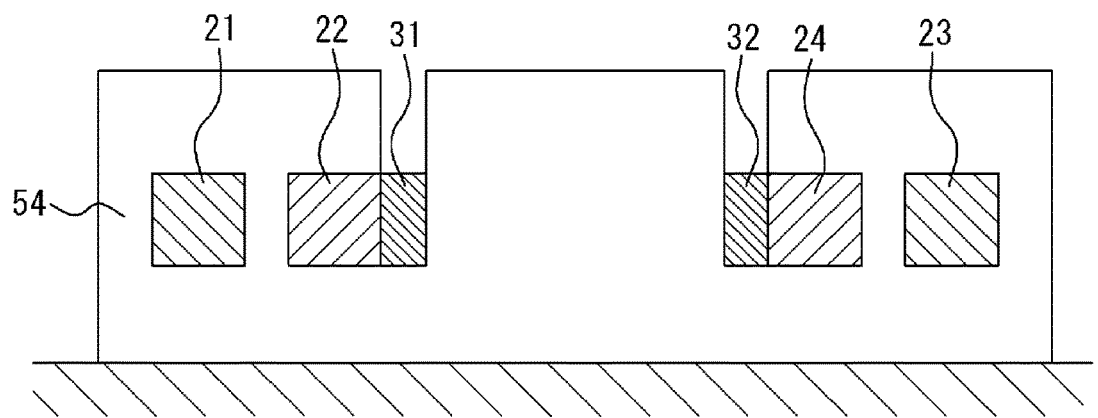
FIG. 18F is a sectional view illustrating nonreciprocal members formed in the trenches.

As illustrated in FIG. 18F, the nonreciprocal member 31 is formed in the trench 72. The nonreciprocal member 31 may be formed through a process such as plasma CVD or sputtering. The trench 72, in which the nonreciprocal member 31 is formed, is also referred to as a first trench.

Figure 18G:
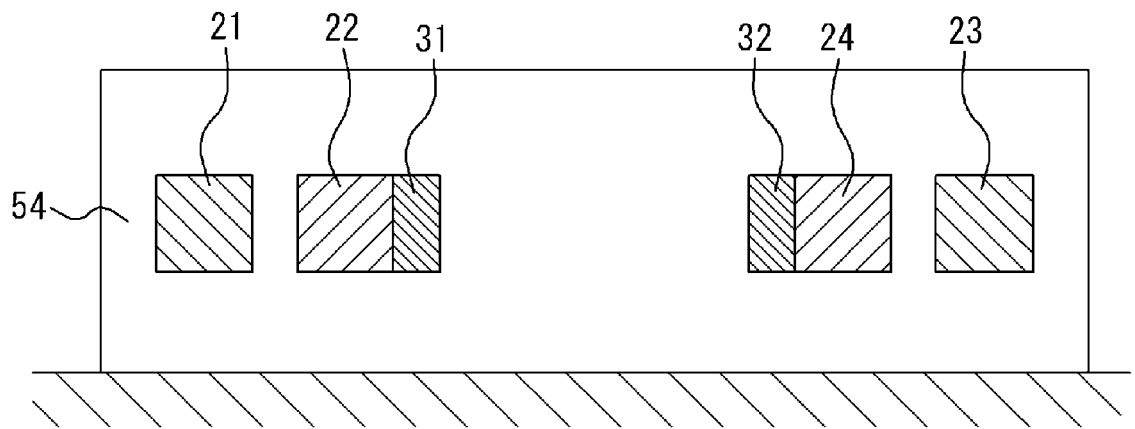
FIG. 18G is a sectional view illustrating the substrate in which upper surfaces of the nonreciprocal members are buried.

As illustrated in FIG. 18G, the trench 72, in which the nonreciprocal member 31 has been formed, is buried with the cladding 54. As a result, the nonreciprocal member 31 is embedded in the substrate 50. The cladding 54 may be formed through a process such as plasma CVD or sputtering. After the cladding 54 has been formed, the surface of the substrate 50 may be flattened through a process such as CMP.

Figure 18H:
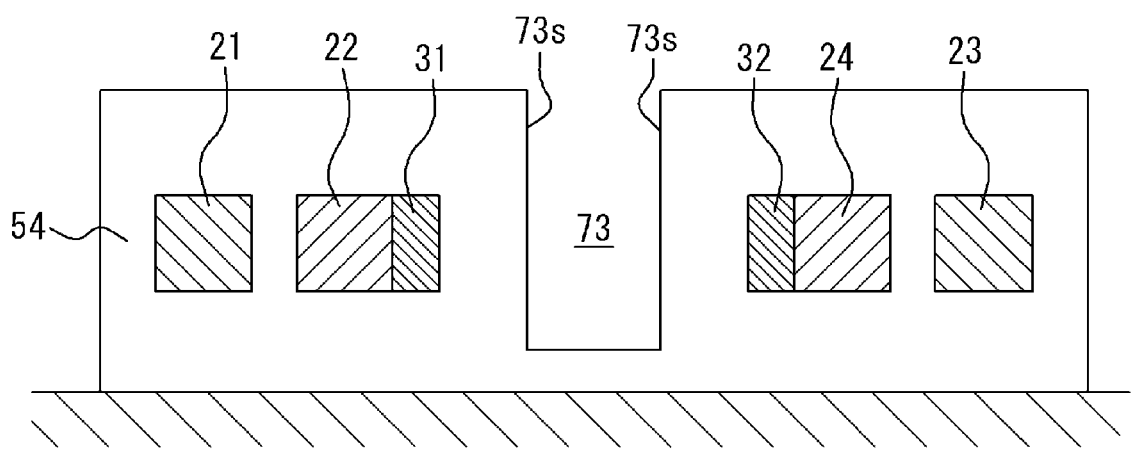
FIG. 18H is a sectional view illustrating the substrate in which a trench is formed.

As illustrated in FIG. 18H, a trench 73 is formed. The trench 73 corresponds to a groove or a hole that is defined by side walls 73S. The trench 73 may be formed by dry etching such as RIE. The position of the trench 73 and the depth of the trench 73 are determined based on the position of the magnetic body 40. As described above, the position of the magnetic body 40 is determined in such a way that a component in the third direction of the magnetic field H applied to a portion where the nonreciprocal member 31 is positioned is greater than any of the other components.

Figure 19A:
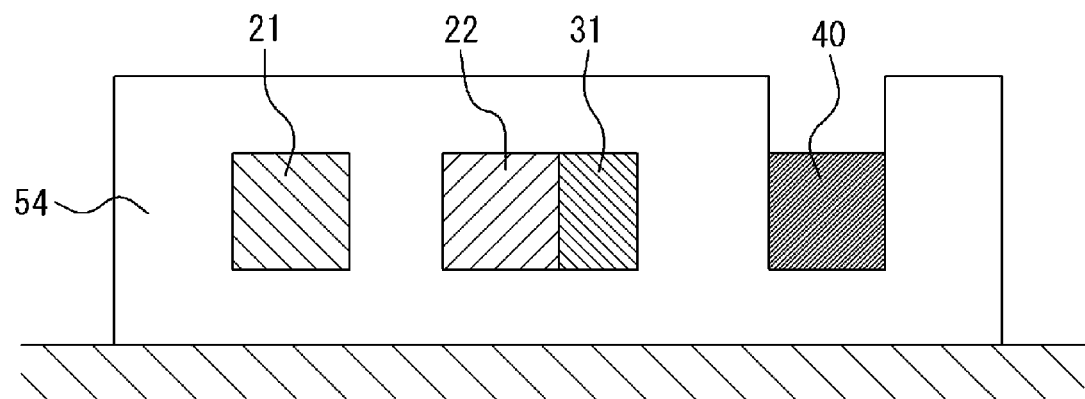
FIG. 19A is a sectional view illustrating a magnetic body formed in the trench.

As illustrated in FIG. 19A, the magnetic body 40 is formed in the trench 73. The magnetic body 40 may be formed through a process such as plasma CVD or sputtering. The trench 73, in which the magnetic body 40 is formed, is also referred to as a second trench.

Figure 19B:
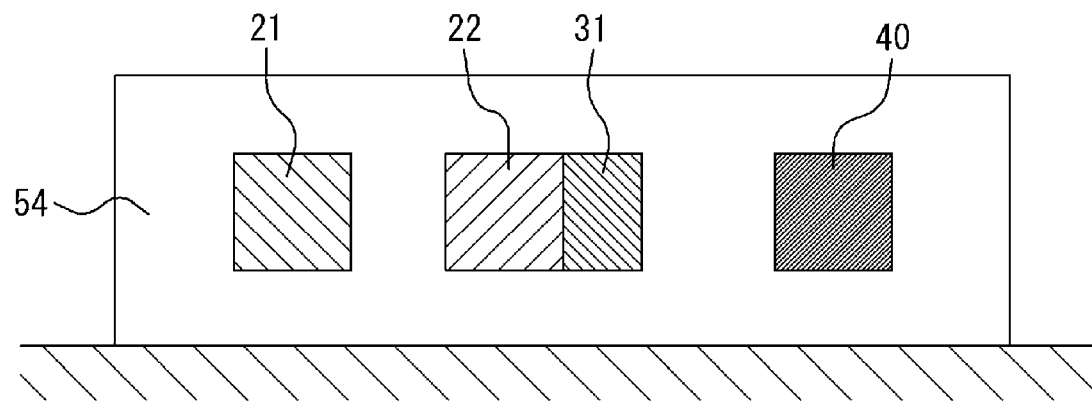
FIG. 19B is a sectional view illustrating the substrate in which an upper surface of the magnetic body is buried.

As illustrated in FIG. 19B, the trench 73, in which the magnetic body 40 has been formed, is buried with the cladding 54. As a result, the magnetic body 40 is embedded in the substrate 50. The cladding 54 may be formed through a process such as plasma CVD or sputtering. After the cladding 54 has been formed, the surface of the substrate 50 may be flattened through a process such as CMP.

Figure 19C:
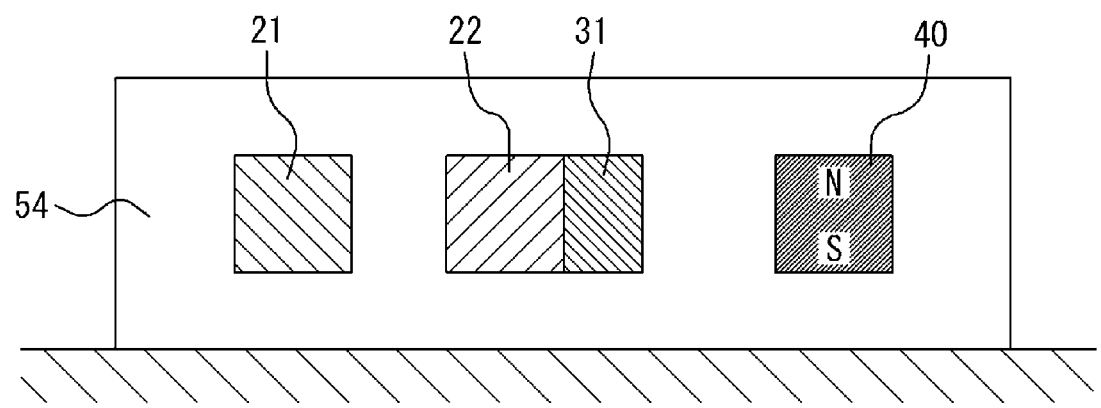
FIG. 19C is a sectional view illustrating the substrate in which the magnetic body of FIG. 19B is magnetized.

As illustrated in FIG. 19C, the magnetic body 40 is magnetized. Magnetization may be performed by applying a magnetic field to the substrate 50. By controlling the direction and the intensity of magnetization of the magnetic body 40, the magnitude of nonreciprocity exhibited by the asymmetric core in the isolator 10 is controlled.

Through the process flow described above with reference to FIGS. 18A to 18H and FIGS. 19A to 19C, the isolator 10 illustrated in FIGS. 1 and 2 can be manufactured.

The isolator 10 illustrated in FIG. 5 may be manufactured through a process flow illustrated in sectional views of FIGS. 20A to 20D.

Figure 20A:
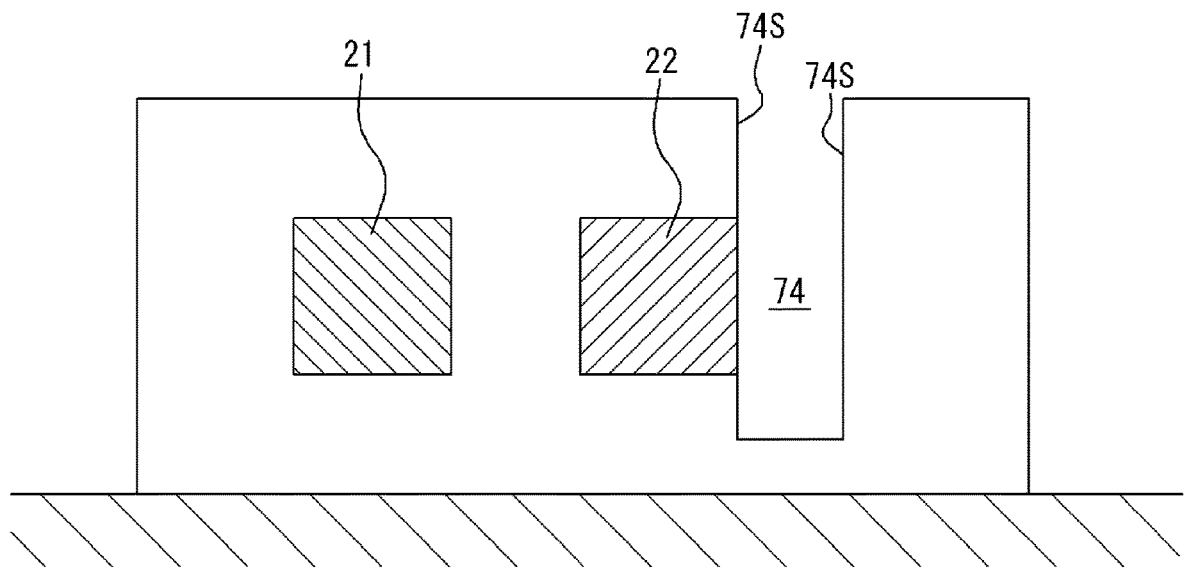
FIG. 20A is a sectional view illustrating the substrate of FIG. 18D in which a trench is formed.

In the substrate 50 that has been formed in the process illustrated up to FIG. 18D, a trench 74 is formed as illustrated in FIG. 20A. The trench 74 corresponds to a groove or a hole that is defined by side walls 74S. The trench 74 may be formed by dry etching such as RIE. Dry etching of the trench 74 may be performed in such a way that the second core 22 is covered by a side wall 74S and is not exposed. In this case, the dry etching process is not likely to inflict damage to the second core 22. The side wall 74S, which covers the second core 22, may be etched through a wet etching process such as hydrogen fluoride etching. In this case, even if the second core 22 is exposed due to forming of the trench 74, the second core 22 is not likely to be damaged. The position of the trench 74 and the depth of the trench 74 are determined based on the position of the magnetic body 40. As described above, the position of the magnetic body 40 is determined in such a way that a component in the third direction of the magnetic field H applied to a portion where the nonreciprocal member 31 is positioned is greater than any of the other components.

Figure 20B:
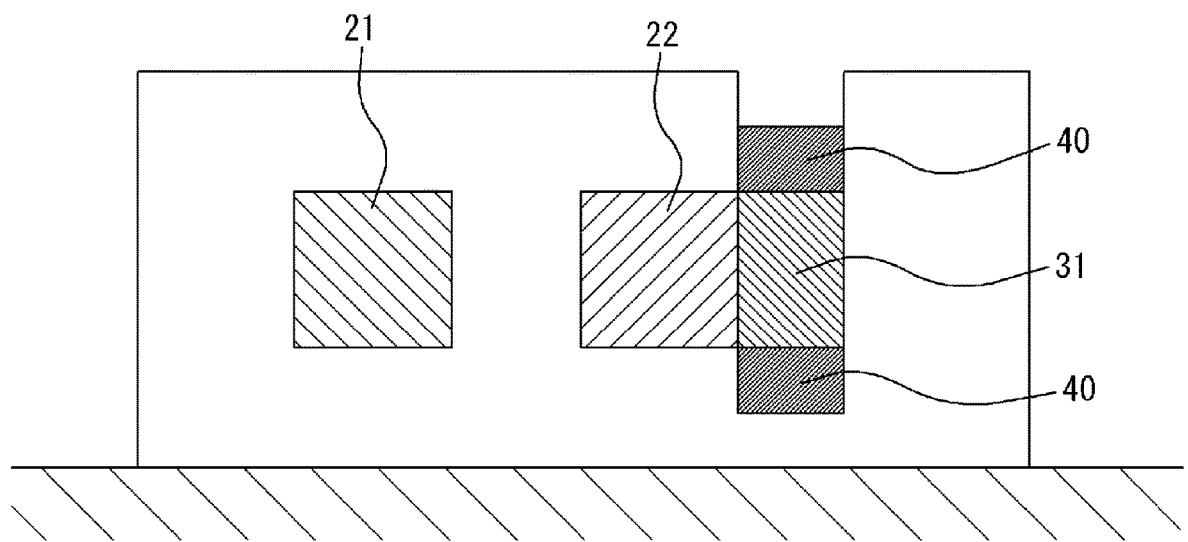
FIG. 20B is a sectional view illustrating a magnetic body and a nonreciprocal member formed in the trench.

As illustrated in FIG. 20B, the magnetic body 40 and the nonreciprocal member 31 are formed in the trench 74. The magnetic body 40 and the nonreciprocal member 31 may be formed through a process such as plasma CVD or sputtering. The magnetic body 40 may include the first magnetic body and the second magnetic body. In the trench 74, the first magnetic body, the nonreciprocal member 31, and the second magnetic body may be sequentially formed.

Figure 20C:
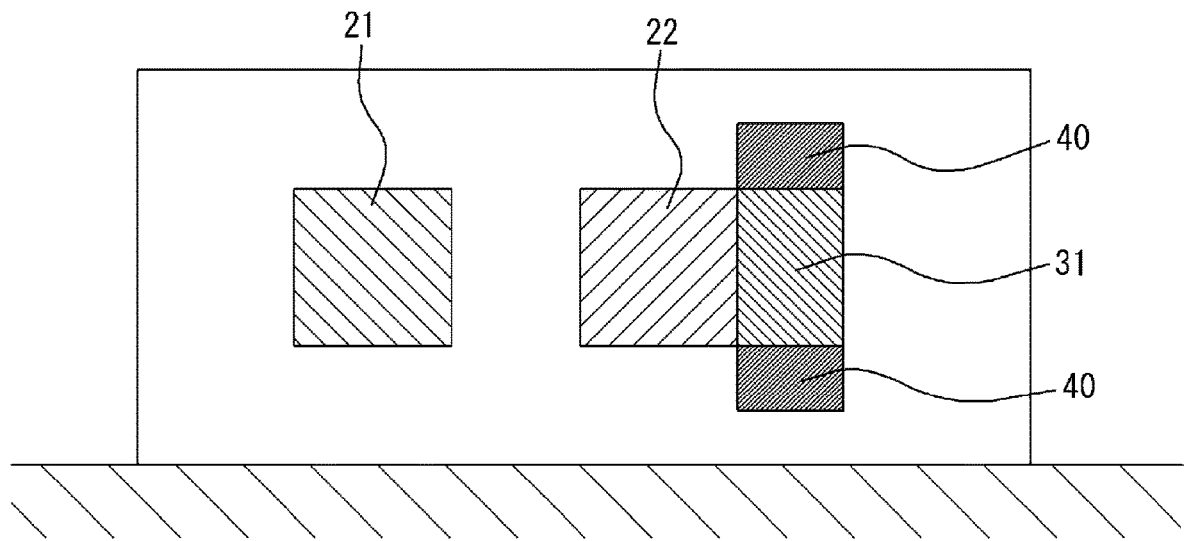
FIG. 20C is sectional view illustrating the substrate in which an upper surface of the magnetic body and the nonreciprocal member is buried.

As illustrated in FIG. 20C, the trench 74, in which the magnetic body 40 and the nonreciprocal member 31 have been formed, is buried with the cladding 54. As a result, the magnetic body 40 and the nonreciprocal member 31 are embedded in the substrate 50. The cladding 54 may be formed through a process such as plasma CVD or sputtering. After the cladding 54 has been formed, the surface of the substrate 50 may be flattened through a process such as CMP.

Figure 20D:
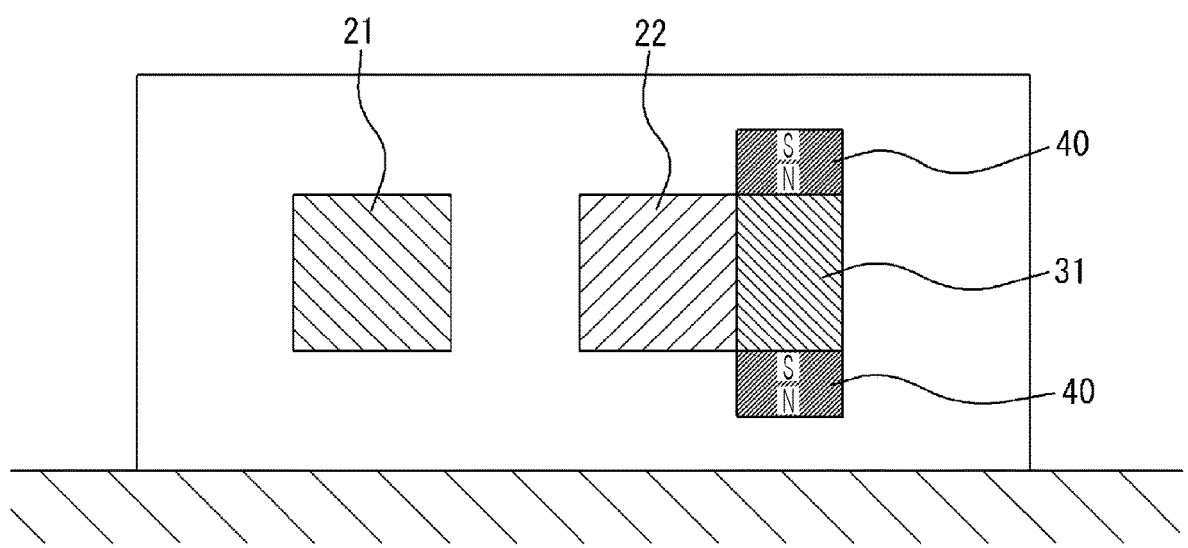
FIG. 20D is a sectional view illustrating the substrate in which the magnetic body of FIG. 20C is magnetized.

As illustrated in FIG. 20D, the magnetic body 40 is magnetized. Magnetization may be performed by applying a magnetic field to the substrate 50. By controlling the direction and the intensity of magnetization of the magnetic body 40, the magnitude of nonreciprocity exhibited by the asymmetric core in the isolator 10 is controlled.

Through the process flow described above with reference to FIGS. 20A to 20D, the isolator 10 illustrated in FIG. 5 can be manufactured.

The isolator 10 illustrated in FIGS. 10 and 11 may be manufactured through a process flow illustrated in sectional views of FIGS. 18A to 18H and FIGS. 21A to 21D.

As illustrated in FIG. 18A, the substrate 50 includes the base material 52 having the base material surface 52a and the cladding 54 positioned on the base material surface 52a.

As illustrated in FIG. 18B, the trenches 71 are formed in the cladding 54. The trenches 71 each correspond to a groove or a hole that is defined by the side walls 71S. The trenches 71 may be formed by, for example, dry etching such as reactive ion etching (RIE).

As illustrated in FIG. 18C, the first core 21, the second core 22, the third core 23, and the fourth core 24 are formed in the trenches 71. In a case where the first core 21, the second core 22, the third core 23, and the fourth core 24 are to be made of the same material, the first to fourth cores 21 to 24 may be simultaneously formed in the trenches 71. The first core 21, the second core 22, the third core 23, and the fourth core 24 may be formed through a process such as plasma chemical vapor deposition (CVD) or sputtering.

As illustrated in FIG. 18D, the trenches 71, in which the first core 21, the second core 22, the third core 23, and the fourth core 24 have been formed, are buried with the cladding 54. As a result, the first core 21, the second core 22, the third core 23, and the fourth core 24 are embedded in the substrate 50. The cladding 54 may be formed through a process such as plasma CVD or sputtering. After the cladding 54 has been formed, the surface of the substrate 50 may be flattened through a process such as chemical mechanical polishing (CMP).

As illustrated in FIG. 18E, trenches 72 are formed at positions adjacent to the second core 22 and the fourth core 24. The trenches 72 each correspond to a groove or a hole that is defined by side walls 72S. The trenches 72 may be formed by dry etching such as RIE. Dry etching of the trenches 72 may be performed in such a way that the second core 22 and the fourth core 24 are covered by side walls 72S and are not exposed. In this case, the dry etching process is not likely to inflict damage to the second core 22 and the fourth core 24. The side walls 72S, which cover the second core 22 and the fourth core 24, may be etched through a wet etching process such as hydrogen fluoride etching. In this case, even if the second core 22 and the fourth core 24 are exposed when the trenches 72 are formed, the second core 22 and the fourth core 24 are not likely to be damaged.

As illustrated in FIG. 18F, the first nonreciprocal member 31 and the second nonreciprocal member 32 are formed in the trenches 72. In a case where the first nonreciprocal member 31 and the second nonreciprocal member 32 are to be made of the same material, the first nonreciprocal member 31 and the second nonreciprocal member 32 may be simultaneously formed in the trenches 72. The first nonreciprocal member 31 and the second nonreciprocal member 32 may be formed through a process such as plasma CVD or sputtering. The trenches 72, in which the first nonreciprocal member 31 and the second nonreciprocal member 32 are formed, are each also referred to as a first trench.

As illustrated in FIG. 18G, the trenches 72, in which the first nonreciprocal member 31 and the second nonreciprocal member 32 have been formed, are buried with the cladding 54. As a result, the first nonreciprocal member 31 and the second nonreciprocal member 32 are embedded in the substrate 50. The cladding 54 may be formed through a process such as plasma CVD or sputtering. After the cladding 54 has been formed, the surface of the substrate 50 may be flattened through a process such as CMP.

As illustrated in FIG. 18H, the trench 73 is formed. The trench 73 corresponds to a groove or a hole that is defined by the side walls 73S. The trench 73 may be formed by dry etching such as RIE. The position of the trench 73 and the depth of the trench 73 are determined based on the position of the magnetic body 40. As described above, the position of the magnetic body 40 is determined in such a way that a component in the fifth direction of the magnetic field H applied to a portion where the first nonreciprocal member 31 is positioned is greater than any of the other components and in such a way that a component in the sixth direction of the magnetic field H applied to a portion where the second nonreciprocal member 32 is positioned is greater than any of the other components.

Figure 21A:
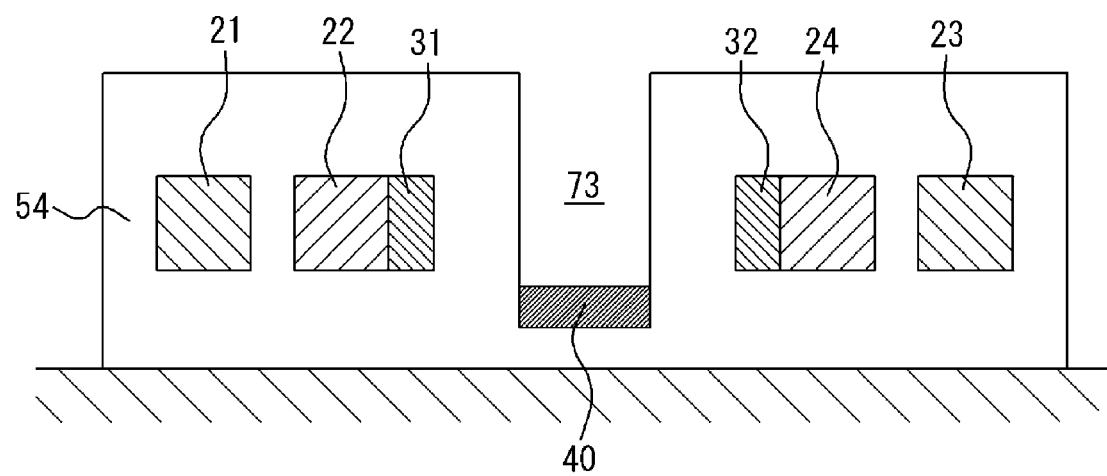
FIG. 21A is a sectional view illustrating a magnetic body formed in a trench.
Figure 21B:
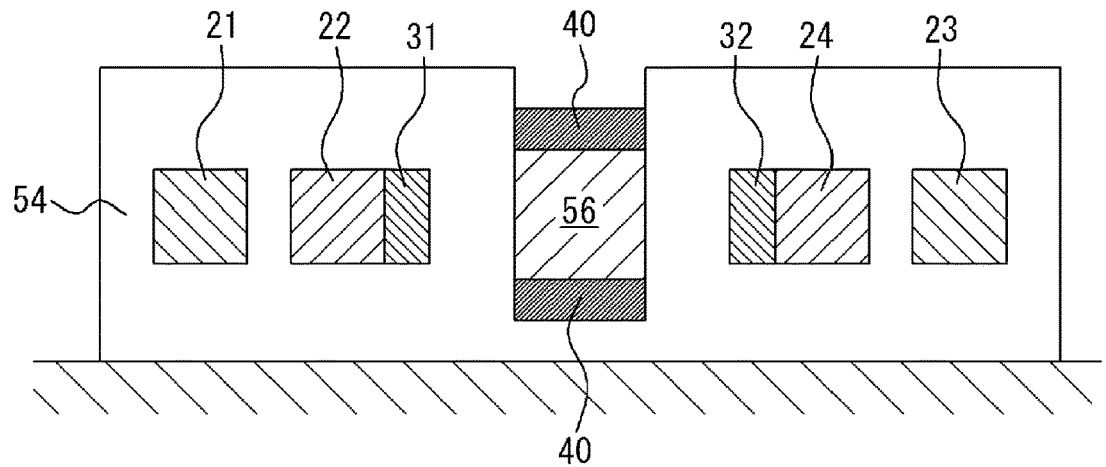
FIG. 21B is a sectional view illustrating the magnetic body further formed in the trench via an embedding material.

As illustrated in FIGS. 21A and 21B, the magnetic body 40 is formed in the trench 73. The magnetic body 40 may be formed through a process such as plasma CVD or sputtering. The trench 73, in which the magnetic body 40 is formed, is also referred to as a second trench. In a case where the magnetic body 40 includes the first magnetic body and the second magnetic body, an embedding material 56 may be formed between the first magnetic body and the second magnetic body. The embedding material 56 may be the same as the material that buries the upper surface of the trench 71 or 72 or may be the same as the material of the cladding 54.

Figure 21C:
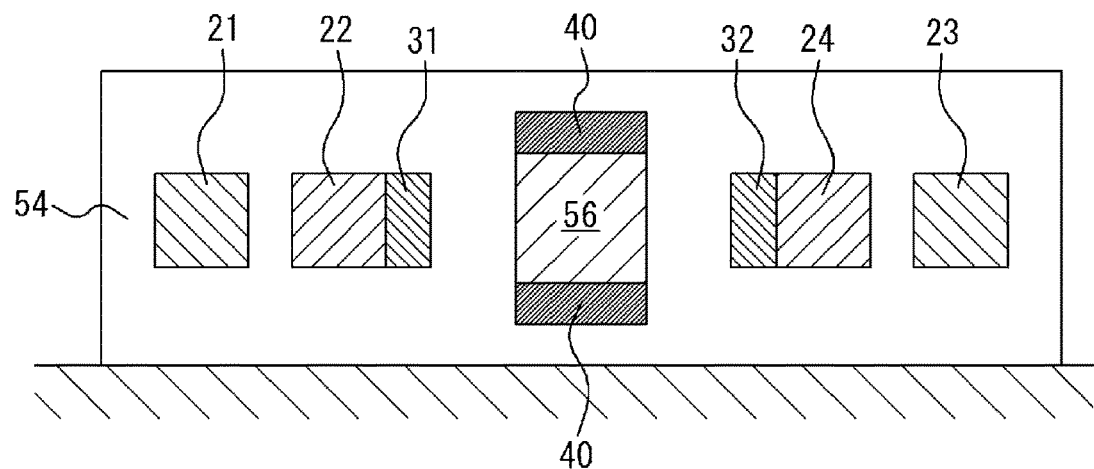
FIG. 21C is a sectional view illustrating a substrate in which an upper surface of the magnetic body is buried.

As illustrated in FIG. 21C, the trench 73, in which the magnetic body 40 has been formed, is buried with the cladding 54. As a result, the magnetic body 40 is embedded in the substrate 50. The cladding 54 may be formed through a process such as plasma CVD or sputtering. After the cladding 54 has been formed, the surface of the substrate 50 may be flattened through a process such as CMP.

Figure 21D:
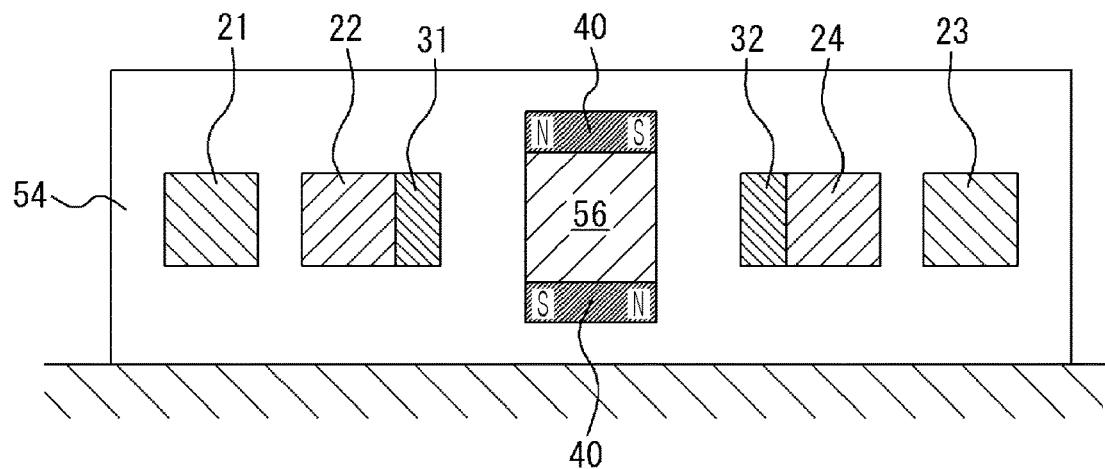
FIG. 21D is a sectional view illustrating the substrate in which the magnetic body of FIG. 21C is magnetized.

As illustrated in FIG. 21D, the magnetic body 40 is magnetized. Magnetization may be performed by applying a magnetic field to the substrate 50. By controlling the direction and the intensity of magnetization of the magnetic body 40, the magnitude of nonreciprocity exhibited by the asymmetric core in the isolator 10 is controlled.

Through the process flow described above with reference to FIGS. 18A to 18H and FIGS. 21A to 21D, the isolator 10 illustrated in FIGS. 10 and 11 can be manufactured.

Example Configuration of Electromagnetic Wave Transmitter 100

Figure 22:
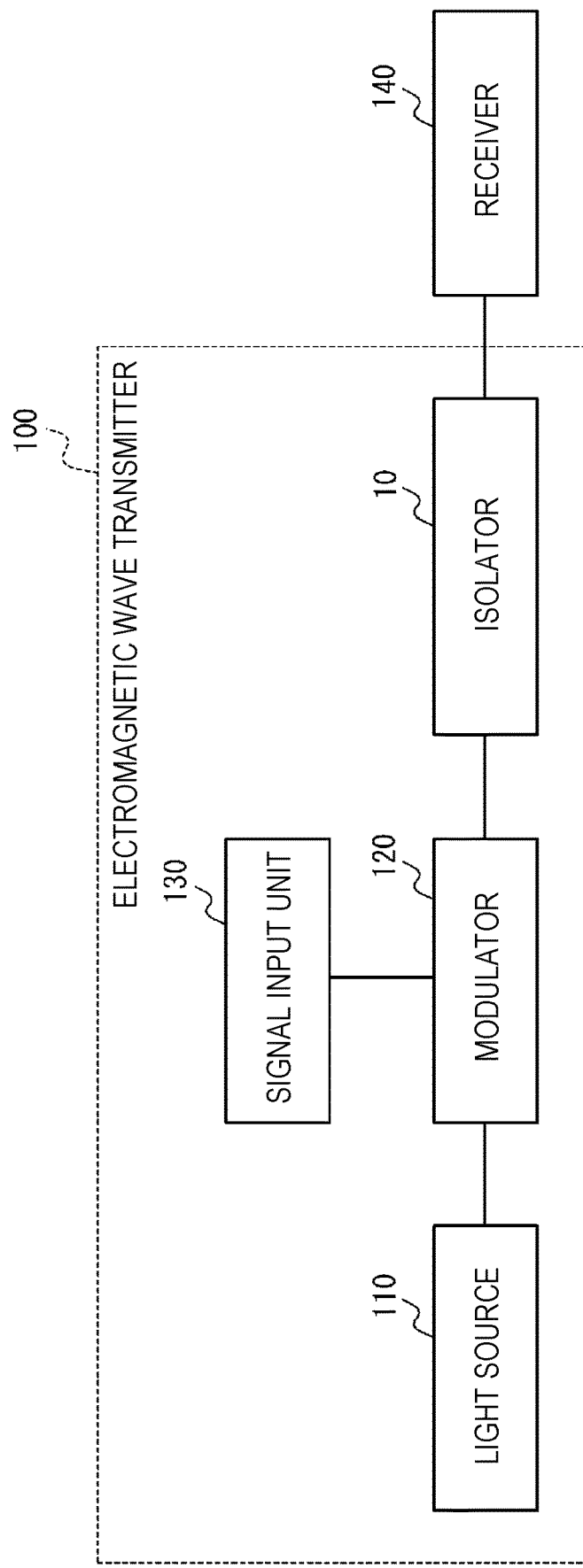
FIG. 22 is a block diagram of an example configuration of an electromagnetic wave transmitter according to a first embodiment.

The isolator 10 may be used in combination with a configuration that transmits an electromagnetic wave. As illustrated in FIG. 22, an electromagnetic wave transmitter 100 includes the isolator 10 and a light source 110. The electromagnetic wave transmitter 100 inputs an electromagnetic wave from the light source 110 to the isolator 10 and outputs an electromagnetic wave from the isolator 10 toward a receiver 140. The isolator 10 is configured in such a way that the transmittance of an electromagnetic wave from the light source 110 toward the receiver 140 is greater than the transmittance of an electromagnetic wave from the receiver 140 toward the light source 110. Thus, an electromagnetic wave is not likely to enter the light source 110. As a result, the light source 110 can be protected.

The light source 110 may be, for example, a laser diode (LD) or a semiconductor laser such as a vertical cavity surface emitting laser (VCSEL). The light source 110 may include a device that emits an electromagnetic wave that is not limited to visible light and that may be an electromagnetic wave having any appropriate wavelength. The light source 110 may be formed on the substrate 50 together with the isolator 10. The light source 110 may input to the isolator 10 a linearly polarized electromagnetic wave whose polarization direction is the X-axis direction.

The electromagnetic wave transmitter 100 may further include a modulator 120 and a signal input unit 130. The modulator 120 modulates an electromagnetic wave by changing the intensity of the electromagnetic wave. The modulator 120 may be positioned not between the light source 110 and the isolator 10 but between the isolator 10 and the receiver 140. The modulator 120 may, for example, pulse-modulate an electromagnetic wave. The signal input unit 130 receives input of a signal from an external apparatus or the like. The signal input unit 130 may include, for example, a D/A converter. The signal input unit 130 outputs a signal to the modulator 120. The modulator 120 modulates an electromagnetic wave based on a signal obtained by the signal input unit 130.

The light source 110 may include the modulator 120 and the signal input unit 130. In this case, the light source 110 may output a modulated electromagnetic wave and input the modulated electromagnetic wave to the isolator 10.

Figure 23:
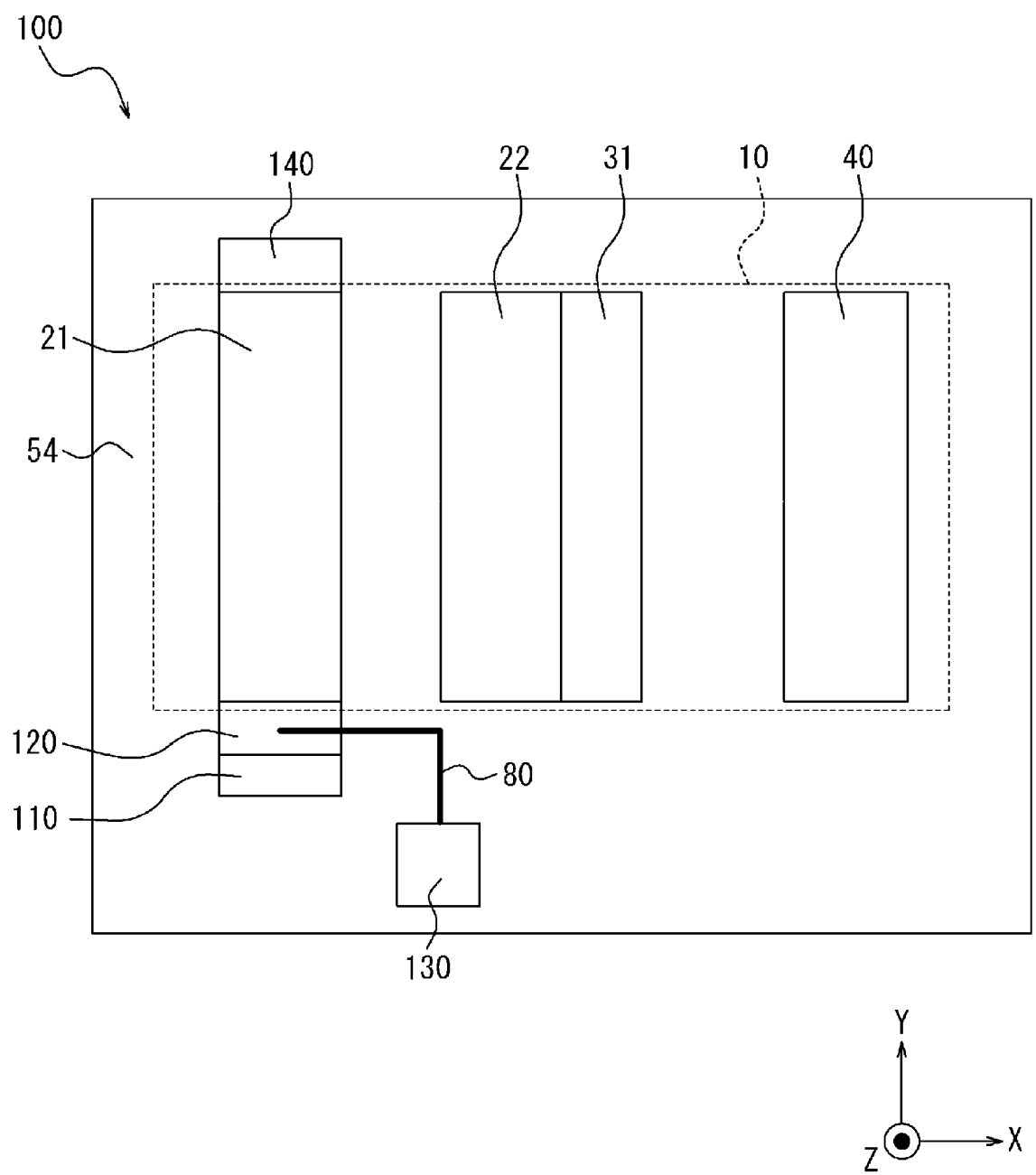
FIG. 23 is a plan view illustrating the example configuration of the electromagnetic wave transmitter according to the first embodiment.

As illustrated in FIG. 23, the electromagnetic wave transmitter 100 may be mounted on the substrate 50. The light source 110 may be mounted in such a way as to be connected via the modulator 120 to an end portion of the first core 21 in the negative direction of the Y axis. In this case, the modulator 120 is mounted in such a way as to be connected to the end portion of the first core 21 in the negative direction of the Y axis. The light source 110 may be mounted in such a way as to be connected, not via the modulator 120, to the end portion of the first core 21 in the negative direction of the Y axis. The receiver 140 may be mounted in such a way as to be connected, not via the modulator 120, to an end portion of the first core 21 in the positive direction of the Y axis. The receiver 140 may be mounted in such a way as to be connected via the modulator 120 to the end portion of the first core 21 in the positive direction of the Y axis. In this case, the modulator 120 is mounted in such a way as to be connected to the end portion of the first core 21 in the positive direction of the Y axis. The signal input unit 130 may be connected to the modulator 120 through an electric wire 80. The electric wire 80 may be positioned in such a way as not to overlap the magnetic body 40 when the substrate 50 is seen in a plan view from the third direction. Thus, an electric signal transferred by the electric wire 80 is not likely to be affected by the magnetic field H generated by the magnetic body 40. Moreover, a magnetic field generated due to an electric signal transferred by the electric wire 80 is not likely to affect the magnetic field H generated by the magnetic body 40.

Figure 24:
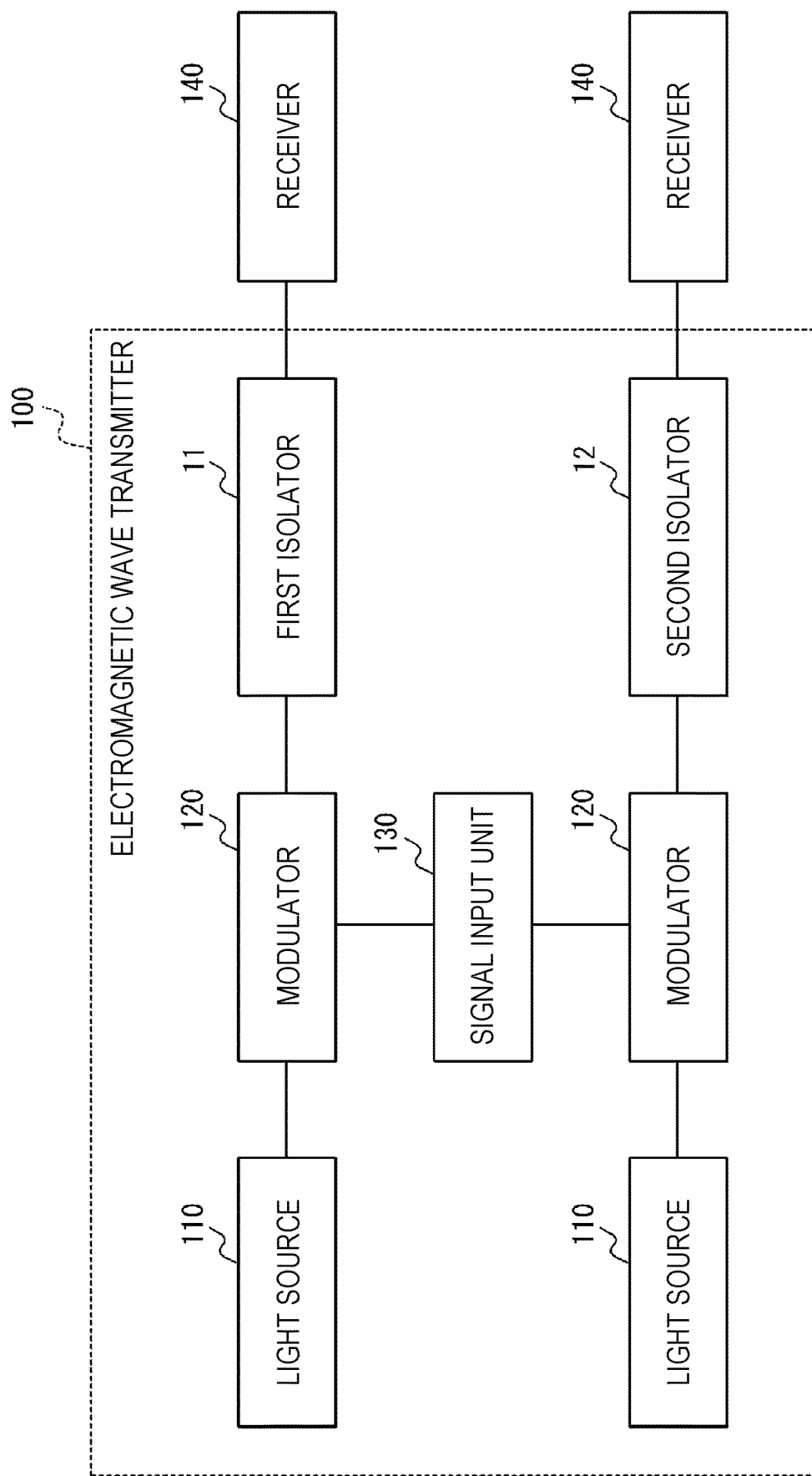
FIG. 24 is block diagram of an example configuration of an electromagnetic wave transmitter according to another example of the first embodiment.

The isolator 10, which includes the first isolator 11 and the second isolator 12, may be used in combination with a configuration that transmits an electromagnetic wave. As illustrated in FIG. 24, an electromagnetic wave transmitter 100 includes the first isolator 11, the second isolator 12, and light sources 110. The electromagnetic wave transmitter 100 inputs electromagnetic waves from the light sources 110 to the first isolator 11 and the second isolator 12 and outputs electromagnetic waves from the first isolator 11 and the second isolator 12 toward the receiver 140. The first isolator 11 and the second isolator 12 are each configured in such a way that the transmittance of an electromagnetic wave from the light source 110 toward the receiver 140 is greater than the transmittance of an electromagnetic wave from the receiver 140 toward the light source 110. Thus, an electromagnetic wave is not likely to enter the light source 110. As a result, the light source 110 can be protected.

The light sources 110 each may be, for example, a laser diode (LD) or a semiconductor laser such as a vertical cavity surface emitting laser (VCSEL). The light sources 110 each may include a device that emits an electromagnetic wave that is not limited to visible light and that may be an electromagnetic wave having any appropriate wavelength. The light sources 110 may be formed on the substrate 50 together with the first isolator 11 and the second isolator 12. The light sources 110 may input to the first isolator 11 and the second isolator 12 linearly polarized electromagnetic waves whose polarization direction is the X-axis direction.

The electromagnetic wave transmitter 100 may further include modulators 120 and a signal input unit 130. The modulators 120 each modulate an electromagnetic wave by changing the intensity of the electromagnetic wave. The modulators 120 each may be positioned not between the light source 110 and the isolator 10 but between the isolator 10 and the receiver 140. The modulators 120 each may, for example, pulse-modulate an electromagnetic wave. The signal input unit 130 receives input of a signal from an external apparatus or the like. The signal input unit 130 may include, for example, a D/A converter. The signal input unit 130 may output a signal to the modulator 120. The modulators 120 each modulate an electromagnetic wave based on a signal obtained by the signal input unit 130.

The light sources 110 each may include the modulator 120 and the signal input unit 130. In this case, the light sources 110 may output modulated electromagnetic waves and input the modulated electromagnetic waves to the first isolator 11 and the second isolator 12.

Figure 25:
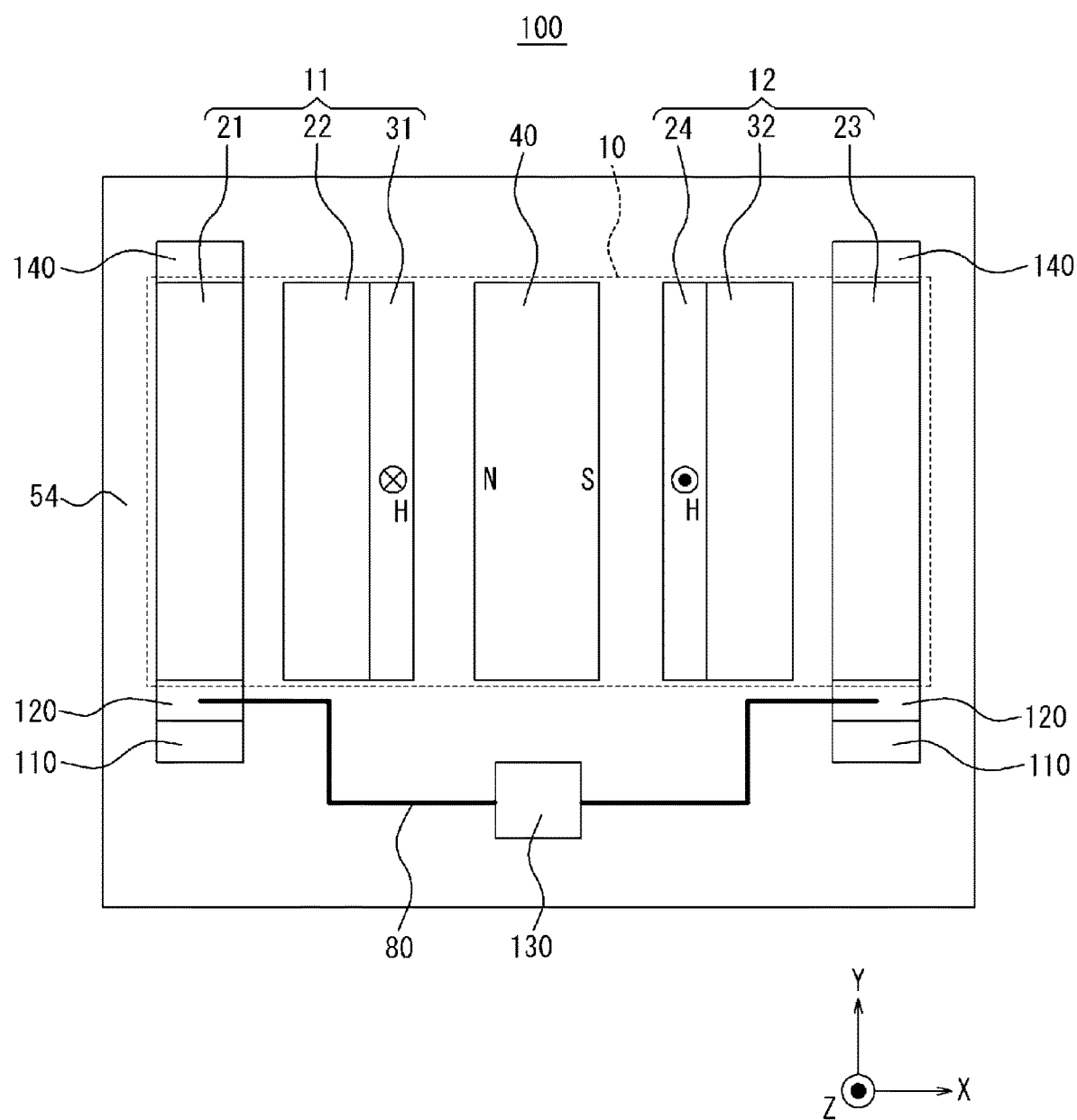
FIG. 25 is a plan view illustrating the example configuration of the electromagnetic wave transmitter according to the other example of the first embodiment.

As illustrated in FIG. 25, the electromagnetic wave transmitter 100 may be mounted on the substrate 50. The light sources 110 may be mounted in such a way as to be connected via the modulators 120 to end portions of the first core 21 and the third core 23 in the negative direction of the Y axis. In this case, the modulators 120 are mounted in such a way as to be connected to the end portions of the first core 21 and the third core 23 in the negative direction of the Y axis. The light sources 110 may be mounted in such a way as to be connected not via the modulators 120 to the end portions of the first core 21 and the third core 23 in the negative direction of the Y axis. The receivers 140 may be mounted in such a way as to be connected not via the modulators 120 to end portions of the first core 21 and the third core 23 in the positive direction of the Y axis. The receivers 140 may be mounted in such a way as to be connected via the modulators 120 to the end portions of the first core 21 and the third core 23 in the positive direction of the Y axis. In this case, the modulators 120 are mounted in such a way as to be connected to the end portions of the first core 21 and the third core 23 in the positive direction of the Y axis. The signal input unit 130 may be connected to the modulators 120 by using the electric wires 80. The electric wires 80 each may be positioned in such a way as not to overlap the magnetic body 40 when the substrate 50 is seen in a plan view from the Z-axis direction. Thus, electric signals transferred by the electric wires 80 are not likely to be affected by the magnetic field H generated by the magnetic body 40. Moreover, magnetic fields generated due to electric signals transferred by the electric wires 80 are not likely to affect the magnetic field H generated by the magnetic body 40.

Second Embodiment

In an isolator of a waveguide type, if reflection of an incident light occurs at a terminal end of the waveguide, the reflected light becomes return light, and a failure such as damage to a light source may occur. It is required that reflection at an end portion of the waveguide can be reduced.

Figure 26:
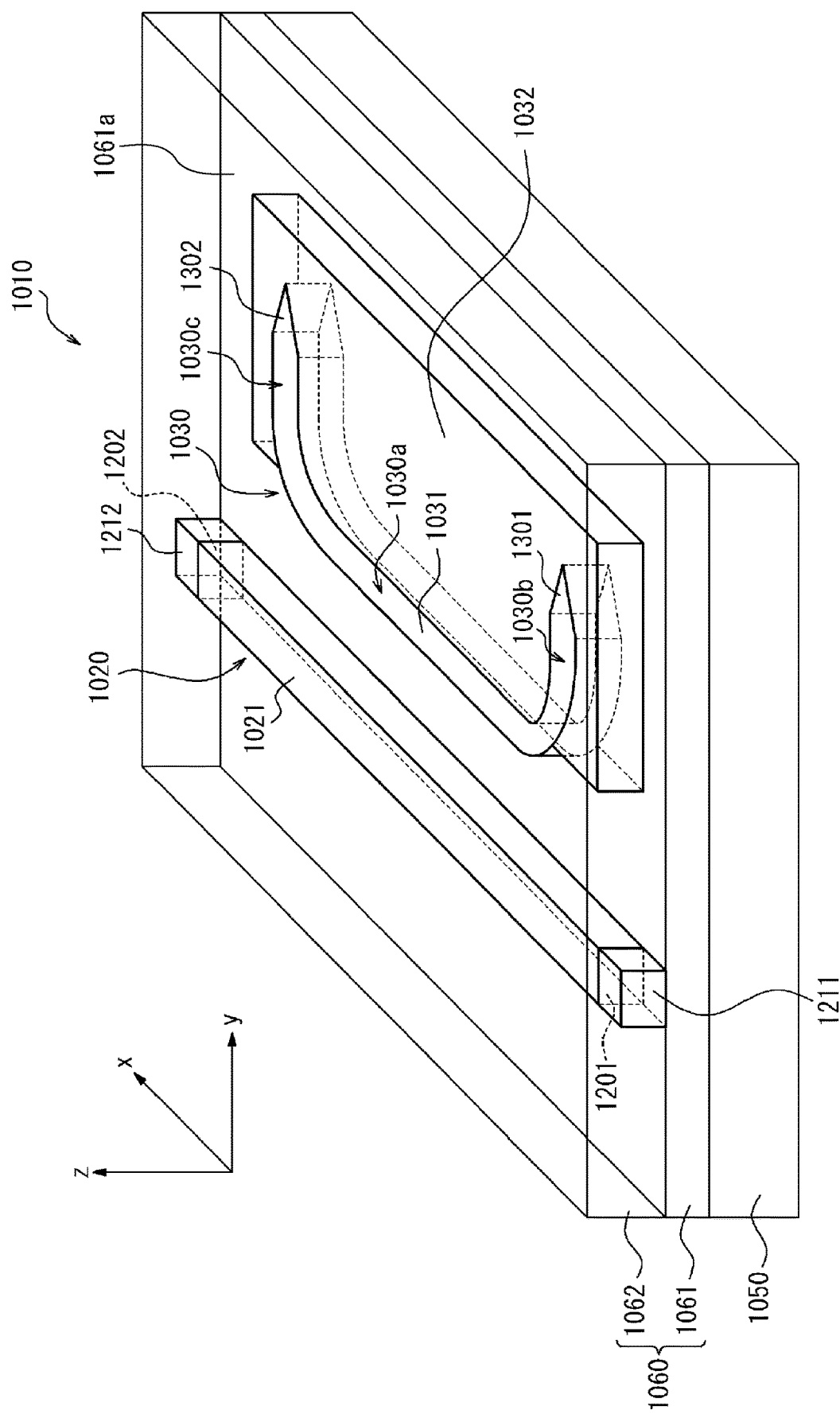
FIG. 26 is a perspective view illustrating an isolator according to a second embodiment.
Figure 27:
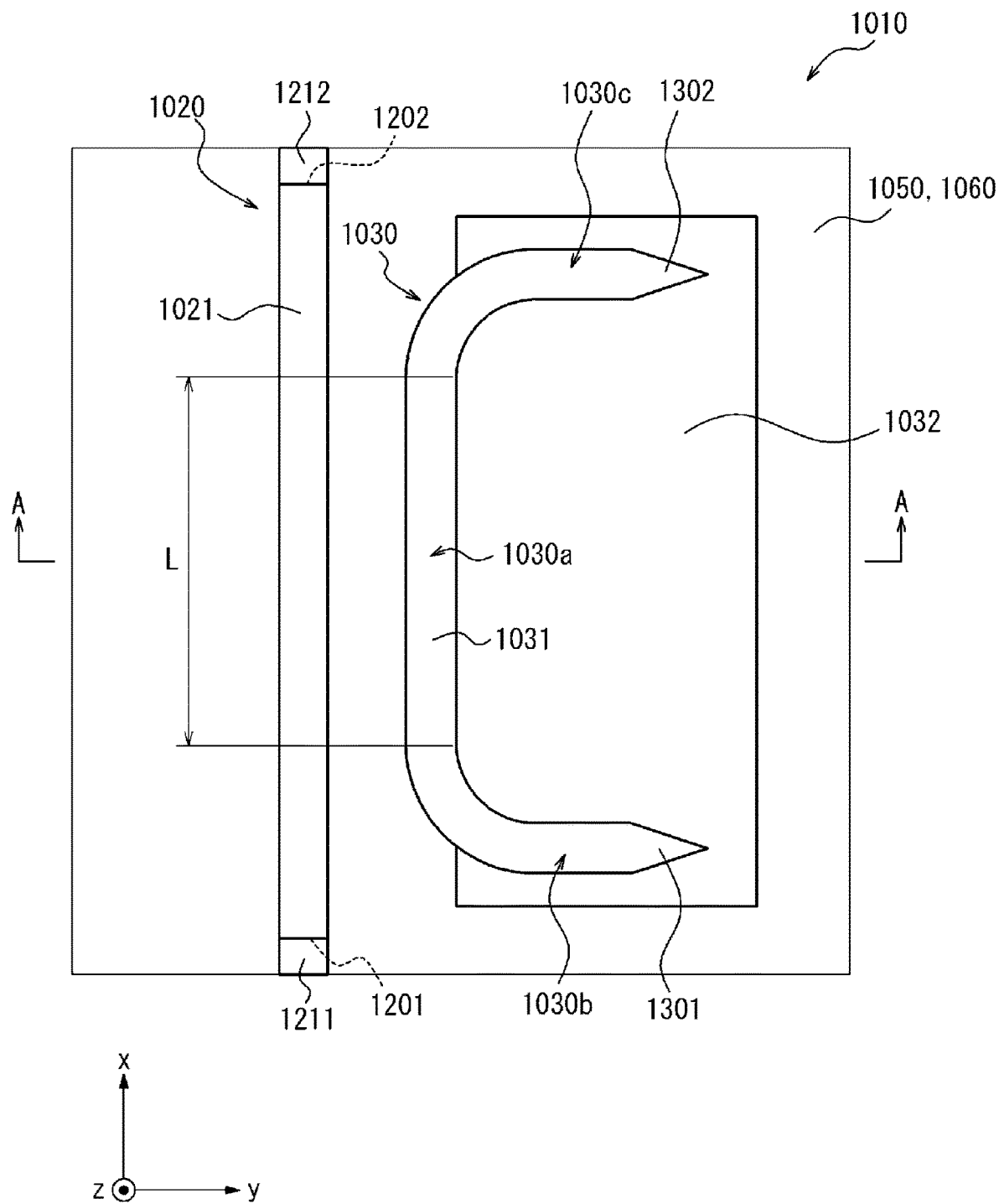
FIG. 27 is a plan view illustrating the isolator of FIG. 26.

As illustrated in FIGS. 26 to 28, an isolator 1010 according to a second embodiment includes a substrate 1050, a first waveguide 1020, and a second waveguide 1030. The first waveguide 1020 and the second waveguide 1030 are disposed along a substrate surface 1050a of the substrate 1050 (see FIG. 28). The first waveguide 1020 and the second waveguide 1030 are arranged at least partially close to and parallel to each other.

For convenience of the following description, the x-axis direction, the y-axis direction, and the z-axis direction are defined as follows. As illustrated in FIGS. 26 to 28, the x-axis direction is a direction in which the first waveguide 1020 extends. The positive direction of the x axis is defined as a direction from one end portion (a first end 1201 described below) toward the other end portion (a second end 1202 described below) of the first waveguide 1020. The y-axis direction is defined as a direction that is along the substrate surface 1050a of the substrate 1050 and that intersects the x-axis direction. The y-axis direction may be substantially perpendicular to the x-axis direction. The positive direction of the y axis is defined as a direction toward a side on which the second waveguide 1030 is positioned as seen from the first waveguide 1020. The z-axis direction is a direction perpendicular to the substrate surface 1050a. The z-axis direction is perpendicular to the x-axis direction and the y-axis direction. The positive direction of the z axis is defined as a direction toward a side on which the first waveguide 1020 and the second waveguide 1030 are disposed as seen from the substrate 1050.

Hereafter, each constituent element of the isolator 1010 will be described in further detail.

The substrate 1050 can be made of any appropriate material. For example, the substrate 1050 may be made of a material selected from materials including metal conductors, semiconductors such as silicon, glass, and resins. The substrate 1050 may have any appropriate shape. For example, the substrate 1050 may have a rectangular shape that has two sides extending in the x-axis direction and the y-axis direction and that is elongated in the x-axis direction.

On the substrate surface 1050a of the substrate 1050, a first cladding 1061, which is common to the first waveguide 1020 and the second waveguide 1030, is formed. On an upper surface 1061a if the first cladding 1061, a first core 1021, a second core 1031, and a nonreciprocal member 1032 are disposed. The nonreciprocal member 1032 is disposed in contact with the second core 1031.

As illustrated in FIG. 28, the peripheries and upper portions of the first core 1021, the second core 1031, and the nonreciprocal member 1032 are covered by a second cladding 1062 that is formed on the first cladding 1061. The first cladding 1061 and the second cladding 1062 can be collectively referred to as a cladding 1060. The first core 1021, the second core 1031, and the nonreciprocal member 1032 are surrounded by the cladding 1060. The first waveguide 1020 includes the first core 1021 and a portion of the cladding 1060 close to the first core 1021. The second waveguide 1030 includes the second core 1031, the nonreciprocal member 1032, and a portion of the cladding 1060 close to the second core 1031 and the nonreciprocal member 1032.

The first core 1021, the second core 1031, and the cladding 1060 each may include a dielectric. The first core 1021 and the second core 1031 are each also referred to as a dielectric line. The relative permittivity of each of the first core 1021 and the second core 1031 may be higher than the relative permittivity of the cladding 1060. The first cladding 1061 and the second cladding 1062, which constitute the cladding 1060, may be made of the same dielectric material. The first cladding 1061 and the second cladding 1062 may be integrated. In a case where the first cladding 1061 and the second cladding 1062 are integrated, the isolator 1010 can be easily formed. The relative permittivity of each of the first core 1021, the second core 1031, and the cladding 1060 may be higher than the relative permittivity of air. When the relative permittivity of each of the first core 1021, the second core 1031, and the cladding 1060 is higher than the relative permittivity of air, leakage of an electromagnetic wave from the first waveguide 1020 and the second waveguide 1030 can be suppressed. As a result, loss due to radiation of an electromagnetic wave from the isolator 1010 to the outside can be reduced.

The first core 1021 and the second core 1031 may be made of, for example, silicon (Si). The cladding 1060 may be made of, for example, quartz glass ($SiO_2$). The relative permittivity of silicon and the relative permittivity of quartz glass are respectively about 12 and about 2. Silicon can propagate an electromagnetic wave having an infrared wavelength in the range of about 1.2 μm to about 6 μm at a low loss. When made of silicon, the first core 1021 and the second core 1031 can propagate an electromagnetic wave having a wavelength in a 1.3 µm band or a 1.55 µm band, which is used for optical communication, at a low loss.

The materials of the first core 1021, the second core 1031, and the cladding 1060 are not limited to the materials described above. As long as the function as the isolator 1010 according to the present disclosure can be obtained, the first core 1021, the second core 1031, and the cladding 1060 may be made of any material. A portion of the second cladding 1062 need not be a layer of a specific material and may be air (dielectric).

The relative permittivity of each of the first core 1021 and the second core 1031 may be distributed uniformly in the z-axis direction or may be distributed in such a way as to change in the z-axis direction. For example, the relative permittivity of the first core 1021 may be distributed in such a way as to be the highest at a central portion in the z-axis direction and to decrease with decreasing distance to the first cladding 1061 and the second cladding 1062. In this case, the first waveguide 1020 can propagate an electromagnetic wave based on a principle similar to that of a graded-index optical fiber.

The first core 1021 and the second core 1031, which are covered by the cladding 1060, propagate an electromagnetic wave. In the present disclosure, an electromagnetic wave can include an electromagnetic wave having any appropriate wavelength. The wavelength of the electromagnetic wave may be included in a band of light from ultraviolet light to infrared light. When the wavelength of the electromagnetic wave is included in a wavelength band of light, the isolator 1010 is also referred to as an optical isolator. The band of the electromagnetic wave may be a wavelength band of the wavelength 1.55 µm or the like, which is used in silicon photonics.

The first waveguide 1020 and the second waveguide 1030 according to the present embodiment each can propagate an electromagnetic wave in the TE mode. An electromagnetic weave that does not have an electric field component in the propagation direction is referred to as the TE mode. In the waveguide, an electromagnetic wave in the TE mode has an electric field that oscillates in a horizontal direction with respect to the substrate 1050. An electromagnetic wave in the TE mode is also referred to as a TE wave. In a device or a system including the isolator 1010, the first waveguide 1020 and the second waveguide 1030 each may be designed to propagate an electromagnetic wave in the TE mode. Therefore, the polarization direction of an electromagnetic wave input to the isolator 1010 may be parallel to the substrate 1050. When an electromagnetic wave is light, the polarization direction is also referred to as the optical polarization direction.

The first waveguide 1020 and the second waveguide 1030 may satisfy waveguide conditions in a single mode. When the first waveguide 1020 and the second waveguide 1030 satisfy waveguide conditions in a single mode, the waveform of a signal that propagates in the first waveguide 1020 and the second waveguide 1030 does not collapse easily. The isolator 1010, which includes a combination of the first waveguide 1020 and the second waveguide 1030 that satisfy waveguide conditions in a single mode, can be suitable for optical communication.

The first waveguide 1020 extends longer than the second waveguide 1030 in the x-axis direction. The first waveguide 1020 can have a linear shape. The shape of the first waveguide 1020 is not limited to a linear shape. The first waveguide 1020 may have a bent portion. The isolator 1010 illustrated in FIGS. 26 to 28 will be described on the assumption that the first waveguide 1020 extends in the x-axis direction.

The first waveguide 1020 has the first end 1201 and the second end 1202, respectively on a side in the negative direction of the x axis and on a side in the positive direction of the x axis. The first waveguide 1020 includes a first port 1211 and a second port 1212, through which an electromagnetic wave is input and output, respectively at the first end 1201 and the second end 1202. An electromagnetic wave that is input from the first port 1211 to the first waveguide 1020 travels along the x axis toward the second port 1212. An electromagnetic wave that is input from the second port 1212 to the first waveguide 1020 travels along the x axis toward the first port 1211. The first port 1211 and the second port 1212 each may be an end surface of the first core 1021 or may be a coupler that can be connected to an external apparatus and can propagate an electromagnetic wave.

The second waveguide 1030 is positioned on the substrate 1050 at least partially side by side with the first waveguide 1020 along the substrate surface 1050a. The second waveguide 1030 includes a first portion 1030a and second portions 1030b and 1030c. The first portion 1030a extends along the first waveguide 1020. The first portion 1030a of the second waveguide 1030 is disposed linearly in the x-axis direction in such a way as to be parallel to the first waveguide 1020. In the first portion 1030a of the second waveguide 1030, the second core 1031 is positioned close to the first core 1021 to such an extent that coupling of electromagnetic near fields (evanescent fields) can occur between the second core 1031 and the first core 1021 of the first waveguide 1020.

The second waveguide 1030 further includes the second portions 1030b and 1030c where coupling of electromagnetic near fields does not occur between the second waveguide 1030 and the first waveguide 1020. The second portions 1030b and 1030c are not included in the first portion 1030a of the second waveguide 1030. The second portions 1030b and 1030c of the second waveguide 1030 may be positioned on one side or on both sides of the first portion 1030a in the longitudinal direction of the second waveguide 1030. In the example illustrated in FIGS. 26 to 28, the second portions 1030b and 1030c of the second waveguide 1030 are positioned on both sides of the first portion 1030a. In the following, the second portions 1030b and 1030c of the second waveguide 1030 will be described on the assumption that the second portions 1030b and 1030c are positioned on both sides of the first portion 1030a. The second portion 1030b is positioned on a side in the negative direction of the x axis with respect to the first portion 1030a. The second portion 1030c is positioned on a side in the positive direction of the x axis with respect to the first portion 1030a.

The second portions 1030b and 1030c of the second waveguide 1030 are bent in a direction away from the first waveguide 1020 on a side of the first portion 1030a. That is, the second portions 1030b and 1030c are bent in the positive direction of the y axis. Between the first portion 1030a and each of the second portions 1030b and 1030c of the second waveguide 1030, a portion in which the state of the second waveguide 1030 changes from a state coupled with the first waveguide 1020 to a state uncoupled with the first waveguide 1020 may exist. The portion in which the state of the second waveguide 1030 changes from a state coupled with the first waveguide 1020 to a state uncoupled with the first waveguide 1020 need not be included in the second portions 1030b and 1030c.

The second waveguide 1030 has a first end 1301 and a second end 1302 respectively in the second portion 1030*b* positioned on a side in the negative direction of the x axis and in the second portion 1030*c* positioned on a side in the positive direction of the x axis. In other words, the second waveguide 1030 has both ends.

At each of the first end 1301 and the second end 1302 of the second waveguide 1030, the second core 1031 can have an end surface that tapers toward the tip. In other words, the diameters of both ends of the second core 1031 of the second waveguide 1030 decrease toward the tips. The tapered portions of the second core 1031 can be made longer than the wavelength of an electromagnetic wave that propagates in the isolator 1010. The cross section of each of the first end 1301 and the second end 1302 cut along a plane parallel to the xy-plane has a tapered shape. Moreover, in the z-axis direction, the widths of the first end 1301 and the second end 1302 may decrease toward the tips. The tapered shape can be paraphrased as a tapered shape whose diameter decreases toward the tip.

Portions of the first waveguide 1020 and the second waveguide 1030 that extend along each other are also referred to as a parallel waveguide. In the portions of the first waveguide 1020 and the second waveguide 1030 that extend along each other, coupling of electromagnetic near fields can occur between the waveguides. In the parallel waveguide, an electromagnetic wave that is input to one waveguide in a portion where the first waveguide 1020 and the second waveguide 1030 extend along each other can transfer to the other waveguide while propagating in the one waveguides. That is, an electromagnetic wave that propagates in the first waveguide 1020 can transfer to the second waveguide 1030. An electromagnetic wave that propagates in the second waveguide 1030 can transfer to the first waveguide 1020.

In a parallel waveguide, a coupling coefficient refers to a parameter that represents the proportion of the electromagnetic wave that transfers from one waveguide to the other waveguide. If an electromagnetic wave does not transfer from one waveguide to the other waveguide at all, the coupling coefficient is 0. If the entirety of an electromagnetic wave transfers from one waveguide to the other waveguide, the coupling coefficient is 1. The coupling coefficient can have a value that is greater than or equal to 0 and less than or equal to 1. The coupling coefficient is determined based on the shapes of waveguides, the distance between the waveguides, a length over which the waveguides extend along each other, and the like. For example, the coupling coefficient can be higher as the shapes of waveguides become more similar to each other. Regarding the distance between the waveguides, the coupling coefficient changes in accordance with the distance over which an electromagnetic wave propagates in the waveguides. That is, in a parallel waveguide, the coupling coefficient can differ in accordance with a position in the direction in which the waveguides extend. The maximal value of the coupling coefficient can be determined based on the shapes of the waveguides, the distance between the waveguides, or the like. The maximal value of the coupling coefficient can be less than or equal to 1.

In a parallel waveguide, the coupling coefficient at the start point of an interval in which the waveguides extend along each other is 0. The length from the start point to a position where the coupling coefficient has a maximal value is also referred to as the coupling length. When the length over which the waveguides extend along each other is equal to the coupling length, the coupling coefficient at the end point of the interval in which the waveguides extend along each other can have a maximal value. The coupling length can be determined based on the shapes of the waveguides, the distance between the waveguides, or the like.

In the second waveguide 1030, an electromagnetic wave that has transferred from the first waveguide 1020 propagates in the second waveguide 1030 in the same direction as in the first waveguide 1020. In the second waveguide 1030, the electromagnetic wave propagates in the second core 1031 toward the first end 1301 or the second end 1302 while repeating total reflection. When the electromagnetic wave reaches the first end 1301 or the second end 1302, the electromagnetic wave can be emitted from the first end 1301 or the second end 1302, or can be reflected at the first end 1301 or the second end 1302 and travel in the opposite direction.

The nonreciprocal member 1032 includes a nonreciprocal material. The nonreciprocal material has propagation characteristics that differ depending on the propagation direction of an electromagnetic wave. The nonreciprocal member 1032 may include a magnetic material. For example, as the nonreciprocal member 1032, a dielectric composite including magnetic nanoparticles, such as a nanogranular material, can be used. A nonreciprocal material used in the nonreciprocal member 1040 may have electromagnetic-wave absorbing properties.

The nonreciprocal member 1032 is positioned on a side in the positive direction of the y axis with respect to the first portion 1030*a* of the second core 1031 of the second waveguide 1030. The nonreciprocal member 1032 may be in contact with the second core 1031 over the entirety of a surface along the x axis of the second core 1031 of the first portion 1030*a* of the second waveguide 1030. Alternatively, the nonreciprocal member 1032 may be in contact with a part of the second core 1031. When the nonreciprocal member 1032 is in contact with the second core 1031 in the first portion 1030*a* of the second waveguide 1030, the second waveguide 1030 has nonreciprocity as described below.

The nonreciprocal member 1032 is further in contact with at least a part of the second core 1031 of the second portions 1030*b* and 1030*c* of the second waveguide 1030. For example, in the second portions 1030*b* and 1030*c* of the second waveguide 1030, when the second core 1031 has a plurality of side surfaces around a direction in which the second waveguide 1030 extends, the nonreciprocal member 1032 may be in contact with at least one of the plurality of side surfaces of the second core 1031.

The nonreciprocal member 1032 absorbs, at the surface in contact with the second waveguide 1030, a part of an electromagnetic wave that propagates in the second waveguide 1030. When a part of an electromagnetic wave that is propagated in the second waveguide 1030 is totally reflected at the interface where the second waveguide 1030 is in contact with the nonreciprocal member 1032, the part leaks out to the nonreciprocal member 1032 as an evanescent wave. The electromagnetic wave that has leaked out to the nonreciprocal member 1032 is at least partially absorbed by the nonreciprocal member 1032.

The nonreciprocal member 1032 may be in contact with the second portions 1030*b* and 1030*c* of the second waveguide 1030 in such a way as to at least partially cover the first end 1301 and the second end 1302. When the nonreciprocal member 1032 at least partially covers the first end 1301 and the second end 1302, an electromagnetic wave that has propagated in the second core 1031 is at least partially absorbed at the first end 1301 and the second end 1302.

As illustrated in FIG. 26, the second core 1031 of the second portions 1030b and 1030c of the second waveguide 1030 can be structured to be embedded in the nonreciprocal member 1032. The nonreciprocal member 1032 has a dimension in the z direction that is substantially equal to that of the second core 1031. In this case, the nonreciprocal member 1032 may be in contact with the entirety of the sides surfaces of the second portions 1030b and 1030c of the second waveguide 1030.

An electromagnetic wave that has been input to the first core 1021 from the first end 1201 of the first waveguide 1020 via the first port 1211 propagates toward the second end 1202 in the first core 1021 of the first waveguide 1020 that extends along the x axis. The direction from the first end 1201 toward the second end 1202 is also referred to as a first direction. An electromagnetic wave that propagates in the first core 1021 can transfer to the second core 1031 with a proportion in accordance with a coupling coefficient that is based on the distance over which the electromagnetic wave has propagated in the first direction through a portion of the first core 1021 extending along the second core 1031. A coupling coefficient in a case where an electromagnetic wave propagates in the first direction in the first core 1021 is also referred to as a first coupling coefficient.

An electromagnetic wave that has been input to the first core 1021 from the second end 1202 of the first waveguide 20 via the second port 1212 propagates toward the first end 1201 in the first core 1021 of the first waveguide 1020 that extends along the x axis. The direction from the second end 1202 toward the first end 1201 is also referred to as a second direction. An electromagnetic wave that propagates in the first core 1021 can transfer to the second core 1031 with a proportion in accordance with a coupling coefficient that is based on the distance over which the electromagnetic wave has propagated in the second direction in a portion of the first core 1021 extending along the second core 1031. A coupling coefficient in a case where an electromagnetic wave propagates in the second direction in the first core 1021 is also referred to as a second coupling coefficient.

When the second core 1031 of the second waveguide 1030 is in contact with the nonreciprocal member 1032 in the positive direction of the y axis, the second waveguide 1030 has nonreciprocity. Nonreciprocity means that an effect that a propagating electromagnetic wave receives differs depending on the propagation direction of the electromagnetic wave. The second waveguide 1030 can have propagation characteristics that differ between a case where an electromagnetic wave propagates in the first direction and a case where an electromagnetic wave propagates in the second direction. When the propagation characteristics of the second waveguide 1030 differ based on the propagation direction of an electromagnetic wave, the first coupling coefficient and the second coupling coefficient may differ from each other. That is, the nonreciprocal member 1032 can make the first coupling coefficient and the second coupling coefficient differ from each other.

The nonreciprocity of the second waveguide 1030 due to the nonreciprocal member 1032 is exhibited when a magnetic field is applied from the outside. The direction of an external magnetic field applied to the nonreciprocal member 1032 and the polarization direction of an electromagnetic wave that propagates in the second waveguide 1030 intersect each other. In the present embodiment, the polarization direction of an electromagnetic wave in the TE mode that propagates in the second waveguide 1030 is substantially parallel to the substrate surface 1050a of the substrate 1050 (that is, in the y-axis direction). In this case, when an external magnetic field having a component in the z-axis direction is applied, nonreciprocity due to the nonreciprocal member 1032 is exhibited. If the intensity of the external magnetic field is constant, the nonreciprocity becomes the largest when an electromagnetic field substantially in the z-axis direction is applied.

When the nonreciprocal member 1032 is a ferromagnetic material, the nonreciprocal member 1032 exhibits nonreciprocity even if an external magnetic field is not applied. When the polarization direction of an electromagnetic wave that propagates in the second waveguide 1030 is the y-axis direction, the nonreciprocal member 1032 is disposed in such a way that the magnetization direction thereof has a component in the z-axis direction. Preferably, the nonreciprocal member 1032 is disposed in such a way that the magnetization direction is substantially the z-axis direction.

Figure 29:
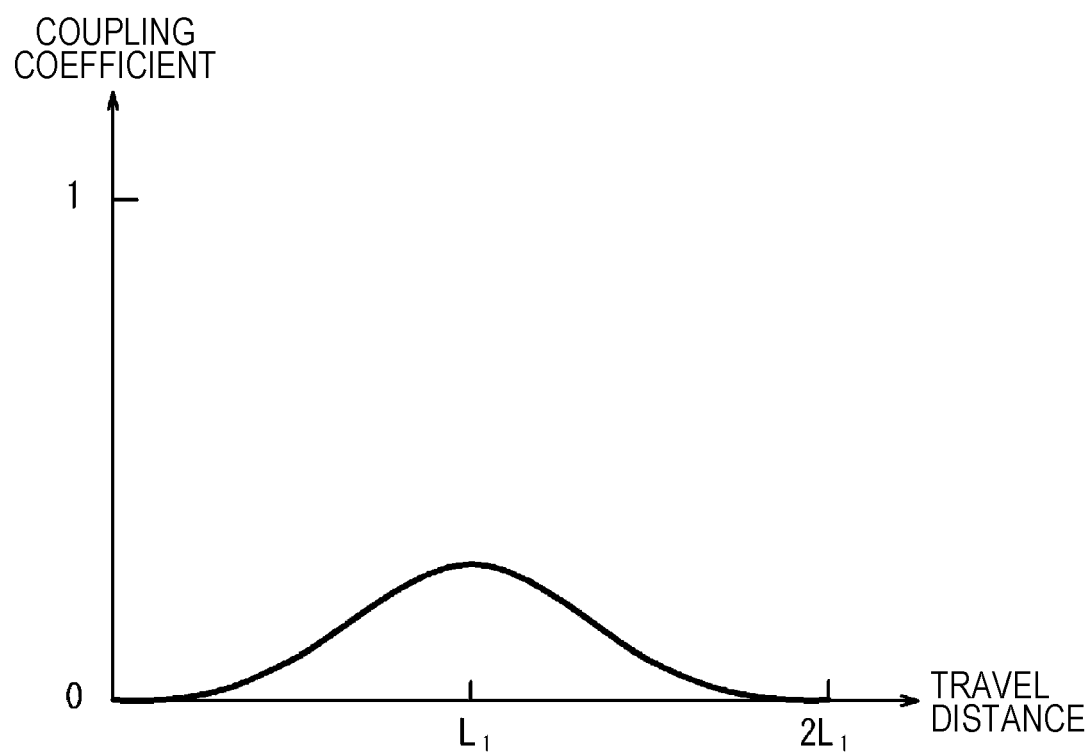
FIG. 29 is a graph representing the coupling coefficient with respect to an electromagnetic wave that travels in a first direction.
Figure 30:
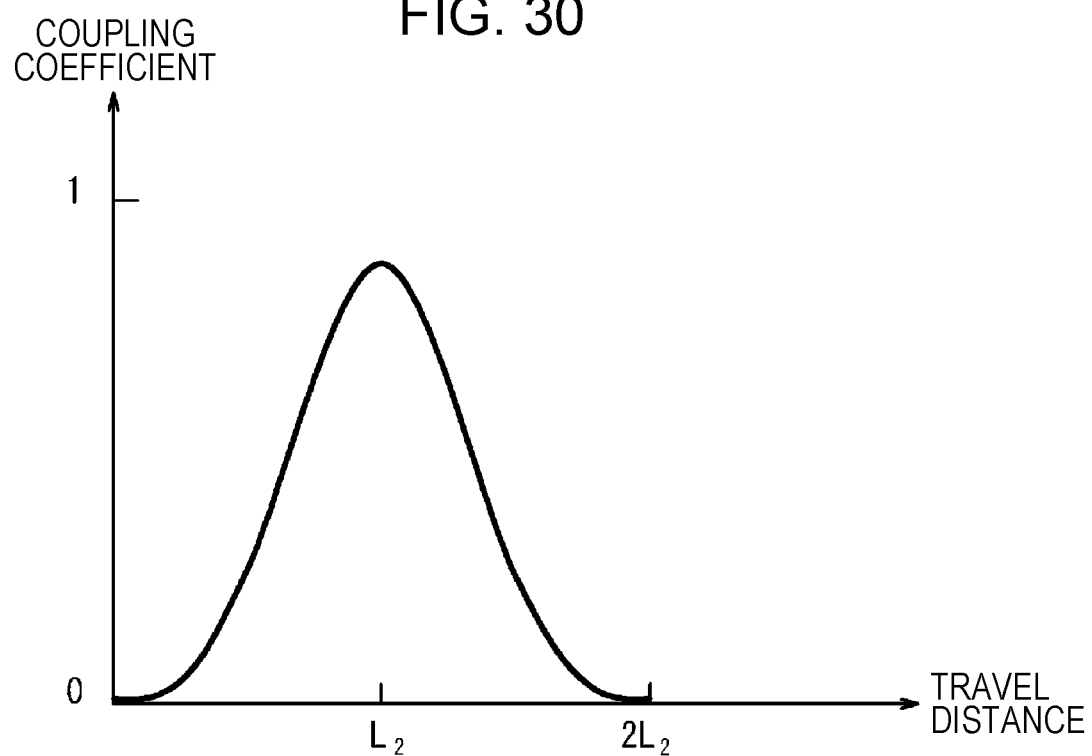
FIG. 30 is a graph representing the coupling coefficient with respect to an electromagnetic wave that travels in a second direction.

When one of the waveguides of a parallel waveguide has nonreciprocity, the maximal value of the coupling coefficient in a case where an electromagnetic wave propagates in the first direction may differ from the maximal value of the coupling coefficient when an electromagnetic wave propagates in the second direction. For example, as illustrated in FIG. 29, the maximal value of the coupling coefficient between the first waveguide 1020 and the second waveguide 1030 can be close to 0 in the case where an electromagnetic wave propagates in the first direction. For example, as illustrated in FIG. 30, the maximal value of the coupling coefficient between the first waveguide 1020 and the second waveguide 1030 can be close to 1 in the case where an electromagnetic wave propagates in the second direction. When the maximal value of the coupling coefficient differs in accordance with the propagation direction of an electromagnetic wave, the electromagnetic-wave transmittance differs in accordance with the propagation direction of the electromagnetic wave. In FIGS. 29 and 30, the horizontal axis and the vertical axis respectively represent the travel distance of an electromagnetic wave in the parallel waveguide and the coupling coefficient.

When the second waveguide 1030 has nonreciprocity, the coupling coefficient between the first waveguide 1020 and the second waveguide 1030 can differ in accordance with the propagation direction of an electromagnetic wave. That is, when the second waveguide 1030 has nonreciprocity, the first coupling coefficient of the isolator 1010 can differ from the second coupling coefficient of the isolator 1010. By adjusting the magnitude of nonreciprocity of the second waveguide 1030, the second coupling coefficient can be made greater than the first coupling coefficient.

When an electromagnetic wave that is input from the first port 1211 to the first waveguide 1020 propagates in the first direction, at least a part of the electromagnetic wave that has been input and transferred to the second waveguide 1030 is propagated to the second portion 1030c of the second waveguide 1030. The electromagnetic wave that has been propagated to the second portion 1030c of the second waveguide 1030 is not output from the second port 1212 of the first waveguide 1020, and can be absorbed by the second portion 1030c of the second waveguide 1030, radiated from the second end 1302 to the outside, or reflected at the second end 1302. When the first coupling coefficient is large, in an electromagnetic input to the first waveguide 1020, the proportion of the electromagnetic wave that transfers to the second waveguide 1030 and absorbed by the second portion 1030c or radiated to the outside can be large. In this case, in an electromagnetic input to the first waveguide 1020, the proportion of the electromagnetic wave that is output from the second port 1212 can be small. That is, the ratio of the intensity of an electromagnetic wave output from the second port 1212 to the intensity of an electromagnetic wave input to the first port 1211 can be small. The ratio of the intensity of the electromagnetic wave output from the second port 1212 to the intensity of the electromagnetic wave input to the first port 1211 is also referred to as the transmittance of the isolator 1010 with respect to an electromagnetic wave that propagates in the first direction. When the first coupling coefficient is large, the transmittance with respect to an electromagnetic wave that propagates in the first direction can be low. On the other hand, when the first coupling coefficient is small, the proportion of the electromagnetic wave that has transferred to the second waveguide 1030 can be small, and therefore the transmittance with respect to an electromagnetic wave that propagates in the first direction can be high.

An electromagnetic wave that is input from the second port 1212 to the first waveguide 1020 and propagates in the second direction can receive, in accordance with the second coupling coefficient, an action that is the same as an action that an electromagnetic wave that propagates in the first direction receives from the isolator 1010. Due to the action, a part of the electromagnetic wave that propagates in the second direction is propagated to the second portion 1030*b* of the second waveguide 1030. When the second coupling coefficient is large, the transmittance with respect to an electromagnetic wave that propagates in the second direction can be low. When the second coupling coefficient is small, the transmittance with respect to an electromagnetic wave that propagates in the second direction can be high.

When the first coupling coefficient and the second coupling coefficient differ from each other, the transmittance with respect to an electromagnetic wave that propagates in the first direction and the transmittance with respect to an electromagnetic wave that propagates in the second direction can differ from each other. That is, the isolator 1010 can function to make it easy for an electromagnetic wave to propagate in one direction and to make it difficult for an electromagnetic wave to propagate in the opposite direction by making the first coupling coefficient and the second coupling coefficient differ from each other. When the second coupling coefficient is greater than the first coupling coefficient, the isolator 1010 can function to make it easy for an electromagnetic wave to propagate in the first direction and to make it difficult for an electromagnetic wave to propagate in the second direction. When the first coupling coefficient and the second coupling coefficient are respectively approximately 0 and approximately 1, the difference between the transmittance with respect to an electromagnetic wave that propagates in the first direction and the transmittance with respect to an electromagnetic wave that propagates in the second direction can be made large. As a result, the function of the isolator 1010 can be improved.

When one of the waveguides of a parallel waveguide has nonreciprocity, the coupling length of the parallel waveguide with respect to an electromagnetic wave that propagates in the first direction can differ from the coupling length of the parallel waveguide with respect to an electromagnetic wave that propagates in the second direction. For example, as illustrated in FIG. 29, the coupling length with respect to an electromagnetic wave that propagates in the isolator 1010 in the first direction can be denoted by $L_1$. For example, as illustrated in FIG. 30, the coupling length with respect to an electromagnetic wave that propagates in the isolator 1010 in the second direction can be denoted by $L_2$. The isolator 1010 may be configured in such a way that $L_1$ and $L_2$ differ from each other.

When the length (L in FIG. 27) over which two waveguides extend along each other in a parallel waveguide is equal to the coupling length, the coupling coefficient can have a maximal value. For example, in a parallel waveguide having the relationship represented in the graph of FIG. 29, when the length L over which two waveguides extend along each other is $L_1$, the coupling coefficient can have a maximal value. When the length L over which the two waveguides extend along each other is equal to twice the coupling length, the coupling coefficient can have a minimal value. For example, in a parallel waveguide having the relationship represented in the graph of FIG. 29, when the length L over which the two waveguides extend along each other is $2L_1$, the coupling coefficient can have a minimal value.

The relationship represented in the graph of FIG. 29 can be repeated also in a region where the travel distance of an electromagnetic wave is increased. That is, when the length L over which the two waveguides extend along each other is an odd multiple of $L_1$, the coupling coefficient can have a maximal value. When the length L over which the two waveguides extend along each other is an even multiple of $L_1$, the coupling coefficient can have a minimal value. Also in a parallel waveguide having the relationship represented in FIG. 30, the coupling coefficient can have a maximal value and a minimal value, respectively, in the case where the length over which two waveguides extend along each other is an odd multiple of $L_2$ and in the case where the length is an even multiple of $L_2$. $L_1$ and $L_2$ are each a length that can be the minimum coupling length of a parallel waveguide and is also referred to as a unit coupling length. That is, the coupling length may be an odd multiple of the unit coupling length.

The first coupling coefficient and the second coupling coefficient can be adjusted by adjusting the length L over which the first waveguide 1020 and the second waveguide 1030 extend along each other. The length L over which the first waveguide 1020 and the second waveguide 1030 extend along each other may be substantially the same as an odd multiple of the unit coupling length with respect to an electromagnetic wave that propagates in the second direction. Thus, the second coupling coefficient can be made large. The length L over which the first waveguide 1020 and the second waveguide 1030 extend along each other may be substantially the same as an even multiple of the unit coupling length with respect to an electromagnetic wave that propagates in the first direction. Thus, the first coupling coefficient can be made small. Thus, the second coupling coefficient may be made greater than the first coupling coefficient.

With the configurations described above, in the isolator 1010, most of an electromagnetic wave that enters the first waveguide 1020 from the first port 1211 and propagates in the first direction does not transfer to the first portion 1030*a* of the second waveguide 1030 and propagates toward the second port 1212. However, a part of the electromagnetic wave that propagates in the first waveguide 1020 transfers to the first portion 1030*a* of the second waveguide 1030 in a portion where the first waveguide 1020 and the second waveguide 1030 extend along each other and can propagate in the second core 1031 toward the second end 1302.

An electromagnetic wave that propagates in the second core 1031 toward the second end 1302 is at least partially absorbed by the nonreciprocal member 1032 in a portion where the second core 1031 of the second portion 1030*c* of the second waveguide 1030 is in contact with the nonreciprocal member 1032. Accordingly, the electromagnetic wave can be attenuated as the electromagnetic wave propagates in the second portion 1030c.

Moreover, because the second end 1302 has a tapered shape, most of an electromagnetic wave that has reached the second end 1302 of the second waveguide 1030 is not reflected and is radiated to the outside from the second end 1302 of the second waveguide 1030. In particular, when the second end 1302 is covered by the nonreciprocal member 1032, the electromagnetic wave radiated from the second end 1302 is absorbed by the nonreciprocal member 1032. When the tapered portion of the second end 1302 of the second core 1031 is longer than the wavelength of the electromagnetic wave that propagates in the second waveguide 1030, reflection of an electromagnetic wave at the second end 1302 can be particularly reduced.

Accordingly, with the isolator 1010, it is possible to reduce the probability that an electromagnetic wave that has entered the first waveguide 1020 from the first port 1211 and has transferred to the second waveguide 1030 at the first portion 1030a is reflected at the second end 1302 and returns to the first portion 1030a of the second waveguide 1030. Thus, it is possible to reduce the risk that an electromagnetic wave returned to the first portion 1030a transfers again to the first waveguide 1020, propagates toward the first port 1211 side, and inflicts damage to an electromagnetic wave source (light source), an element (optical element), or the like connected to the first port 1211.

When the first port 1211 is used as an input port of the isolator 1010, it is most seriously concerned that an electromagnetic wave that has entered from the first port 1211 may return to the first port 1211 and inflict damage to an electromagnetic wave source (light source) or an element (optical element) connected to the first port 1211. Accordingly, the configuration in which the nonreciprocal member 1032 is in contact with the second core 1031 of the second portion 1030c, which is on a side toward which an electromagnetic wave travels when the electromagnetic wave that has traveled in the first direction in the first waveguide 1020 transfers to the first portion 1030a of the second waveguide 1030, is particularly effective in preventing return of an electromagnetic wave that is input.

Moreover, in the isolator 1010, most an electromagnetic wave that enters the first waveguide 1020 from the second port 1212 and propagates in the second direction transfers to the first portion 1030a of the second waveguide 1030 in a portion where the first waveguide 1020 and the second waveguide 1030 extend along each other. The electromagnetic wave that has transferred to the second waveguide 1030 in the first portion 1030a propagates in the second core 1031 of the second waveguide 1030 toward the first end 1301.

An electromagnetic wave that propagates in the second core 1031 of the second waveguide 1030 toward the second end 1302 is at least partially absorbed by the nonreciprocal member 1032 in a portion where the second core 1031 of the second portion 1030b of the second waveguide 1030 is in contact with the nonreciprocal member 1032. Accordingly, the electromagnetic wave can be attenuated as the electromagnetic wave propagates in the second portion 1030b.

Moreover, because the first end 1301 has a tapered shape, most of an electromagnetic wave that has reached the first end 1301 of the second waveguide 1030 is not reflected and is radiated to the outside from the first end 1301 of the second waveguide 1030. In particular, when the first end 1301 is covered by the nonreciprocal member 1032, the electromagnetic wave radiated from the first end 1301 is absorbed by the nonreciprocal member 1032. When the tapered portion of the first end 1301 of the second core 1031 is longer than the wavelength of the electromagnetic wave that propagates in the second waveguide 1030, reflection of an electromagnetic wave at the first end 1301 can be particularly reduced.

Accordingly, with the isolator 1010, it is possible to reduce the probability that an electromagnetic wave that has entered the first waveguide 1020 from the second port 1212 and has transferred to the second waveguide 1030 at the first portion 1030a is reflected at the first end 1301. Moreover, with the isolator 1010, it is possible to reduce the probability that an electromagnetic wave reflected at the first end 1301 of the second waveguide 1030 propagates to the second end 1302 of the second waveguide 1030 and is further reflected at the second end 1302. Thus, the isolator 1010 can reduce the probability that an electromagnetic wave that has entered from the second port 1212 of the first waveguide 1020 transfers to the second waveguide 1030, is reflected at the first end 1301 and at the second end 1302 sequentially, and returns again to the first waveguide 1020. Accordingly, the isolator 1010 can reduce the risk that an electromagnetic wave that has entered from the second port 1212 of the first waveguide 1020 eventually propagates to the first port 1211, and inflicts damage to an electromagnetic wave source (light source), an element (optical element), or the like connected to the first port 1211.

Thus, with the isolator 1010, an advantageous effect of reducing unnecessary reflection is increased, because the nonreciprocal member 1032 is in contact with the second core 1031 in portions of both of the second portions 1030b and 1030c that are positioned on both sides of the first portion 1030a of the second waveguide 1030.

As described above, the isolator 1010 according to the present disclosure can reduce unnecessary reflection at the terminal end of the second waveguide 1030. Thus, the isolator 1010 can reduce a negative effect on an electromagnetic wave source (light source) or another element (optical element), which might occur if an electromagnetic wave that has entered from the first port 1211 or the second port 1212 of the first waveguide 1020 is reflected in the second waveguide 1030 and the reflected electromagnetic wave is output from the first port 1211.

Furthermore, in the isolator 1010 according to the present disclosure, the nonreciprocal member 1032, which is used to provide the second waveguide 1030 with nonreciprocity, is also used to reduce an unnecessary electromagnetic wave. Thus, the isolator 1010 need not have an additional special constituent element for reducing an unnecessary electromagnetic wave. Therefore, the isolator 1010 according to the present disclosure can be configured more simply and economically, because it is not necessary to add a process for setting an absorption edge, compared with a case where an absorption material made of a metal or the like is provided at the terminal end of the second waveguide 1030.

Moreover, with the isolator 1010 according to the present disclosure, because an unnecessary electromagnetic wave is absorbed by the nonreciprocal member 1032 that is in contact with a side surface of the second core 1031 of the second waveguide 1030, reflection in the return direction due to the refractive index difference at the interface is not likely to occur, compared with a case where a member for absorbing an electromagnetic wave is set at an end of the second waveguide 1030.

In the embodiment illustrated in FIGS. 26 to 28, the first core 1021 of the first waveguide 1020, the second core 1031 of the second waveguide 1030, and the nonreciprocal member 1032 are covered by the second cladding 1062. However, as illustrated in the sectional view of FIG. 31, an isolator 1011 according to another embodiment need not have the second cladding 1062. FIG. 31 is a sectional view of the isolator 1011 at a position corresponding to the sectional view of FIG. 28. In this case, the first core 1021, the second core 1031, and the nonreciprocal member 1032 may be in contact with air in portions that are not in contact with the first cladding 1061. Air is a dielectric whose relative permittivity is about 1.0006. In the isolator 1010 according to the embodiment illustrated in FIGS. 26 to 28, a surface of the second core 1031 of the second waveguide 1030 facing in the positive direction of the z axis is covered by the second cladding 1062. In the isolator 1011, the surface of the second core 1031 of the second waveguide 1030 facing in the positive direction of the z axis may be covered by the nonreciprocal member 1032. When the second portions 1030b and 1030c of the second core 1031 are covered by the nonreciprocal member 1032, it is possible for the isolator 1011 to absorb a greater proportion of an electromagnetic wave in the second portions 1030b and 1030c.

Figure 32:
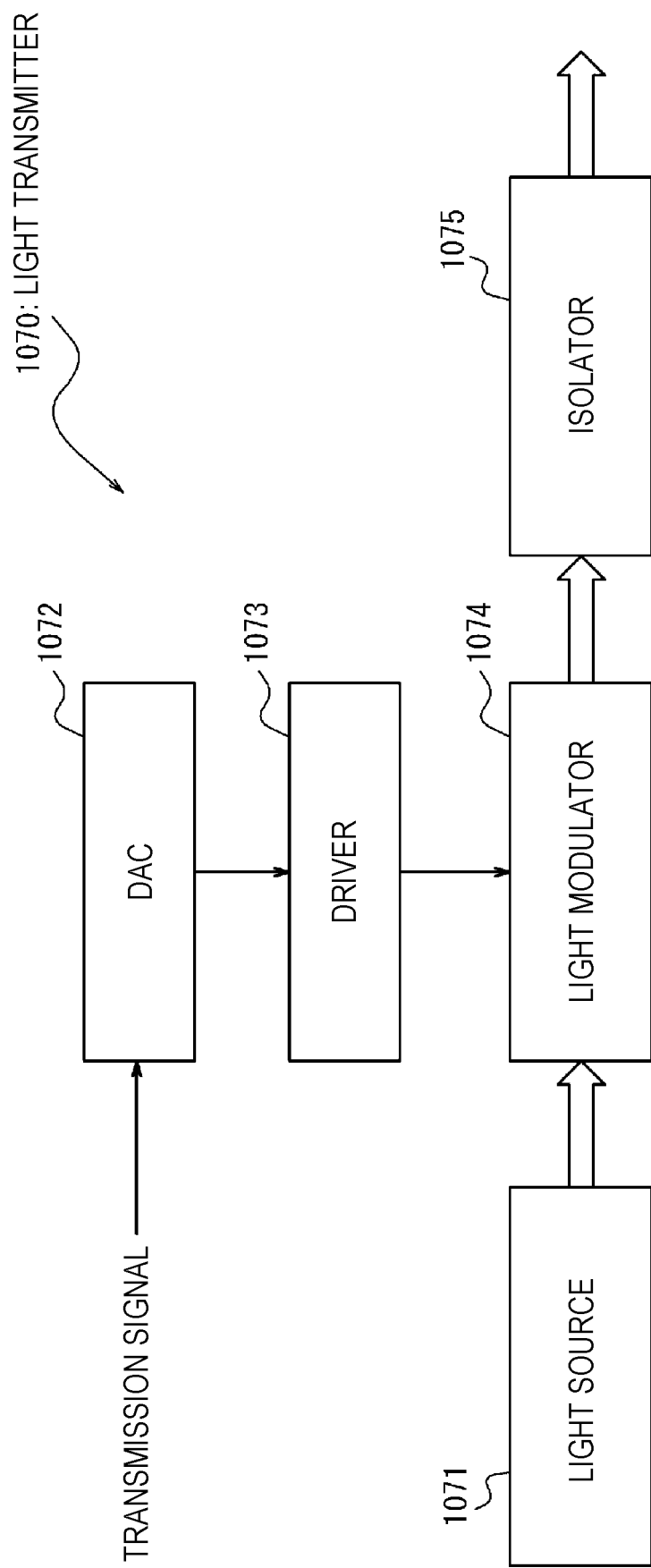
FIG. 32 is a schematic block diagram of a light transmitter according to a second embodiment.

The isolators 1010 and 1011 according to the present disclosure can be applied to a light transmitter. FIG. 32 is a block diagram of a light transmitter 1070 according to an embodiment, to which the isolators 1010 and 1011 are applied.

The light transmitter 1070 includes a light source 1071, a DAC 1072 (digital to analog converter), a driver 1073, a light modulator 1074, and an isolator 1075.

As the light source 1071, a laser light source can be used. The laser light source may include a semiconductor laser such as a laser diode (LD). Light emitted by the light source 1071 may be included in a band of light from infrared light to ultraviolet light. The light source 1071 can continuously emit stable light.

The light transmitter 1070 receives from another device a transmission signal to be transmitted. The transmission signal is converted into an analog signal by the DAC 1072. Based on the transmission signal converted into the analog signal, the driver 1073 drives the light modulator 1074 to modulate light emitted from the light source 1071. As a method for modulating light, various methods such as amplitude modulation and phase modulation can be used. As the light modulator 1074, for example, a Mach-Zehnder light modulator, which is made by using a silicon photonics technology, can be used. The light modulator 1074 may be formed on the substrate 1050 as with the isolator 1075.

As the isolator 1075, an isolator according to the present disclosure can be used. For example, as the isolator 1075, the isolator 1010 illustrated in FIGS. 26 to 28 or the isolator 1011 illustrated in FIG. 31 can be used. The isolator 1075 is disposed downstream of the light source 1071 along the optical path of light emitted from the light source 1071. For example, as illustrated in FIG. 32, the isolator 1075 is disposed on the emission side of the light modulator 1074, and allows light travelling toward the outside of the light transmitter 1070 to pass therethrough. The isolator 1075 suppresses propagation, to the light modulator 1074 side, of light that has returned from the outside to the light transmitter 1070 due to reflection or the like. Thus, the isolator 1075 reduces the risk that light that has entered from the outside enters the light source 1071 or the like and inflicts a negative effect such as damage to the light source 1071 or the like. Instead of the disposition illustrated in FIG. 32, the isolator 1075 may be disposed between the light source 1071 and the light modulator 1074. In this case, the isolator 1075 can reduce the risk that light returned from the outside and return light reflected in the light modulator 1074 enter the light source 1071.

Figure 33:
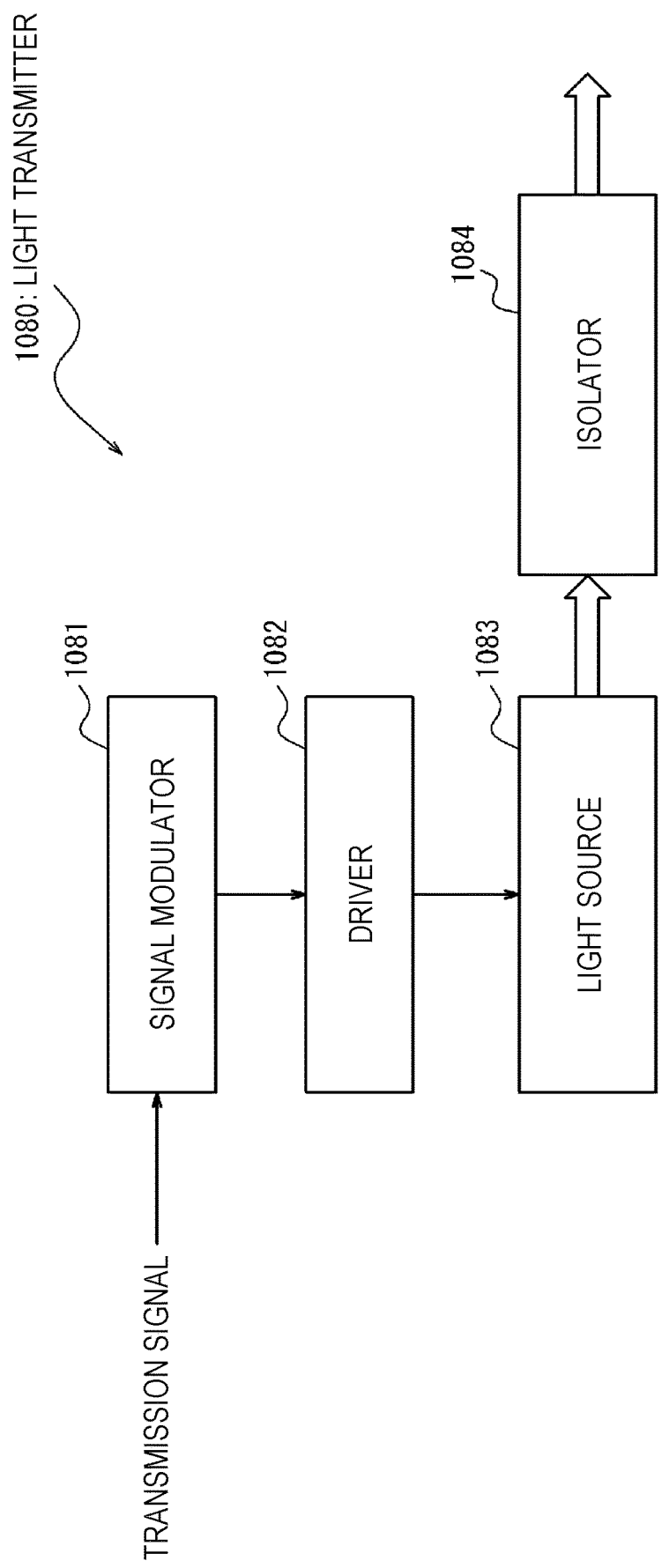
FIG. 33 is a schematic block diagram of a light transmitter according to another embodiment.

FIG. 33 illustrates a light transmitter according to another embodiment. In the light transmitter 1070 illustrated FIG. 32, an external modulation method of modulating light from the light source 1071 by using the light modulator 1074 outside of the light source 1071 is used. In the embodiment illustrated in FIG. 33, a direct modulation method of directly controlling a light source is used.

A light transmitter 1080 includes a signal modulator 1081, a driver 1082 that is a drive unit, a light source 1083, and an isolator 1084. The signal modulator 1081 converts a transmission signal into a binary modulation signal. The driver 1082 controls on/off of driving of the light source 1083 based on the modulation signal output from the signal modulator 1081. As the isolator 1084, an isolator according to the present disclosure can be used. For example, as the isolator 1084, the isolator 1010 illustrated in FIGS. 26 to 28 or the isolator 1011 illustrated in FIG. 31 can be used. The isolator 1084 is disposed on the light emission side of the light source 1083, and allows light travelling toward the outside of the light transmitter 1080 to pass therethrough. The isolator 1084 reduces the risk that light returned to the light transmitter 1080 from the outside due to reflection or the like enters the light source 1083 and inflicts a negative effect such as damage to the light source.

Third Embodiment

When a reflection wave of an electromagnetic wave emitted through an isolator to the outside from an electromagnetic wave source (light source) enters from an emission-side end portion of the isolator, the reflection wave may include an electromagnetic wave in a mode different from the mode of the emitted electromagnetic wave. There is a risk that the electromagnetic wave in a mode different from the mode of the emitted electromagnetic wave passes through the isolator in the opposite direction, is emitted from an incident-side end portion of the isolator, and inflicts damage or the like to an electromagnetic wave source or the like. It is required to reduce passing-through of the reflection wave including the electromagnetic wave in a mode different from the mode of the emitted electromagnetic wave.

Figure 34:
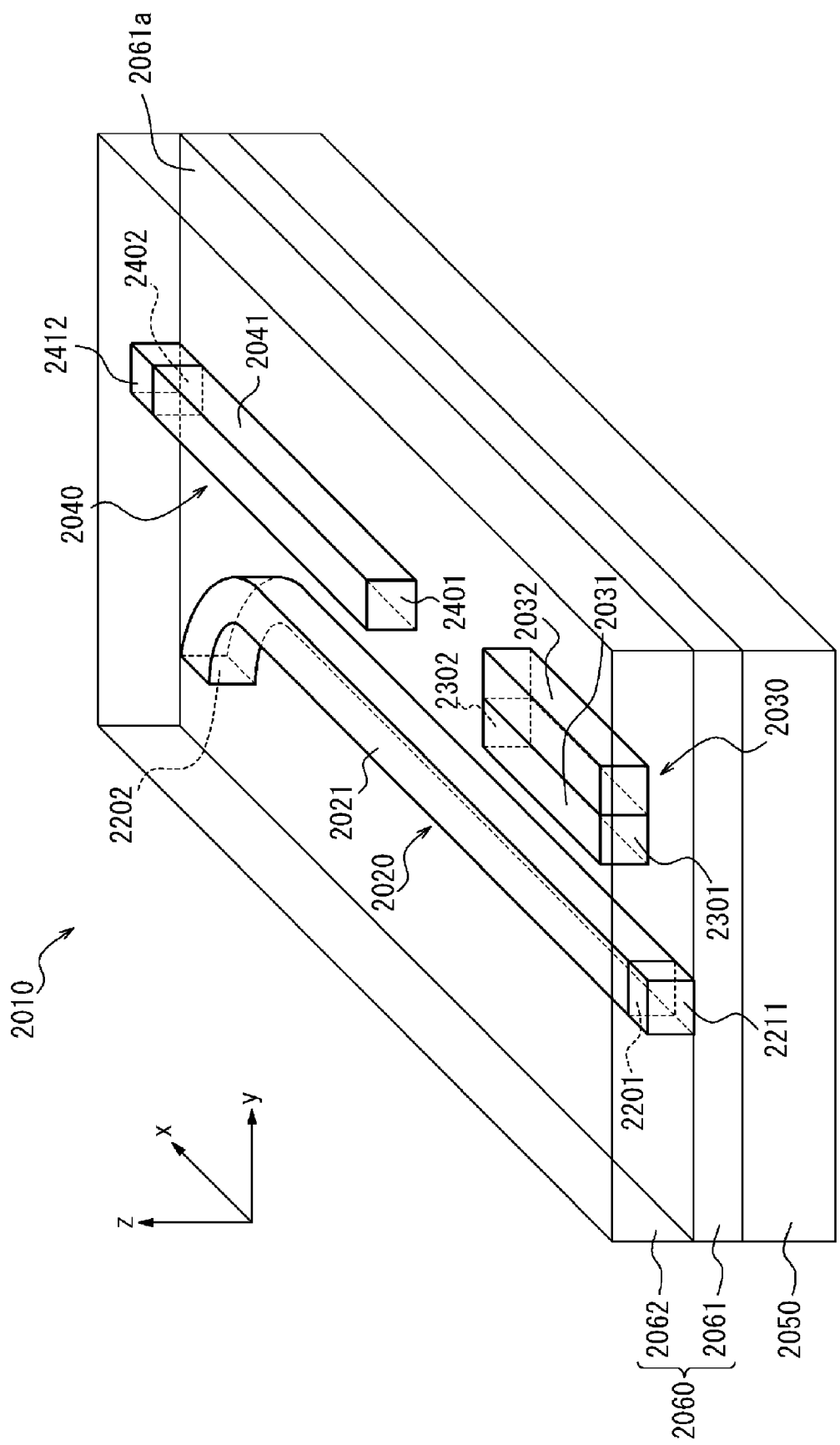
FIG. 34 is a perspective view illustrating an isolator according to a third embodiment.
Figure 35:
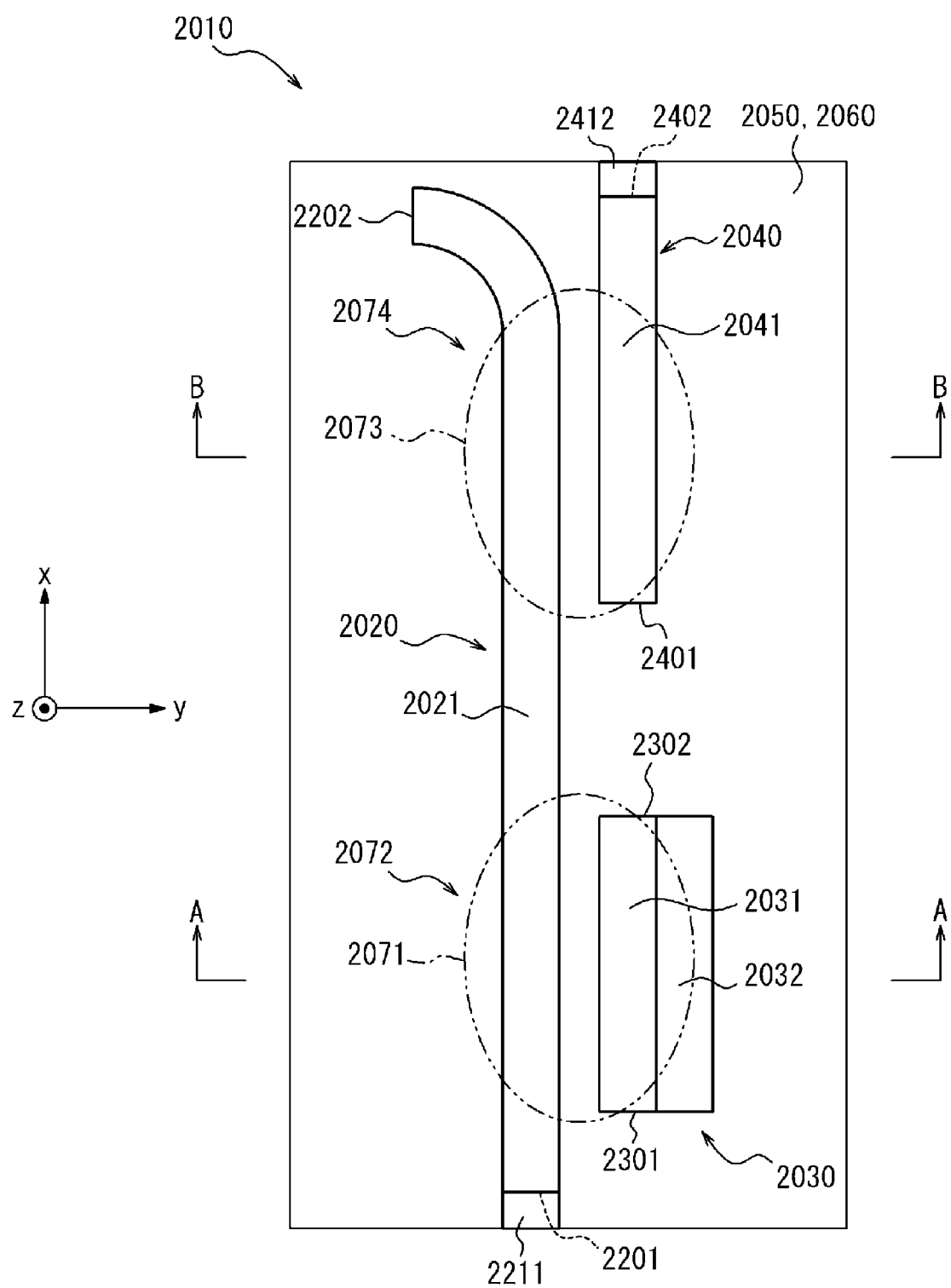
FIG. 35 is a plan view illustrating the isolator of FIG. 34.

As illustrated in FIGS. 34 to 37, an isolator 2010 according to a third embodiment includes a substrate 2050, a first waveguide 2020, a second waveguide 2030, and a third waveguide 2040. The substrate 2050 has a substrate surface 2050a (see FIGS. 36 and 37). The first waveguide 2020, the second waveguide 2030, and the third waveguide 2040 are disposed along the substrate surface 2050a. The first waveguide 2020 and the second waveguide 2030 are arranged partially close to and parallel to each other, and the first waveguide 2020 and the third waveguide 2040 are arranged partially close to and parallel to each other. In FIGS. 34 and 35, a portion where the first waveguide 2020 and the second waveguide 2030 are arranged close to and parallel to each other and a portion where the first waveguide 2020 and the third waveguide 2040 are arranged close to and parallel to each other are oriented in the same direction. However, the orientations of these portions need not be the same.

Figure 36:
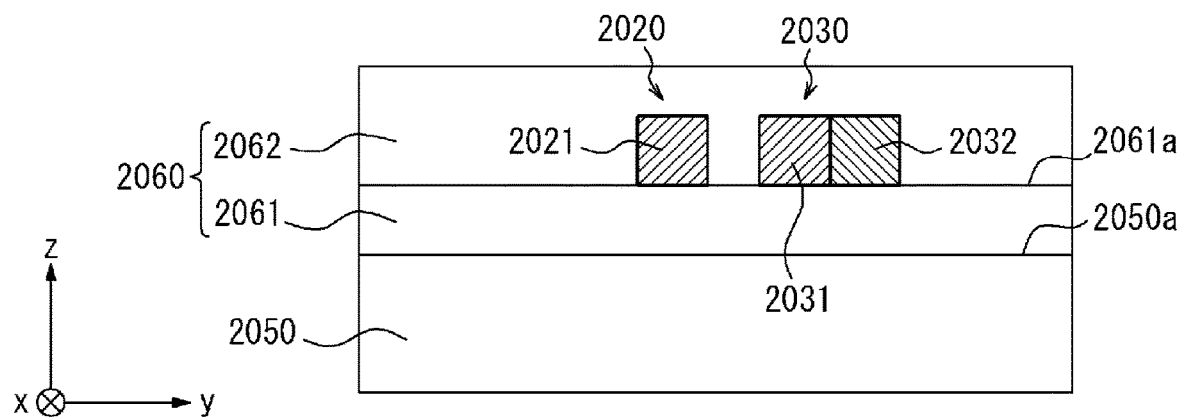
FIG. 36 is a sectional view taken along line A-A of FIG. 35.

For convenience of the following description, the x-axis direction, the y-axis direction, and the z-axis direction are defined as follows. As illustrated in FIGS. 34 to 36, the x-axis direction is a direction in which the first waveguide 2020 extends in a portion close to the second waveguide 2030 and the third waveguide 2040. The positive direction of the x axis is defined as a direction from one end portion (a first end 2201 described below) of the first waveguide 2020 toward an end portion (a second end 2402 described below) of the third waveguide 2040. The y-axis direction is defined as a direction that is along the substrate surface 2050a of the substrate 2050 and that intersects the x-axis direction. The y-axis direction may be substantially perpendicular to the x-axis direction. The positive direction of the y axis is defined as a direction toward a side on which the second waveguide 2030 and the third waveguide 2040 are positioned as seen from the first waveguide 2020. The z-axis direction is a direction perpendicular to the substrate surface 2050a. The z-axis direction is perpendicular to the x-axis direction and the y-axis direction. The positive direction of the z axis is defined as a direction toward a side on which the first waveguide 2020, the second waveguide 2030, and the third waveguide 2040 are disposed as seen from the substrate 2050.

Hereafter, each constituent element of the isolator 2010 will be described in further detail.

The substrate 2050 can be made of any appropriate material. For example, the substrate 2050 may be made of a material selected from materials including metal conductors, semiconductors such as silicon, glass, and resins. The substrate 2050 may have any appropriate shape. For example, the substrate 2050 may have a rectangular shape that has two sides extending in the x-axis direction and the y-axis direction and that is elongated in the x-axis direction.

On the substrate surface 2050a of the substrate 2050, a first cladding 2061, which is common to the first waveguide 2020, the second waveguide 2030, and the third waveguide 2040, is formed. On an upper surface 2061a of the first cladding 2061, a first core 2021, a second core 2031, a third core 2041, and a nonreciprocal member 2032 are disposed. The first waveguide 2020 includes the first core 2021. The second waveguide 2030 includes the second core 2031 and the nonreciprocal member 2032. The nonreciprocal member 2032 is disposed in contact with the second core 2031. The third waveguide 2040 includes the third core 2041.

Figure 37:
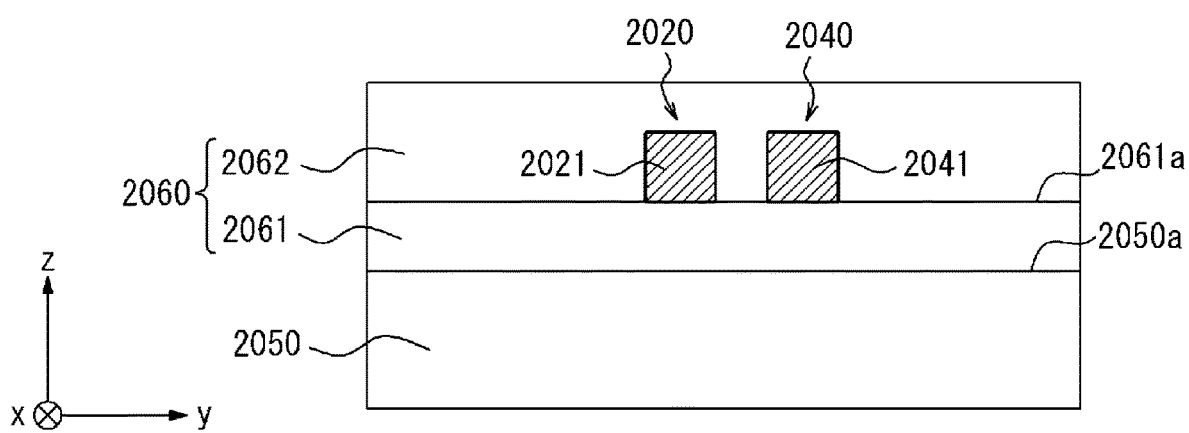
FIG. 37 is a sectional view taken along line B-B of FIG. 36.

As illustrated in FIGS. 36 and 37, the peripheries and upper portions of the first core 2021, the second core 2031, the third core 2041, and the nonreciprocal member 2032 are covered by a second cladding 2062 that is formed on the first cladding 2061. The first cladding 2061 and the second cladding 2062 can be collectively referred to as a cladding 2060. The first core 2021, the second core 2031, the nonreciprocal member 2032, and the third core 2041 are surrounded by the cladding 2060. The first waveguide 2020 includes the first core 2021 and a portion of the cladding 2060 close to the first core 2021. The second waveguide 2030 includes the second core 2031, the nonreciprocal member 2032, and a portion of the cladding 2060 close to the second core 2031 and the nonreciprocal member 2032. The third waveguide 2040 includes the third core 2041 and a portion of the cladding 2060 close to the third core 2041.

The first core 2021, the second core 2031, the third core 2041, and the cladding 2060 each may include a dielectric. The first core 2021, the second core 2031, and the third core 2041 are each also referred to as a dielectric line. The relative permittivity of each of the first core 2021, the second core 2031, and the third core 2041 may be higher than the relative permittivity of the cladding 2060. The first cladding 2061 and the second cladding 2062, which constitute the cladding 2060, may be made of the same dielectric material. The first cladding 2061 and the second cladding 2062 may be integrated. In a case where the first cladding 2061 and the second cladding 2062 are integrated, the isolator 2010 can be easily formed. The relative permittivity of each of the first core 2021, the second core 2031, the third core 2041, and the cladding 2060 may be higher than the relative permittivity of air. When the relative permittivity of each of the first core 2021, the second core 2031, the third core 2041, and the cladding 2060 is higher than the relative permittivity of air, leakage of an electromagnetic wave from the first waveguide 2020, the second waveguide 2030, and the third waveguide 2040 can be suppressed. As a result, loss due to radiation of an electromagnetic wave from the isolator 2010 to the outside can be reduced.

The first core 2021, the second core 2031, and the third core 2041 may be made of, for example, silicon (Si). The cladding 2060 may be made of, for example, quartz glass ($SiO_2$). The relative permittivity of silicon and the relative permittivity of quartz glass are respectively about 12 and about 2. Silicon can propagate an electromagnetic wave having an infrared wavelength in the range of about 1.2 μm to about 6 μm at a low loss. When made of silicon, the first core 2021 and the second core 2031 can propagate an electromagnetic wave having a wavelength in a 1.3 μm band or a 1.55 μm band, which is used for optical communication, at a low loss.

The materials of the first core 2021, the second core 2031, the third core 2041, and the cladding 2060 are not limited to the materials described above. As long as the function as the isolator 2010 according to the present disclosure can be obtained, the first core 2021, the second core 2031, the third core 2041, and the cladding 2060 may be made of any material. A portion of the second cladding 2062 need not be a layer of a specific material and may be air. Air is a dielectric.

The relative permittivity of each of the first core 2021, the second core 2031 and the third core 2041 may be distributed uniformly in the z-axis direction or may be distributed in such a way as to change in the z-axis direction. For example, the relative permittivity of the first core 2021 may be distributed in such a way as to be the highest at a central portion in the z-axis direction and to decrease with decreasing distance to the first cladding 2061 and the second cladding 2062. In this case, the first waveguide 2020 can propagate an electromagnetic wave based on a principle similar to that of a graded-index optical fiber.

The first core 2021, the second core 2031, and the third core 2041, which are covered by the cladding 2060, propagate an electromagnetic wave. In the present disclosure, an electromagnetic wave can include an electromagnetic wave having any appropriate wavelength. The wavelength of the electromagnetic wave may be included in a band of light from ultraviolet light to infrared light. When the wavelength of the electromagnetic wave is included in a wavelength band of light, the isolator 2010 is also referred to as an optical isolator. The band of an electromagnetic wave may be a wavelength band of the wavelength 1.55 μm or the like, which is used in silicon photonics.

The first waveguide 2020, the second waveguide 2030, and the third waveguide 2040 according to the present embodiment can each propagate an electromagnetic wave in the TE mode. An electromagnetic weave that does not have an electric field component in the propagation direction is referred to as the TE mode. In the waveguide, an electromagnetic wave in the TE mode has an electric field that oscillates in a horizontal direction with respect to the substrate 2050. An electromagnetic wave in the TE mode is also referred to as a TE wave. In a device or a system including the isolator 2010, the first waveguide 2020, the second waveguide 2030, and the third waveguide 2040 each may be designed to propagate an electromagnetic wave in the TE mode. Therefore, the polarization direction of an electromagnetic wave input to the isolator 2010 may be parallel to the substrate 2050. When an electromagnetic wave is light, the polarization direction is also referred to as the optical polarization direction.

The first waveguide 2020, the second waveguide 2030, and the third waveguide 2040 may satisfy waveguide conditions in a single mode. When the first waveguide 2020, the second waveguide 2030, and the third waveguide 2040 satisfy waveguide conditions in a single mode, the waveform of a signal that propagates in the first waveguide 2020, the second waveguide 2030, and the third waveguide 2040 does not collapse easily. The isolator 2010, which includes a combination of the first waveguide 2020, the second waveguide 2030, and the third waveguide 2040 that satisfy waveguide conditions in a single mode, can be suitable for optical communication.

The nonreciprocal member 2032 includes a nonreciprocal material. The nonreciprocal material has propagation characteristics that differ depending on the propagation direction of an electromagnetic wave. The nonreciprocal member 2032 may include a magnetic material. The nonreciprocal material includes, for example, magnetic garnet, ferrite, iron, cobalt, or the like. A nonreciprocal material used in the nonreciprocal member 2032 may have electromagnetic-wave absorbing properties.

the first waveguide 2020 extends longer than the second waveguide 2030 and the third waveguide 2040 in the x-axis direction. The first waveguide 2020 can have a linear shape. The shape of the first waveguide 2020 is not limited to a linear shape. The first waveguide 2020 may have a bent portion. The isolator 2010 illustrated in FIGS. 34 to 37 will be described on the assumption that the first waveguide 2020 extends in the x-axis direction.

As illustrated in FIGS. 34 and 35, the first waveguide 2020 has the first end 2201 and a second end 2202, respectively on a side in the negative direction of the x axis and on a side in the positive direction of the x axis. The first waveguide 2020 includes a first port 2211, through which an electromagnetic wave is input and output, at the first end 2201. An electromagnetic wave that is input from the first port 2211 to the first waveguide 2020 travels along the x axis in the positive direction of the x axis. The first port 2211 may be an end surface of the first core 2021 or may be a coupler that can be connected to an external apparatus and can propagate an electromagnetic wave. The second end 2202 may have a flat end surface, a convex surface, or the like. The first waveguide 2020 may be bent in a direction away from the third waveguide 2040 at a position in front of the second end 2202.

The second waveguide 2030 is positioned on the substrate 2050 partially side by side with the first end 2201 side of the first waveguide 2020 along the substrate surface 2050a. As illustrated in FIGS. 34 and 35, the second waveguide 2030 may have a linear shape. Alternatively, the second waveguide 2030 may include a portion that is bent away from the first waveguide 2020 with a portion that is positioned side by side with the first waveguide 2020 interposed therebetween. An end portion of the second waveguide 2030 on a side in the negative direction of the x axis will be referred to as a first end 2301, and an end portion of the second waveguide 2030 on a side in the positive direction of the x axis will be referred to as a second end 2302. In other words, the second waveguide 2030 has both ends. The first end 2301 and the second end 2302 each may have a flat end surface or a convex surface.

The third waveguide 2040 is positioned on the substrate 2050 partially side by side with the second end 2202 side of the first waveguide 2020 along the substrate surface 2050a. As illustrated in FIGS. 34 and 35, the third waveguide 2040 may have a linear shape. Alternatively, the third waveguide 2040 may include a portion that is bent away from the first waveguide 2020 with a portion that is positioned side by side with the first waveguide 2020 interposed therebetween. An end portion of the third waveguide 2040 on a side in the negative direction of the x axis will be referred to as a first end 2401, and an end portion of the third waveguide 2040 on a side in the positive direction of the x axis will be referred to as the second end 2402. The third waveguide 2040 includes a second port 2412, through which an electromagnetic wave is input and output, at the second end 2402. An electromagnetic wave that is input from the second port 2412 to the third waveguide 2040 travels along the x axis in the negative direction of the x axis. The second port 2412 may be an end surface of the first core 2021 or may be a coupler that can be connected to an external apparatus and can propagate an electromagnetic wave. The first end 2401 of the third waveguide 2040 may have a flat end surface or a convex surface.

The second core 2031 of the second waveguide 2030 and the first core 2021 of the first waveguide 2020 include a first coupling portion 2071 in which the second core 2031 and the first core 2021 extend along each other linearly in one direction. Portions of the first waveguide 2020 and the second waveguide 2030 that extend along each other are also referred to as a parallel waveguide. In the first coupling portion 2071, the first core 2021 and the second core 2031 are positioned close to each other to such an extent that coupling of electromagnetic near fields (evanescent fields) can occur. In the first coupling portion 2071, an electromagnetic wave input to one of the first waveguide 2020 and the second waveguide 2030 can transfer to the other waveguide while propagating in the waveguide. That is, an electromagnetic wave that propagates in the first waveguide 2020 can transfer to the second waveguide 2030. An electromagnetic wave that propagates in the second waveguide 2030 can transfer to the first waveguide 2020.

Descriptions regarding the coupling coefficient, which have been already made in the second embodiment, will be omitted.

It can be said that a parallel waveguide that has a coupling coefficient close to a maximal value and that allows a large proportion of the electromagnetic wave to transfer from one waveguide to the other waveguide forms a directional coupler. That is, the first coupling portion 2071 can form a first directional coupler 2072. In a parallel waveguide, the coupling coefficient and the coupling length each differ depending on the mode of an electromagnetic wave that is propagated. The directional coupler 2072 is designed to act on an electromagnetic wave in either of the TE mode and the TM mode of a predetermined wavelength. The isolator 2010 according to the present embodiment is designed to act on an electromagnetic wave in the TE mode.

Unlike a general directional coupler, the first directional coupler 2072 of the isolator 2010 exhibits nonreciprocity because the nonreciprocal member 2032 is adjacent to the second core 2031. The nonreciprocal member 2032 is positioned on a side in the positive direction of the y axis with respect to the second core 2031 of the second waveguide 2030. The nonreciprocal member 2032 may be in contact with the second core 2031 over the entirety of a surface of the second core 2031 extending in the x-axis direction. Alternatively, the nonreciprocal member 2032 may be in contact with a part of a surface of the second core 2031 extending in the x-axis direction. Because the nonreciprocal member 2032 is in contact with the second core 2031 of the second waveguide 2030, the second waveguide 2030 has nonreciprocity as described below.

An electromagnetic wave that has been input to the first core 2021 from the first end 2201 of the first waveguide 2020 via the first port 2211 propagates toward the second end 2202 in the first core 2021 of the first waveguide 2020 that extends along the x axis. In the present application, the direction in which an electromagnetic wave propagates from a side in the positive direction of the x axis toward a side in the negative direction of the x axis is also referred to as a first direction. An electromagnetic wave that propagates in the first core 2021 can transfer to the second core 2031 with a proportion in accordance with a coupling coefficient that is based on the distance over which the electromagnetic wave has propagated in the first direction through the first coupling portion 2071 in the first core 2021. A coupling coefficient in a case where an electromagnetic wave propagates in the first direction in the first core 2021 is also referred to as a first coupling coefficient.

In the present application, the direction in which an electromagnetic wave propagates from a side in the negative direction of the x axis toward a side in the positive direction of the x axis is also referred to as a second direction. As described below, a part of an electromagnetic wave that has entered from the second port 2412 of the third waveguide 2040 transfers to the first waveguide 2020 and propagates in the second direction toward the first end 2201. An electromagnetic wave that propagates in the first core 2021 can transfer to the second core 2031 with a proportion in accordance with a coupling coefficient that is based on the distance over which the electromagnetic wave has propagated in the second direction through the first coupling portion 2071 in the first core 2021. A coupling coefficient in a case where an electromagnetic wave propagates in the second direction in the first core 2021 is also referred to as a second coupling coefficient.

When the second core 2031 of the second waveguide 2030 is in contact with the nonreciprocal member 2032 in the positive direction of the y axis, the second waveguide 2030 has nonreciprocity. Nonreciprocity means that an effect that a propagating electromagnetic wave receives differs depending on the propagation direction of the electromagnetic wave. The second waveguide 2030 can have propagation characteristics that differ between a case where an electromagnetic wave propagates in the first direction and a case where an electromagnetic wave propagates in the second direction. When the propagation characteristics of the second waveguide 2030 differ based on the propagation direction of an electromagnetic wave, the first coupling coefficient and the second coupling coefficient may differ from each other. That is, the nonreciprocal member 2032 can make the first coupling coefficient and the second coupling coefficient differ from each other.

The nonreciprocity of the second waveguide 2030 due to the nonreciprocal member 2032 is exhibited when a magnetic field is applied from the outside. The direction of an external magnetic field applied to the nonreciprocal member 2032 and the polarization direction of an electromagnetic wave that propagates in the second waveguide 2030 intersect each other. In the present embodiment, the polarization direction of an electromagnetic wave in the TE mode that propagates in the second waveguide 2030 is substantially parallel to the substrate surface 2050*a* of the substrate 2050 (that is, in the y-axis direction). In this case, when an external magnetic field having a component in the z-axis direction that is perpendicular to the substrate surface 2050*a* is applied, nonreciprocity due to the nonreciprocal member 2032 is exhibited. If the intensity of the external magnetic field is constant, the nonreciprocity becomes the largest when an electromagnetic field substantially in the z-axis direction is applied.

When the nonreciprocal member 2032 is a ferromagnetic material, the nonreciprocal member 2032 exhibits nonreciprocity even if an external magnetic field is not applied. When the polarization direction of an electromagnetic wave that propagates in the second waveguide 2030 is the y-axis direction, the nonreciprocal member 2032 is disposed in such a way that the magnetization direction thereof has a component in the z-axis direction. Preferably, the nonreciprocal member 2032 is disposed in such a way that the magnetization direction is substantially the z-axis direction.

When one of the waveguides of a parallel waveguide has nonreciprocity, the maximal value of the coupling coefficient in a case where an electromagnetic wave propagates in the first direction may differ from the maximal value of the coupling coefficient when an electromagnetic wave propagates in the second direction. For example, as illustrated in FIG. 29, the maximal value of the coupling coefficient between the first waveguide 2020 and the second waveguide 2030 can be close to 0 in the case where an electromagnetic wave propagates in the first direction. For example, as illustrated in FIG. 30, the maximal value of the coupling coefficient between the first waveguide 2020 and the second waveguide 2030 can be close to 1 in the case where an electromagnetic wave propagates in the second direction. When the maximal value of the coupling coefficient differs in accordance with the propagation direction of an electromagnetic wave, the electromagnetic wave transmittance differs in accordance with the propagation direction of an electromagnetic wave. In FIGS. 29 and 30, the horizontal axis and the vertical axis respectively represent the travel distance of an electromagnetic wave in the parallel waveguide and the coupling coefficient.

When the second waveguide 2030 has nonreciprocity, the coupling coefficient between the first waveguide 2020 and the second waveguide 2030 can differ in accordance with the propagation direction of an electromagnetic wave. That is, when the second waveguide 2030 has nonreciprocity, the first coupling coefficient of the isolator 2010 can differ from the second coupling coefficient of the isolator 2010. By adjusting the magnitude of nonreciprocity of the second waveguide 2030, the second coupling coefficient can be made greater than the first coupling coefficient.

When one of the waveguides of a parallel waveguide has nonreciprocity, the coupling length of the parallel waveguide with respect to an electromagnetic wave that propagates in the first direction can differ from the coupling length of the parallel waveguide with respect to an electromagnetic wave that propagates in the second direction. For example, as illustrated in FIG. 29, the coupling length with respect to an electromagnetic wave that propagates in the first directional coupler 2072 in the first direction can be denoted by $L_1$. For example, as illustrated in FIG. 30, the coupling length with respect to an electromagnetic wave that propagates in the first directional coupler 2072 in the second direction can be denoted by $L_2$. The first directional coupler 2072 may be configured in such a way that $L_1$ and $L_2$ differ from each other.

When the length over which two waveguides extend along each other in a parallel waveguide is equal to the coupling length, the coupling coefficient can have a maximal value. For example, in a parallel waveguide having the relationship represented in the graph of FIG. 29, when the length over which two waveguides extend along each other is $L_1$, the coupling coefficient can have a maximal value. When the length over which the two waveguides extend along each other is equal to twice the coupling length, the coupling coefficient can have a minimal value. For example, in a parallel waveguide having the relationship represented in the graph of FIG. 29, when the length over which the two waveguides extend along each other is $2L_1$, the coupling coefficient can have a minimal value.

The relationship represented in the graph of FIG. 29 can be repeated also in a region where the travel distance of an electromagnetic wave is increased. That is, when the length over which the two waveguides extend along each other is an odd multiple of $L_1$, the coupling coefficient can have a maximal value. When the length over which the two waveguides extend along each other is an even multiple of $L_1$, the coupling coefficient can have a minimal value. Also in a parallel waveguide having the relationship represented in FIG. 30, the coupling coefficient can have a maximal value and a minimal value, respectively, in the case where the length over which two waveguides extend along each other is an odd multiple of $L_2$ and in the case where the length is an even multiple of $L_2$. $L_1$ and $L_2$ are each a length that can be the minimum coupling length of a parallel waveguide and is also referred to as a unit coupling length. That is, the coupling length may be an odd multiple of the unit coupling length.

The first coupling coefficient and the second coupling coefficient can be adjusted by adjusting the length over which the first waveguide 2020 and the second waveguide 2030 extend along each other. The length over which the first waveguide 2020 and the second waveguide 2030 extend along each other may be substantially the same as an odd multiple of the unit coupling length with respect to an electromagnetic wave that propagates in the second direction. Thus, the second coupling coefficient can be made large. The length over which the first waveguide 2020 and the second waveguide 2030 extend along each other may be substantially the same as an even multiple of the unit coupling length with respect to an electromagnetic wave that propagates in the first direction. Thus, the first coupling coefficient can be made small. Thus, the second coupling coefficient may be made greater than the first coupling coefficient.

As described above, in the first directional coupler 2072, the first coupling coefficient with respect to an electromagnetic wave in the TE mode can be set to a small value that is preferably close to 0. The second coupling coefficient can be set to a value that is greater the first coupling coefficient and that is preferably close to 1. That is, the transmittance of the first directional coupler 2072 with respect to an electromagnetic wave in the TE mode that propagates in the first direction in the first waveguide 2020 can be set high. The transmittance of the first directional coupler 2072 with respect to an electromagnetic wave in the TE mode that propagates in the second direction in the first waveguide 2020 can be set low.

The third core 2041 of the third waveguide 2040 and the first core 2021 of the first waveguide 2020 include a second coupling portion 2073 in which the third core 2041 and the first core 2021 extend along each other linearly in one direction. In the second coupling portion 2073, the first core 2021 and the third core 2041 are positioned close to each other to such an extent that coupling of electromagnetic near fields (evanescent fields) can occur. In particular, in the isolator 2010, the first core 2021 and the third core 2041 are coupled due to an electric field. Accordingly, regarding an electromagnetic wave that propagates in the TE mode, it can be said that the parallel waveguide forms a directional coupler when the coupling coefficient between the first waveguide 2020 and the third waveguide 2040 is close to a maximal value. That is, the second coupling portion 2073 can form a second directional coupler 2074.

Unlike the first directional coupler 2072, the third core 2041 is not in contact with a nonreciprocal member. Therefore, the second directional coupler 2074 has the same coupling coefficient regarding both of the first direction and the second direction. Regarding an electromagnetic wave that propagates in the TE mode of a predetermined wavelength, the second directional coupler 2074 transfers to the third waveguide 2040 an electromagnetic wave that has propagated in the first direction in the first waveguide 2020. The electromagnetic wave that has transferred to the third waveguide 2040 propagates in the first direction. Regarding an electromagnetic wave that propagates in the TE mode of a predetermined wavelength, the second directional coupler 2074 transfers to the first waveguide 2020 an electromagnetic wave that has propagated in the second direction in the third waveguide 2040. The electromagnetic wave that has transferred to the first waveguide 2020 propagates in the second direction.

The second directional coupler 2074 functions as a directional coupler with respect to an electromagnetic wave that is propagated in the TE mode. The coupling coefficient of the second directional coupler 2074 is small with respect to an electromagnetic wave that propagates in the TM mode. The coupling coefficient of the second directional coupler 2074 with respect to an electromagnetic wave that propagates in the TM mode may be designed to be close to 0.

With the configurations described above, the isolator 2010 operates as described below.

Figure 38:
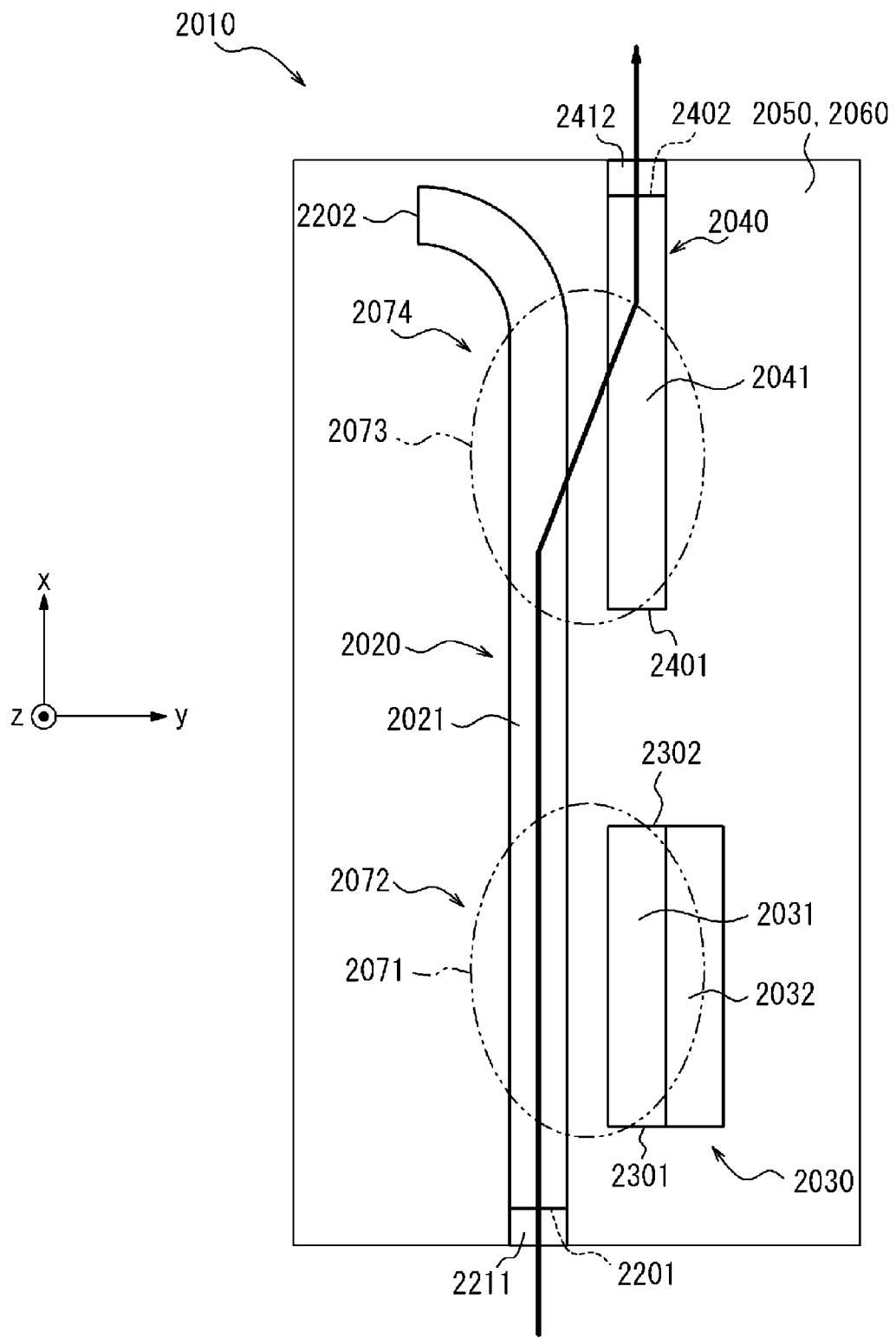
FIG. 38 illustrates the propagation path of an electromagnetic wave in the TE mode that propagates in the first direction.

As illustrated in FIG. 38, an electromagnetic wave in the TE mode that has entered the first waveguide 2020 from the first port 2211 propagates in the first direction. The electromagnetic wave that propagates in the first direction only slightly couples with the second waveguide 2030 in the first directional coupler 2072 because the first coupling coefficient is small. Most of the electromagnetic wave that propagates in the first direction passes through the first directional coupler 2072 and travels in the first direction in the first waveguide 2020. Most of the electromagnetic wave that has passed through the first directional coupler 2072 and propagates in the first direction couples with the third waveguide 2040 due to the second directional coupler 2074. The electromagnetic wave that has coupled with the third waveguide 2040 travels in the first direction in the third waveguide 2040 and is emitted from the second port 2412. The electromagnetic wave in the TE mode that has entered the first waveguide 2020 from the first port 2211 propagates in the isolator 2010 as schematically indicated by an arrow in FIG. 38.

Figure 39:
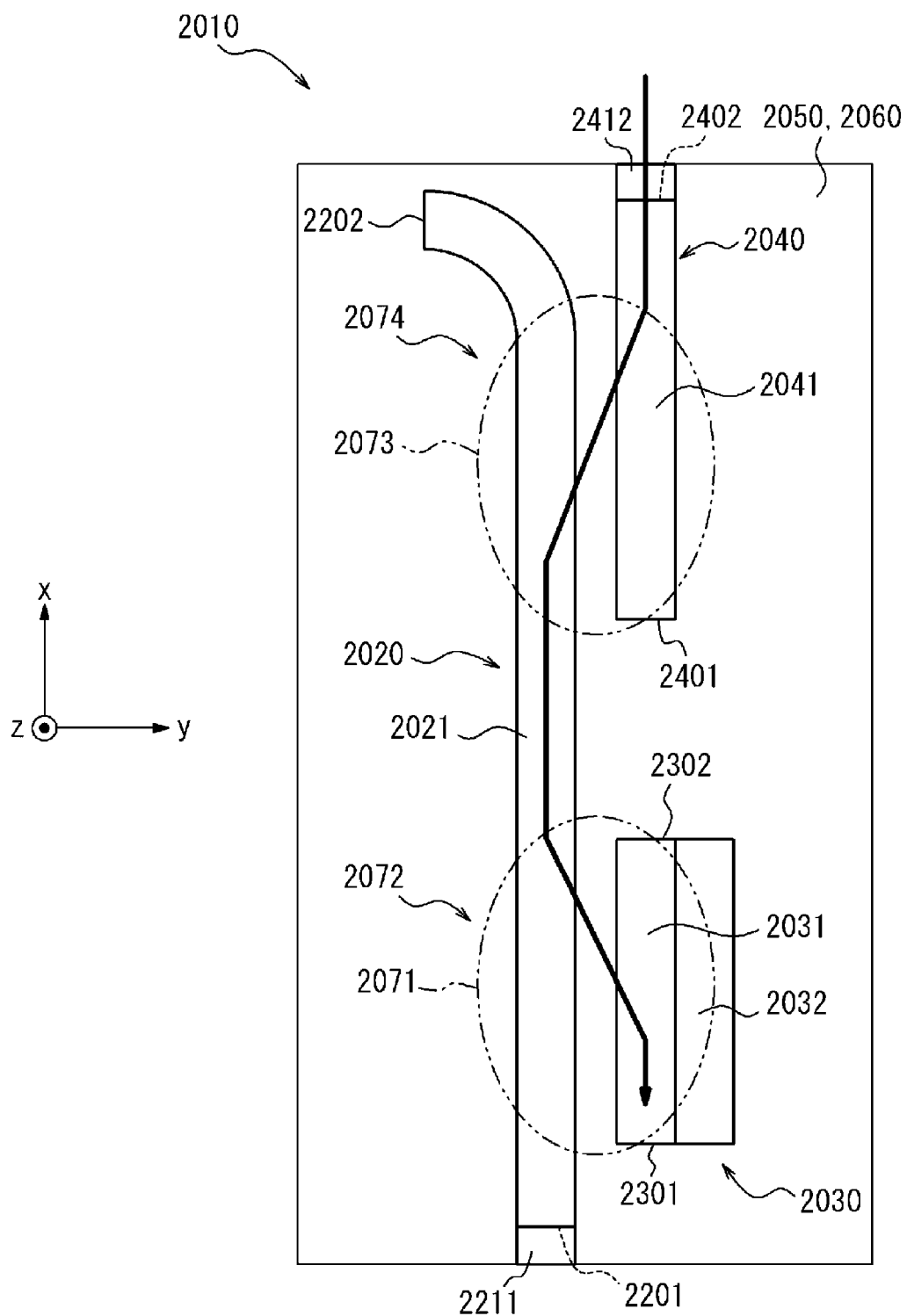
FIG. 39 illustrates the propagation path of an electromagnetic wave in the TE mode that propagates in the second direction.

As illustrated in FIG. 39, an electromagnetic wave in the TE mode that has entered the third waveguide 2040 from the second port 2412 propagates in the second direction. Most of the electromagnetic wave that propagates in the second direction in the third waveguide 2040 couples with the first waveguide 2020 due to the second directional coupler 2074. The electromagnetic wave that has coupled with the first waveguide 2020 travels in the second direction in the first waveguide 2020. Because the second coupling coefficient of the first directional coupler 2072 is large, most of the electromagnetic wave that propagates in the second direction in the first waveguide 2020 couples with the second waveguide 2030 in the first directional coupler 2072. The electromagnetic wave that has coupled with the second waveguide 2030 travels in the second direction in the second waveguide 2030, and is emitted from the first end 2301 of the second waveguide 2030 to the outside. The electromagnetic wave in the TE mode that has entered the third waveguide 2040 from the second port 2412 propagates in the isolator 2010 as schematically indicated by an arrow in FIG. 39.

Figure 40:
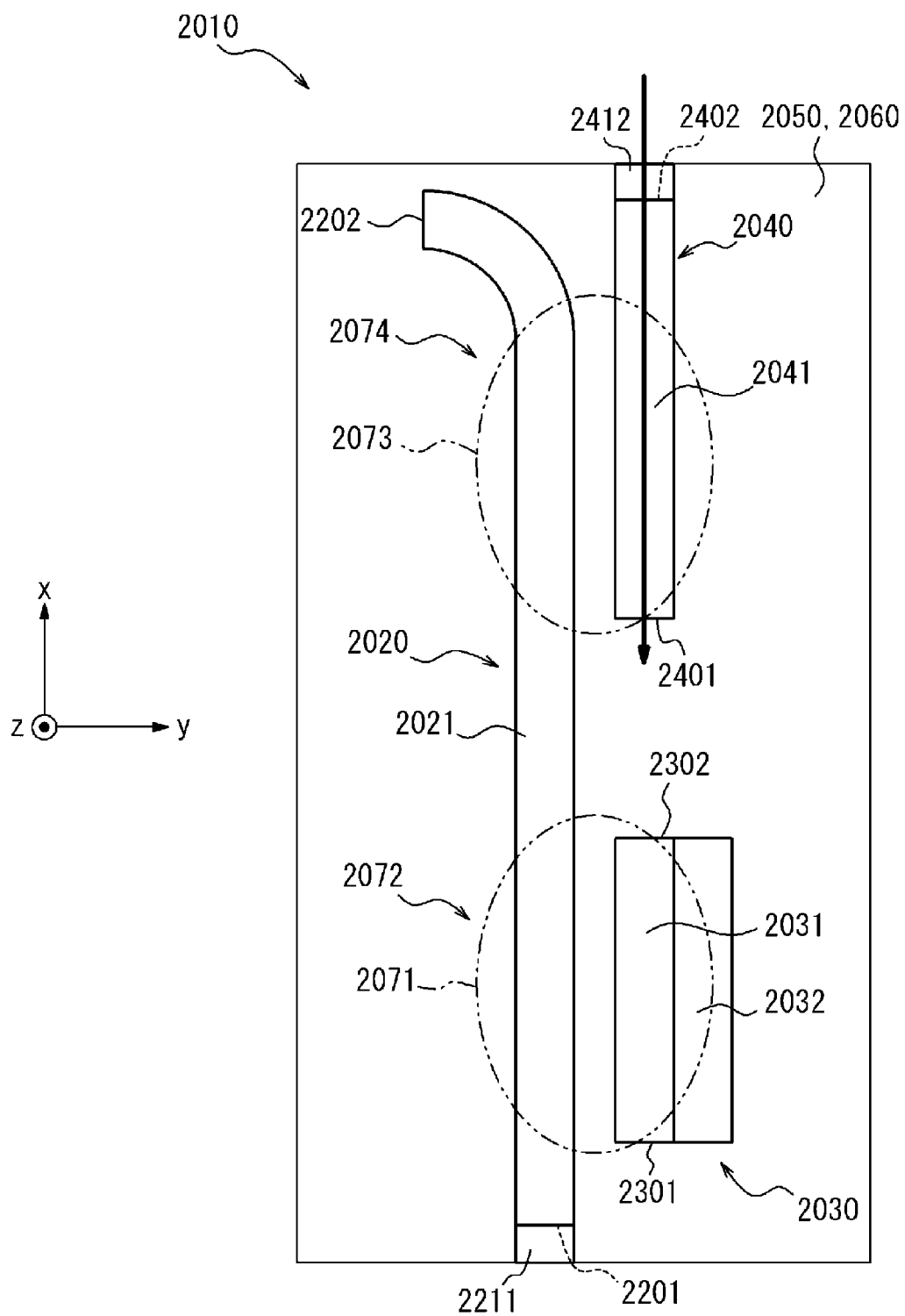
FIG. 40 illustrates the propagation path of an electromagnetic wave in the TM mode that propagates in the second direction.

As illustrated in FIG. 40, an electromagnetic wave in the TM mode that has entered the third waveguide 2040 from the second port 2412 propagates in the second direction. Because the coupling coefficient of the second directional coupler 2074 with respect to an electromagnetic wave in the TM mode is small, the electromagnetic wave that propagates in the second direction in the third waveguide 2040 only slightly couples with the first waveguide 2020 due to the second directional coupler 2074. Most of the electromagnetic wave that propagate in the second direction in the third waveguide 2040 propagates further in the third waveguide 2040, and is radiated from the first end 2401 of the third waveguide 2040 to the outside. The electromagnetic wave in the TM mode that has entered the third waveguide 2040 from the second port 2412 propagates in the isolator 2010 as schematically indicated by an arrow in FIG. 40.

Accordingly, when the first port 2211 is used as an input port in the isolator 2010, most of an electromagnetic wave in the TE mode that is input is propagated to the second port 2412 for output. The ratio of the intensity of an electromagnetic wave output from the second port 2412 to the intensity of an electromagnetic wave input to the first port 2211 is also referred to as the transmittance of the isolator 2010 with respect to an electromagnetic wave that propagates in the first direction. On the other hand, when an unnecessary electromagnetic wave in the TE mode and the TM mode, which has been reflected from the outside, enters from the second port 2412, the unnecessary electromagnetic wave is not propagated or only slightly propagated to the first port 2211. The ratio of the intensity of an electromagnetic wave output from the first port 2211 to the intensity of an electromagnetic wave input to the second port 2412 is also referred to as the transmittance of the isolator 2010 with respect to an electromagnetic wave that propagates in the second direction. The transmittance of the isolator 2010 with respect to an electromagnetic wave that propagates in the second direction is far smaller than the transmittance of the isolator 2010 with respect to an electromagnetic wave that propagates in the first direction.

As described above, the isolator 2010 can reduce passing-through of a reflection wave including an electromagnetic wave whose mode is different from the mode of an emitted electromagnetic wave. Thus, the isolator 2010 reduces the risk that an electromagnetic wave source (light source) connected to the input port, an element (optical element), or the like is damaged. Moreover, the isolator 2010 according to the present disclosure can be made by using the silicon semiconductor processing technology without disposing optical elements such as a polarizer on the substrate. Accordingly, the isolator 2010 can be expected to be reduced in size and integrated on the substrate with other optical elements.

Figure 41:
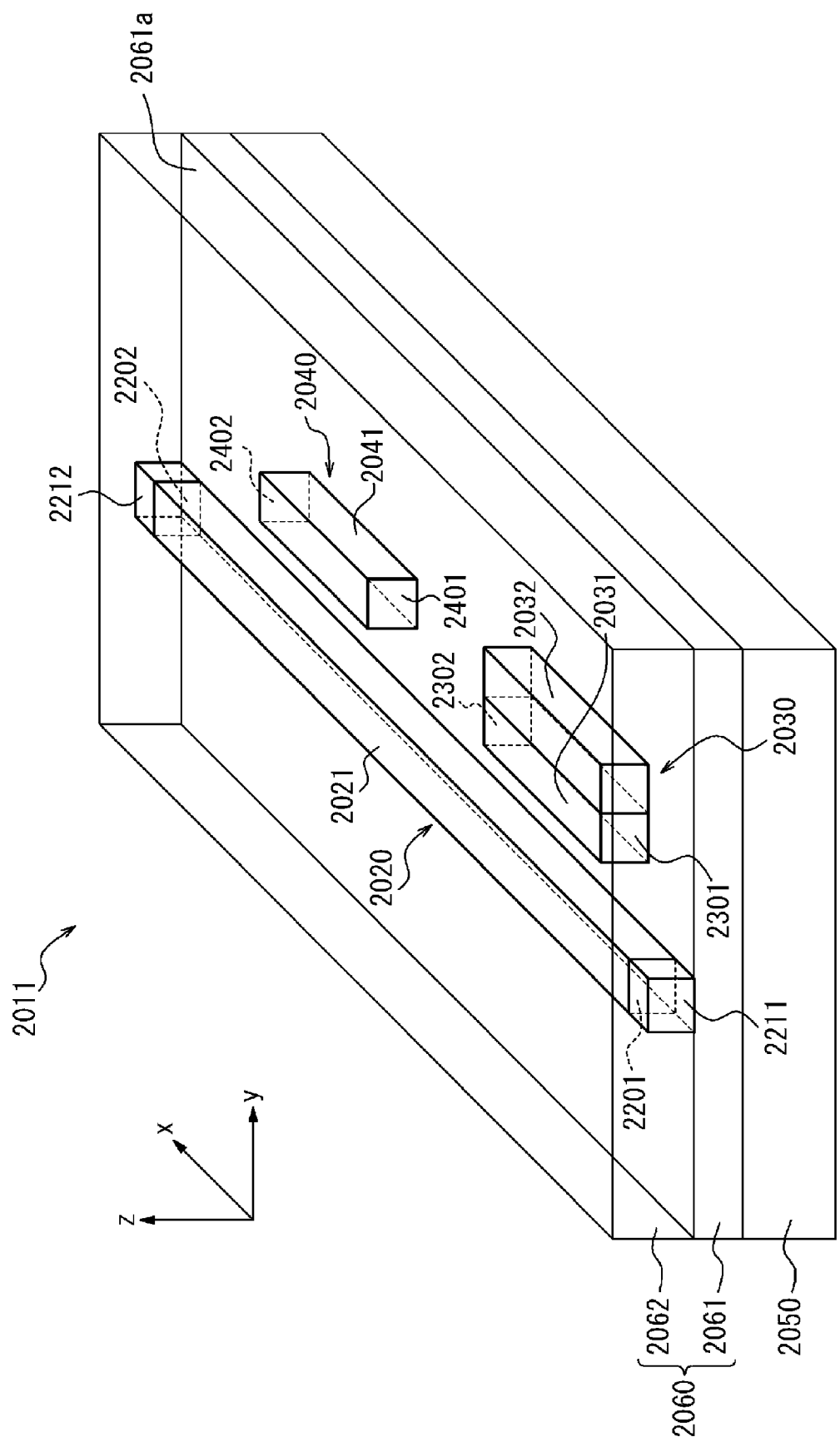
FIG. 41 is a perspective view illustrating an isolator according to another embodiment.

FIG. 41 is a perspective view of an isolator 2011 according to another embodiment. The isolator 2011 illustrated in FIG. 41 is similar to the isolator 2010 illustrated in FIGS. 34 to 37. Therefore, in the following description of the isolator 2011, elements that are the same as or similar to those of the isolator 2010 will be represented by using the same or similar symbols and names, and only the differences from the isolator 2010 will be described.

As illustrated in FIG. 41, the first waveguide 2020 of the isolator 2011 includes, in addition to the first port 2211, a second port 2212, through which an electromagnetic wave is input and output, at the second end 2202. The second port 2212 may be an end surface of the first core 2021 or may be a coupler that can be connected to an external apparatus and can propagate an electromagnetic wave. The first port 2211 and the second port 2212 may be connected to each other through the first waveguide 2020 linearly in the x-axis direction. The first waveguide 2020 may include not only a linear portion but also a bent portion.

In the isolator 2011, the third waveguide 2040 does not have a port at the second end 2402. The second end 2402 may have a flat end surface, a convex surface, or the like. An electromagnetic wave that has propagated in the first direction in the third waveguide 2040 and reached the second end 2402 is radiated from the second end 2402 to the outside of the third waveguide 2040, or is reflected at the second end 2402 and returns in the third waveguide 2040 in the second direction.

Unlike the isolator 2010, the second directional coupler 2074 (see FIGS. 42 to 44) of the isolator 2011 is configured in such a way that the coupling coefficient between the first waveguide 2020 and the third waveguide 2040 is close to a maximal value with respect to an electromagnetic wave that propagates in the TM mode. With the isolator 2011, the first core 2021 and the third core 2041 are coupled in the second coupling portion 2073 due to a magnetic field. The second coupling portion 2073, which is a parallel waveguide, forms the second directional coupler 2074 that acts on an electromagnetic wave in the TM mode. In general, the distance over which the magnetic field of an electromagnetic wave leaks out from a waveguide is greater than the distance over which the electric field of the electromagnetic wave leaks out from the waveguide. Therefore, the distance between the first core 2021 and the third core 2041 in the second coupling portion 2073 in a case where the distance is designed for an electromagnetic wave in the TM mode is greater than that in a case where the distance is designed for an electromagnetic wave in the TE mode.

With the configurations described above, in the isolator 2011, the first directional coupler 2072 does not couple an electromagnetic wave in the TE mode in the first direction so much, and couples an electromagnetic wave in the TE mode in the second direction. The first directional coupler 2072 does not couple an electromagnetic wave in the TM mode so much. The second directional coupler 2074 does not couple an electromagnetic wave in the TE mode so much, and couples an electromagnetic wave in the TM mode.

The other configurations of the isolator 2011 are similar to those of the isolator 2010. With the configurations described above, the isolator 2011 operates as described below.

Figure 42:
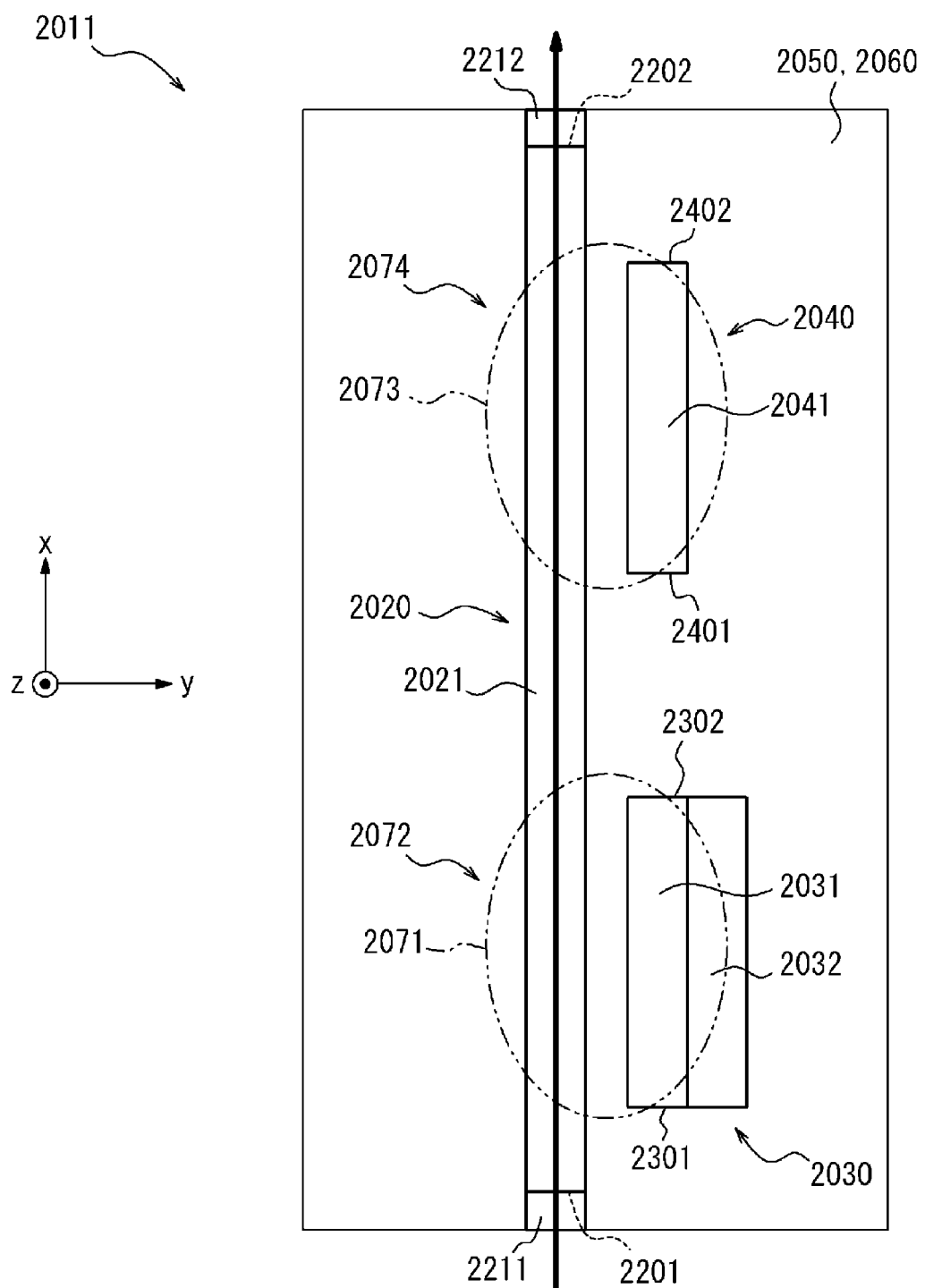
FIG. 42 illustrates the propagation path of an electromagnetic wave in the TE mode that propagates in the first direction.

As illustrated in FIG. 42, an electromagnetic wave in the TE mode that has entered the first waveguide 2020 from the first port 2211 propagates in the first direction. The electromagnetic wave that propagates in the first direction only slightly couples with the second waveguide 2030 in the first directional coupler 2072 because the first coupling coefficient is small. The electromagnetic wave that propagates in the first direction passes through the first directional coupler 2072 and travels in the first direction in the first waveguide 2020. Most of the electromagnetic wave that has passed through the first directional coupler 2072 and propagates in the first direction does not couple with the third waveguide 2040 in the second directional coupler 2074, and passes through the second directional coupler 2074. The electromagnetic wave that has passed through the second directional coupler 2074 travels in the first direction in the first waveguide 2020, and is emitted from the second port 2212. The electromagnetic wave in the TE mode that has entered the first waveguide 2020 from the first port 2211 propagates in the isolator 2010 as schematically indicated by an arrow in FIG. 42.

Figure 43:
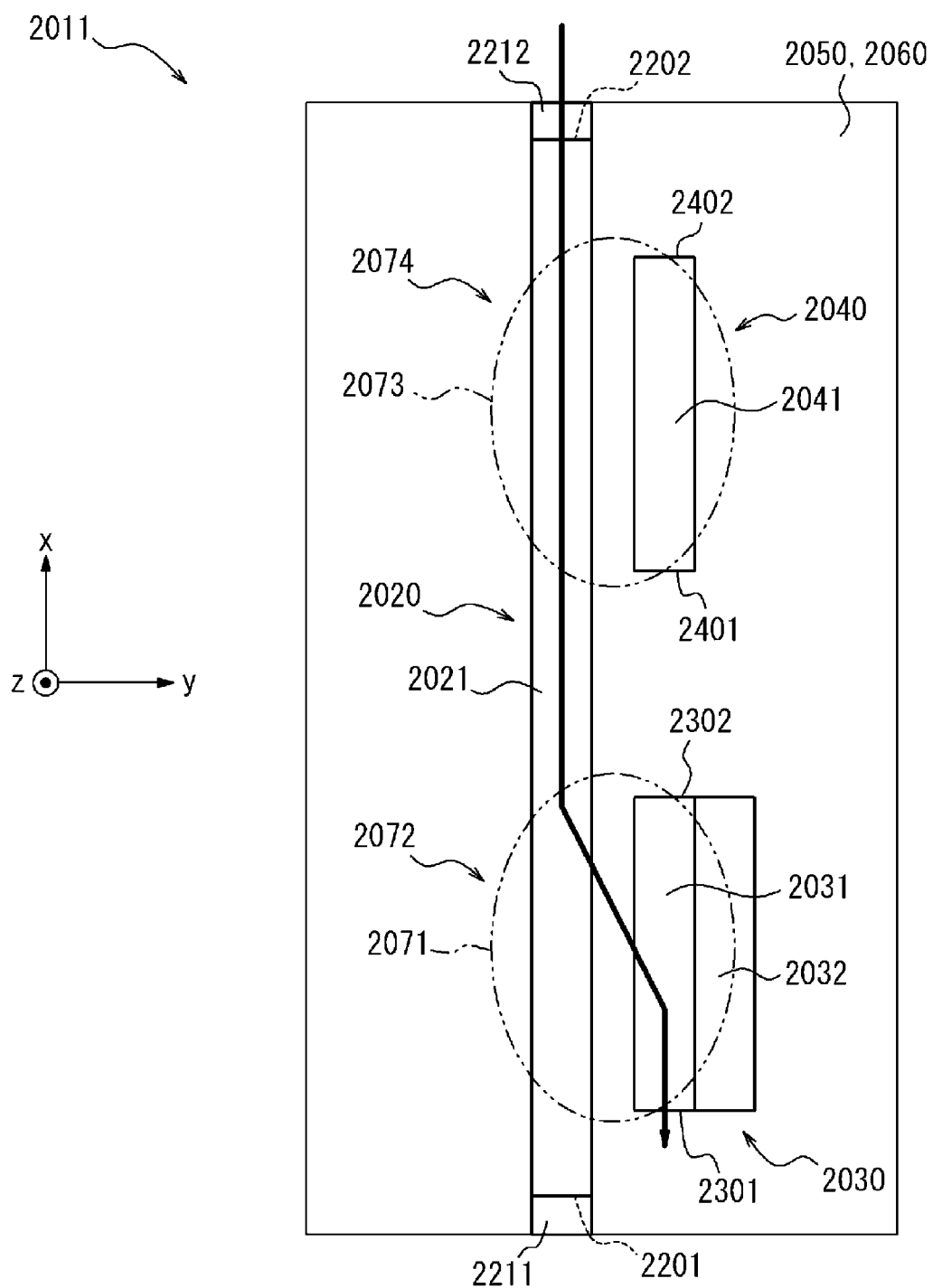
FIG. 43 illustrates the propagation path of an electromagnetic wave in the TE mode that propagates in the second direction.

As illustrated in FIG. 43, an electromagnetic wave in the TE mode that has entered the first waveguide 2020 from the second port 2212 propagates in the second direction. Because the coupling coefficient of the second directional coupler 2074 with respect to an electromagnetic wave in the TE mode is small, most of an electromagnetic wave that propagates in the second direction in the first waveguide 2020 does not couple with the third waveguide 2040 in the second directional coupler 2074, and passes through the second directional coupler 2074. The electromagnetic wave that has passed through the second directional coupler 2074 propagates in the second direction in the first waveguide 2020. Most of the electromagnetic wave that propagates in the second direction in the first waveguide 2020 couples with the second waveguide 2030, because the second coupling coefficient of the first directional coupler 2072 is large. The electromagnetic wave that has coupled with the second waveguide 2030 travels in the second direction in the second waveguide 2030, and is emitted from the first end 2301 of the second waveguide 2030 to the outside. The electromagnetic wave in the TE mode that has entered the first waveguide 2020 from the second port 2212 propagates in the isolator 2010 as schematically indicated by an arrow in FIG. 43.

Figure 44:
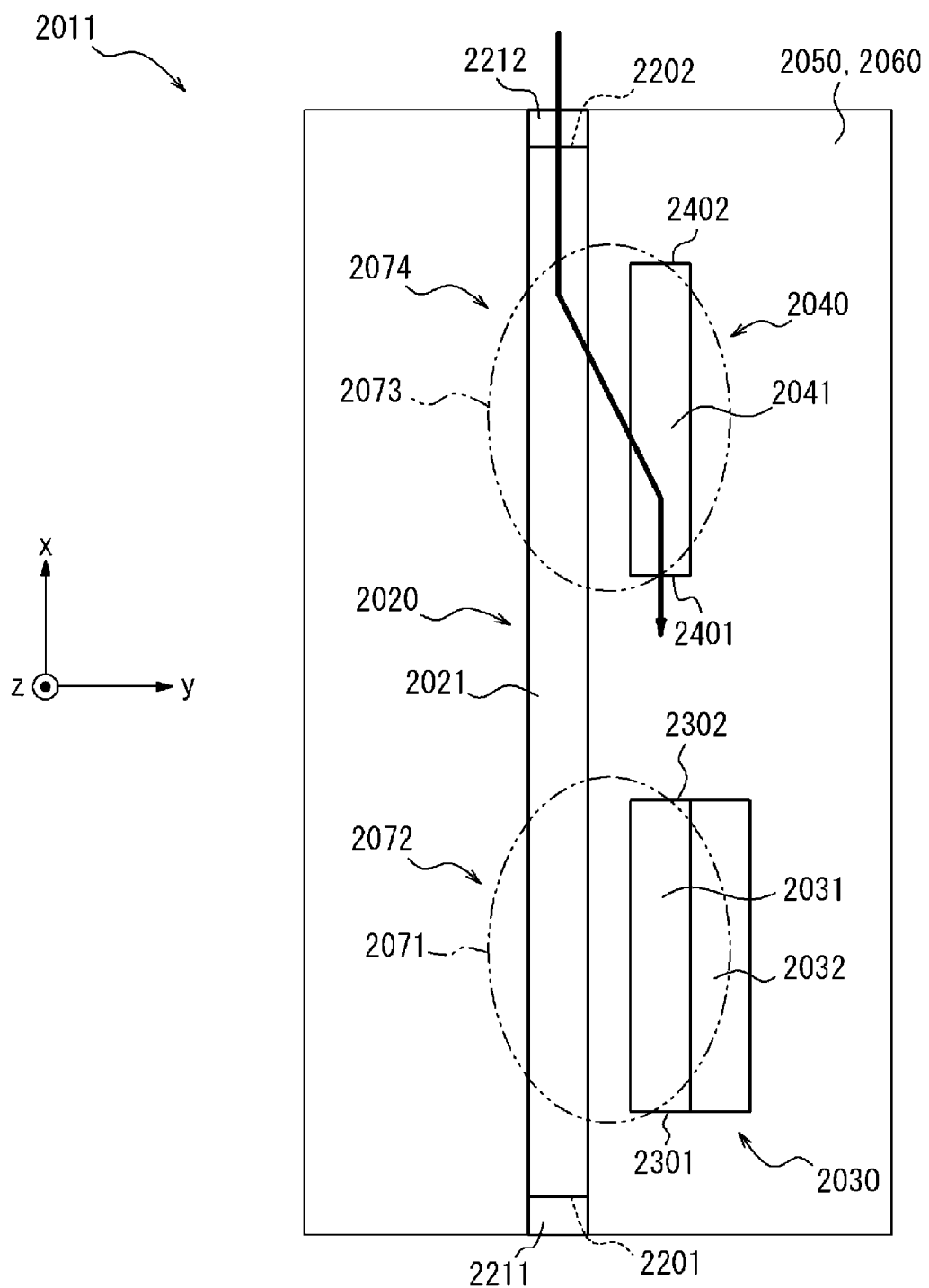
FIG. 44 illustrates the propagation path of an electromagnetic wave in the TM mode that propagates in the second direction.

As illustrated in FIG. 44, an electromagnetic wave in the TM mode that has entered the first waveguide 2020 from the second port 2212 propagates in the second direction. Because the coupling coefficient of the second directional coupler 2074 with respect to an electromagnetic wave in the TM mode is large, the electromagnetic wave that propagates in the second direction in the first waveguide 2020 couples with the third waveguide 2040 due to the second directional coupler 2074. The electromagnetic wave that has coupled with the third waveguide 2040 further propagates in the second direction in the third waveguide 2040, and is radiated from the first end 2401 of the third waveguide 2040 to the outside. The electromagnetic wave in the TM mode that has entered the first waveguide 2020 from the second port 2212 propagates in the isolator 2010 as schematically indicated by an arrow in FIG. 44.

Accordingly, when the first port 2211 is used as an input port in the isolator 2011, most of an electromagnetic wave in the TE mode that is input is propagated to the second port 2212 for output. On the other hand, when an unnecessary electromagnetic wave in the TE mode and the TM mode, which has been reflected from the outside, enters from the second port 2212, the unnecessary electromagnetic wave is not propagated or only slightly propagated to the first port 2211.

As described above, the isolator 2011 can reduce passing-through of a reflection wave including an electromagnetic wave whose mode is different from the mode of an emitted electromagnetic wave, as with the isolator 2010. Thus, the isolator 2011 has advantageous effects that are similar to those of the isolator 2010. Moreover, because the first port 2211 and the second port 2212 are provided in the same first waveguide 2020 in the isolator 2011, an electromagnetic wave does not transfer between waveguides between the first port 2211 and the second port 2212. Therefore, loss of an electromagnetic wave in the TE mode that is input from the first port 2211 and output from the second port 2212 is small. Moreover, the first core 2021 of the first waveguide 2020 and the third core 2041 of the third waveguide 2040 are coupled due to a magnetic field. Compared with coupling due to an electric field, coupling due to a magnetic field allows the distance between the first core 2021 of the first waveguide 2020 and the third core 2041 of the third waveguide 2040 to be large. Therefore, when the first core 2021 of the first waveguide 2020 and the third core 2041 of the third waveguide 2040 couple due to a magnetic field, the electric field of the first core 2021 of the first waveguide 2020 and the electric field of the third core 2041 of the third waveguide 2040 are not likely to couple with each other. Accordingly, the coupling coefficient of an electromagnetic wave in the TE mode between the first core 2021 of the first waveguide 2020 and the third core 2041 of the third waveguide 2040 is low. Also in this respect, loss of an electromagnetic wave in the TE mode that is input from the first port 2211 and output from the second port 2212 is small.

Figure 45:
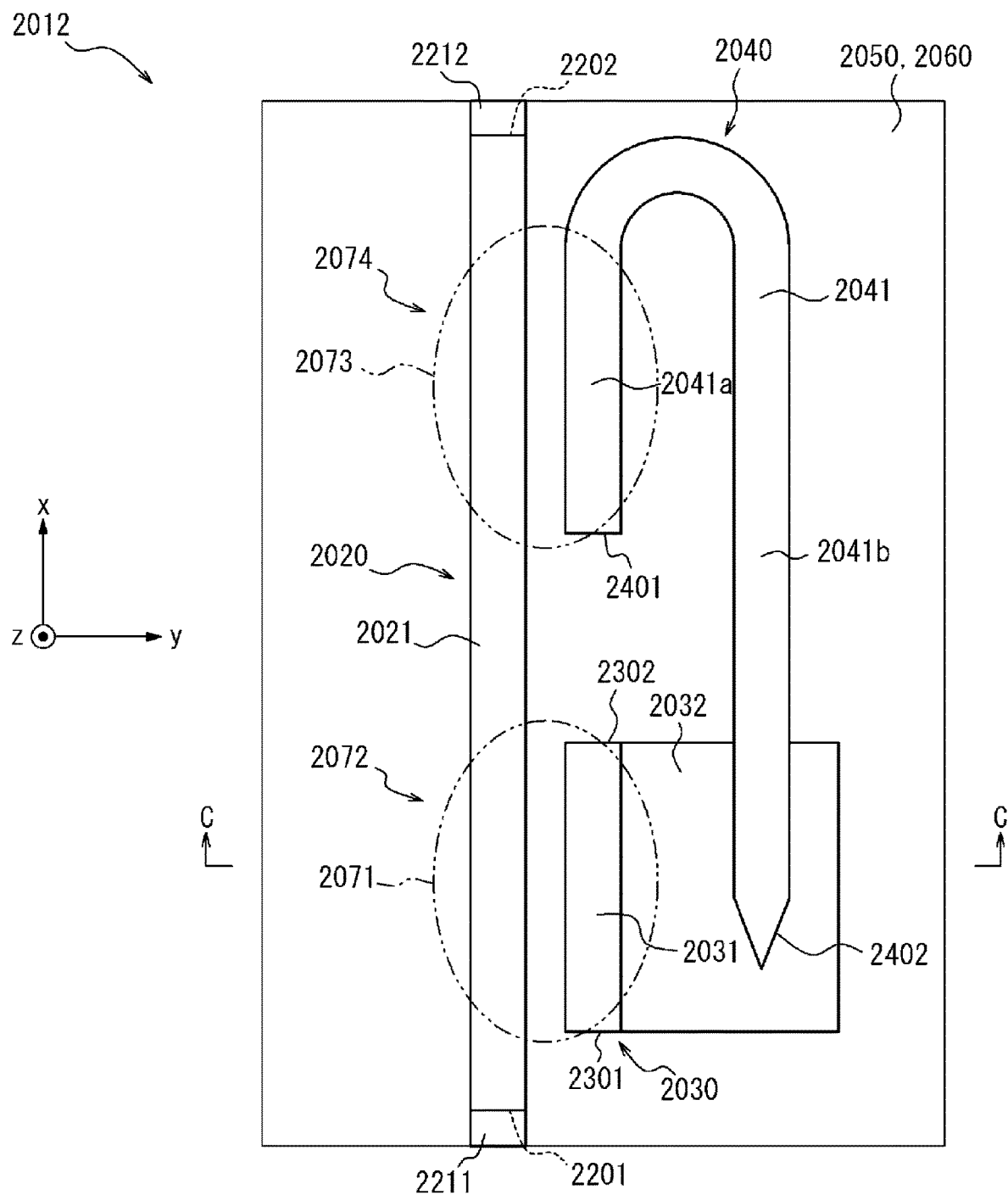
FIG. 45 is a plan view illustrating an isolator according to still another embodiment.

FIG. 45 is a plan view of an isolator 2012 according to still another embodiment. The isolator 2012 illustrated in FIG. 45 is similar to the isolator 2011 illustrated in FIG. 41. Therefore, in the following description of the isolator 2012, elements that are the same as or similar to those of the isolator 2011 will be represented by using the same or similar symbols and names, and only the differences from the isolator 2011 will be described.

In the isolator 2012, the nonreciprocal member 2032 of the second waveguide 2030 has an expanse on a side opposite to the first waveguide 2020 (that is, a side in the positive direction of the y axis). For example, the nonreciprocal member 2032 may have a rectangular shape illustrated in FIG. 45 as seen from a direction perpendicular to the substrate surface 2050a (z-axis direction).

The third core 2041 of the third waveguide 2040 of the isolator 2012 includes a first portion 2041a and a second portion 2041b. The first portion 2041a of the third core 2041 extends along the first core 2021 of the first waveguide 2020 to form the second coupling portion 2073. The second portion 2041b the third core 2041 extends in such a way as to be bent in a direction away from the first core 2021 on a side in the second direction of the first portion 2041a. The second portion 2041b of the third core 2041 is curved around a side of the first portion 2041a away from the first waveguide 2020 (that is, the side in the positive direction of the y axis) and extends to the inside of the nonreciprocal member 2032 of the second waveguide 2030.

Figure 46:
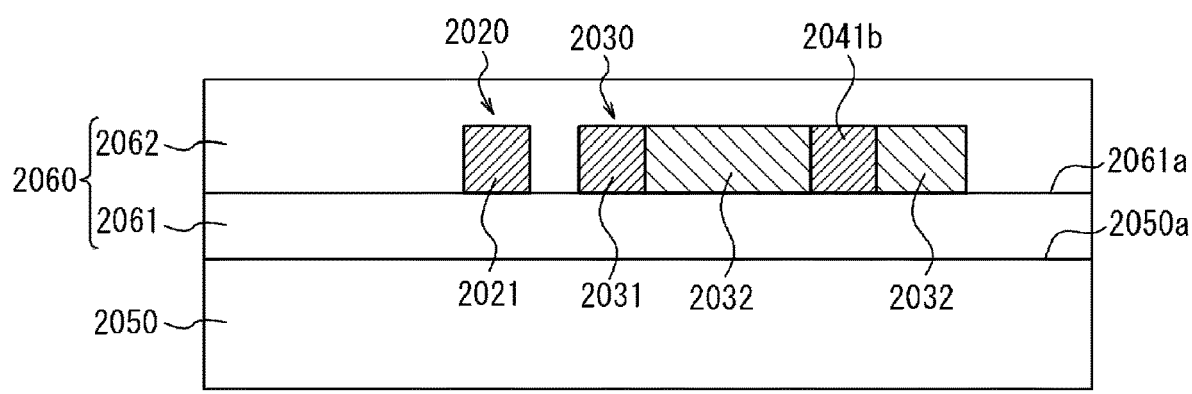
FIG. 46 is a sectional view taken along line C-C of FIG. 45.

As illustrated in the sectional view of FIG. 46, a tip portion, including the second end 2402, of the second portion 2041b of the third core 2041 is embedded in the nonreciprocal member 2032 disposed on the first cladding 2061. Thus, the second portion 2041b of the third core 2041 is in surface-contact with the nonreciprocal member 2032. The nonreciprocal member 2032 has a comparatively large absorption coefficient. Therefore, when there is an electromagnetic wave that has propagated through the second portion 2041b of the third core 2041, the electromagnetic wave is absorbed at a surface that is in contact with the nonreciprocal member 2032.

The second end 2402 of the third core 2041 has a tapered shape whose diameter decreases toward the tip. The tapered portion of the third core 2041 may be longer than the wavelength of an electromagnetic wave that propagates in the isolator 2012. The cross section of the second end 2402 cut along a plane parallel to the xy-plane has a tapered shape.

Moreover, the width of the second end 2402 may decrease toward the tip also in the z-axis direction. Because the second end 2402 has a tapered shape, most of an electromagnetic wave that has propagated in the third core 2041 is not reflected and is emitted from the second end 2402 to the outside of the third waveguide 2040.

The other configurations of the isolator 2012 are the same as those of the isolator 2011.

With the configurations described above, the isolator 2012 has, in addition to advantageous effects of the isolator 2011, an advantageous effect in that the isolator 2012 can reduce the probability that an electromagnetic wave that has entered from the first port 2211 and has coupled with the third waveguide 2040 in the second directional coupler 2074 is reflected in the third waveguide 2040 and returns again to the first port 2211. Hereafter, the advantageous effect will be described in further detail.

As described above with reference to FIG. 42, most of an electromagnetic wave in the TE mode input from the first port 2211 propagates as it is in the first waveguide 2020 in the first direction and is output from the second port 2212. However, a part of the electromagnetic wave may couple with the third waveguide 2040 in the second directional coupler 2074. When an electromagnetic wave that has transferred to the third waveguide 2040 in the second directional coupler 2074 travels in the third waveguide 2040 and is reflected at the second end 2402, there is a risk that a part of the electromagnetic couples again with the first waveguide 2020 in the second directional coupler 2074, returns in the first waveguide 2020, and is emitted from the first port 2211.

With the present embodiment, the third core 2041 of the third waveguide 2040 is in contact with the nonreciprocal member 2032 in the second portion 2041b. When a part of an electromagnetic wave that is propagated in the third waveguide 2040 is totally reflected at the interface where the third waveguide 2040 is in contact with the nonreciprocal member 2032, the part leaks out to the nonreciprocal member 2032 as an evanescent wave. The electromagnetic wave that has leaked out the nonreciprocal member 2032 is at least partially absorbed by the nonreciprocal member 2032. Accordingly, the isolator 2011 can attenuate an unnecessary electromagnetic wave that has coupled with the third waveguide 2040. Moreover, because the second end 2402 of the third core 2041 has a tapered shape, an unnecessary electromagnetic wave that has travelled to the second end 2402 is radiated to the outside of the third waveguide 2040. Accordingly, an electromagnetic wave that returns to the first port 2211 is reduced.

In the embodiment described above, a portion of the third waveguide 2040 including the second end 2402 is extended to be in contact with the nonreciprocal member 2032. Likewise, it is possible to extend either of a portion of the second waveguide 2030 including the first end 2301, a portion of the second waveguide 2030 including the second end 2302, and a portion of the third waveguide 2040 including the first end 2401 to be in contact with the nonreciprocal member 2032.

The isolators 2010 to 2012 according to the present disclosure can be used in a light transmitter illustrated in the block diagram of FIG. 32. As an isolator 1085 of FIG. 32, an isolator according to the present disclosure can be used. For example, as the isolator 1085, the isolator 2010 illustrated in FIGS. 34 to 36, the isolator 2011 illustrated in FIG. 41, or the isolator 2012 illustrated in FIG. 45 can be used.

As an isolator 1094 of the light transmitter illustrated in FIG. 34 according to another embodiment, an isolator according to the present disclosure can be used. For example, as the isolator 1094, the isolator 2010 illustrated in FIGS. 34 to 36, the isolator 2011 illustrated in FIG. 41, or the isolator 2012 illustrated in FIG. 45 can be used.

In the isolator according to each of the embodiments described above, the disposition of the waveguide on the substrate is only an example. For example, in each of the embodiments descried above, the orientations of a plurality of waveguides in a portion where the waveguides are disposed close to each other to form a parallel waveguide are parallel to the sides of the substrate in the longitudinal direction. However, the shape of the substrate and the orientations and dispositions of the waveguides are not limited to these, and may be set in any manner as long as the advantageous effects of the present disclosure can be obtained. For example, a plurality of waveguides may be positioned side by side in a direction perpendicular to the substrate, instead of being positioned side by side in a direction along the substrate surface.

In the embodiment described above, an isolator and a light transmitter each of which propagates an electromagnetic wave in the TE mode has been described. However, the present disclosure can be applied to an isolator and a light transmitter each of which propagates an electromagnetic wave in the TM mode. When the present disclosure can be applied to an isolator and a light transmitter each of which propagates an electromagnetic wave in the TM mode, the disposition of the nonreciprocal member with respect to the second waveguide and the direction of a magnetic field applied differ from those of the embodiment described above. For example, when the present disclosure is applied to an isolator and a light transmitter for the TM mode, the nonreciprocal member may be disposed in a direction perpendicular to the substrate of the second waveguide (corresponding to the z-axis direction in the embodiments described above). At this time, a magnetic field may be applied to a direction perpendicular to the direction in which the second waveguide extends (corresponding to the y-axis direction in the embodiments described above).

Heretofore, embodiments according to the present disclosure have been described with reference to the drawings and examples. Note that a person having ordinary skill in the art would be able to modify or improve the embodiments in various ways based on the present disclosure. Accordingly, note that such modifications and improvements are included in the scope of the present disclosure. For example, elements, functions included in steps, or the like can be rearranged without causing logical contradiction, and a plurality of elements or steps can be combined into one or may be divided. Although a device has been mainly described regarding embodiments according to the present disclosure, an embodiment according to the present disclosure can be realized as a method including steps performed by the elements of the device. An embodiment according to the present disclosure can be realized as a method performed by a processor included in a device, a program, or a storage medium in which a program is recorded. It should be understood that these are also included in the scope of the present disclosure.

In the present embodiment, ordinal numbers such as "first" and "second" are identifiers for discriminating between the elements. In the present disclosure, regarding the elements that are discriminated by the ordinal numbers such as "first" and "second", the ordinal numbers may be replaced with each other. For example, the identifiers "first" and "second" of the first trench and the second trench may be replaced with each other. Replacement of the identifiers is performed simultaneously. Even after the replacement of identifiers, the elements are discriminated. The identifiers may be omitted. Elements from which the identifiers are omitted are discriminated by reference numerals. In the present disclosure, the identifiers "first", "second", and the like should not be used for the interpretation of the order of the elements and as the basis for the presence of an identifier with a smaller number.

In the present disclosure, the X axis, the Y axis, and the Z axis are provided for convenience of description and may be replaced with each other. Configurations according to the present disclosure have been described by using an orthogonal coordinate system formed by the X axis, the Y axis, and the Z axis. The positional relationships among elements according to the present disclosure are not limited to be in the orthogonal relationship.

REFERENCE SIGNS LIST 10 isolator (101: first port, 102: second port)
11 first isolator (111: first port, 112: second port)
12 second isolator (121: third port, 122: fourth port)
13 third isolator (131: fifth port, 132: sixth port)
14 fourth isolator (141: seventh port, 142: eighth port)
21 first core (211: first end, 212: second end)
22 second core (221: first end, 222: second end)
23 third core (231: first end, 232: second end)
24 fourth core (241: first end, 242: second end)
25 fifth core (251: first end, 252: second end)
26 sixth core (261: first end, 262: second end)
27 seventh core (271: first end, 272: second end)
28 eighth core (281: first end, 282: second end)
29 connection core
31 nonreciprocal member (first nonreciprocal member)
32 to 34 second to fourth nonreciprocal members
40 magnetic body (magnetic-field application unit)
44 conductor (magnetic-field application unit)
46 electric current
50 substrate
52 base material
52a base material surface
54 cladding
56 embedding material
60 array antenna
71 to 74 trenches (71S to 74S: side walls)
80 electric wire
100 electromagnetic wave transmitter
110 light source
120 modulator
130 signal input unit
140 receiver
1010, 1011 isolator
1020 first waveguide
1021 first core
1201 first end
1202 second end
1211 first port
1212 second port
1030 second waveguide
1031 second core
1031a first portion
1031b, 1031c second portion
1301 first end
1302 second end
1032 nonreciprocal member
1050 substrate
1050a substrate surface
1060 cladding
1061 first cladding (dielectric)
1062 second cladding (dielectric)
1070, 1080 light transmitter
1071 light source
1072 digital to analog converter (DAC)
1073 driver
1074 light modulator
1075 isolator
1081 signal generating unit
1082 driver (drive unit)
1083 light source
1084 isolator
2010, 2011, 2012 isolator
2020 first waveguide
2021 first core
2201 first end
2202 second end
2211 first port
2212 second port
2030 second waveguide
2031 second core
2032 nonreciprocal member
2301 first end
2302 second end
2040 third waveguide
2041 third core
2401 first end
2402 second end
2412 second port
2050 substrate
2050a substrate surface
2060 cladding
2061 first cladding (dielectric)
2062 second cladding (dielectric)
2071 first coupling portion
2072 first directional coupler
2073 second coupling portion
2074 second directional coupler
2080, 2090 light transmitter
2081 light source
2082 digital to analog converter (DAC)
2083 driver
2084 light modulator
2085 isolator
2091 signal generating unit
2092 driver (drive unit)
2093 light source
2094 isolator

The invention claimed is:

1. An isolator comprising:
a first waveguide, a second waveguide, and a third waveguide that are positioned along a substrate surface of a substrate,
wherein the first waveguide, the second waveguide, and the third waveguide each include a core surrounded by a dielectric,
wherein the first waveguide and the second waveguide include a first coupling portion that forms a first directional coupler that acts on an electromagnetic wave in a first mode,
wherein the first waveguide and the third waveguide include a second coupling portion that forms a second directional coupler that acts on either of an electromagnetic wave in the first mode and an electromagnetic wave in a second mode that is different from the first mode, and wherein the second waveguide includes a nonreciprocal member adjacent to the core of the second waveguide in the first coupling portion, and thereby the first directional coupler does not couple an electromagnetic wave in a first direction and couples an electromagnetic wave in a second direction that is different from the first direction.

2. A light transmitter comprising:

a light source;

a light modulator that modulates, based on a signal to be transmitted, light emitted from the light source; and the isolator according to claim 1, the isolator is disposed downstream of the light source.

3. A light transmitter comprising:

a light source;

a drive unit that drives the light source based on a signal to be transmitted; and the isolator according to claim 1, the isolator is disposed on a light-emission side of the light source.

4. An isolator comprising:

a plurality of waveguides that are positioned along a substrate surface of a substrate;

a first port and a second port through which an electromagnetic wave is input and output; and a first directional coupler and a second directional coupler that are disposed between the first port and the second port and each of which is formed between two waveguides, wherein the first directional coupler has nonreciprocity, allows an electromagnetic wave in a first mode that propagates in a first direction to pass through a same waveguide, and transfers an electromagnetic wave in the first mode that propagates in a second direction that is different from the first direction to a different waveguide, and wherein the second directional coupler transfers an electromagnetic wave that is in either of the first mode and a second mode different from the first mode and that propagates in any direction to a different waveguide.

* * * * *